(12) United States Patent
Ge et al.

(10) Patent No.: US 10,819,390 B2
(45) Date of Patent: Oct. 27, 2020

(54) DMRS TRANSMISSION METHOD AND COMMUNICATIONS DEVICE

(71) Applicant: Huawei Technologies Co., Ltd., Shenzhen (CN)

(72) Inventors: Shibin Ge, Shanghai (CN); Xiang Ren, Shanghai (CN); Xiaoyan Bi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/522,255

(22) Filed: Jul. 25, 2019

(65) Prior Publication Data

US 2019/0349023 A1  Nov. 14, 2019

Related U.S. Application Data

(63) Continuation of application No. PCT/CN2018/095989, filed on Jul. 17, 2018.

(30) Foreign Application Priority Data

Jul. 17, 2017 (CN) .......................... 2017 1 0583011
Sep. 8, 2017 (CN) .......................... 2017 1 0808095

(51) Int. Cl.
  *H04L 5/10* (2006.01)
  *H04L 5/00* (2006.01)
  (Continued)

(52) U.S. Cl.
  CPC ......... *H04B 1/7143* (2013.01); *H04L 5/0051* (2013.01); *H04L 5/10* (2013.01); *H04W 72/0453* (2013.01)

(58) Field of Classification Search
  None
  See application file for complete search history.

(56) References Cited

U.S. PATENT DOCUMENTS

2011/0317596 A1  12/2011  Jöngren et al.
2015/0023270 A1  1/2015  Park et al.
(Continued)

FOREIGN PATENT DOCUMENTS

CN  101932096 A  12/2010
CN  103002581 A  3/2013
(Continued)

OTHER PUBLICATIONS

"DL/UL Frequency Resource Allocation," 3GPP TSG RAN WG1 Meeting NR Ad-Hoc, Qingdao, China, R1-1710718, 3rd Generation Partnership Project, Valbonne, France (Jun. 27-30, 2017).
(Continued)

*Primary Examiner* — Ruihua Zhang
(74) *Attorney, Agent, or Firm* — Leydig, Voit & Mayer, Ltd.

(57) ABSTRACT

This application provides a Demodulation Reference Signal (DMRS) transmission method and a communications device. The method includes: determining, by a communications device, a current mode of a resource scheduling unit, where the current mode is a frequency hopping mode or an aggregation mode, and performing, by the communications device, DMRS mapping or demapping by using a DMRS pattern corresponding to the current mode, where a location of a symbol occupied by a DMRS in the DMRS pattern corresponding to the current mode is different from a location of a symbol occupied by a DMRS in a preset DMRS pattern. In embodiments of this application, a location of a symbol occupied by a DMRS can be flexibly selected depending on different modes. Therefore, requirements of the different modes can be satisfied in the embodiments of this application, thereby improving network performance.

29 Claims, 23 Drawing Sheets

(51) Int. Cl.
*H04W 72/04* (2009.01)
*H04B 1/7143* (2011.01)

(56) References Cited

U.S. PATENT DOCUMENTS

| | | | |
|---|---|---|---|
| 2016/0087774 | A1 | 3/2016 | Guo et al. |
| 2017/0272141 | A1* | 9/2017 | Horiuchi ............. H04W 52/325 |
| 2018/0123760 | A1 | 5/2018 | Yang et al. |
| 2018/0368116 | A1* | 12/2018 | Liao ...................... H04W 76/27 |
| 2019/0007934 | A1 | 1/2019 | Wang et al. |
| 2020/0052835 | A1* | 2/2020 | Xiong .................. H04B 7/0632 |

FOREIGN PATENT DOCUMENTS

| | | |
|---|---|---|
| CN | 104081872 A | 10/2014 |
| CN | 104125186 A | 10/2014 |
| CN | 105191464 A | 12/2015 |
| EP | 3188537 A1 | 7/2017 |
| WO | 2014113971 A1 | 7/2014 |
| WO | 2015000171 A1 | 1/2015 |
| WO | 2017008210 A1 | 1/2017 |

OTHER PUBLICATIONS

"Evaluation results of DMRS design for UL data channel," 3GPP TSG RAN WG1 NR Ad Hoc Meeting, Qingdao, China, R1-1709944, 3rd Generation Partnership Project, Valbonne, France (Jun. 27-30, 2017).

"UL DMRS design for data transmission," 3GPP TSG RAN WG1 NR Ad Hoc Meeting Qingdao, China, R1-1709943, 3rd Generation Partnership Project, Valbonne, France (Jun. 27-30, 2017).

"3rd Generation Partnership Project; Technical Specification Group Radio Access Network; NR;Physical channels and modulation(Release 15)," 3GPP TS 38.211 V0.1.0, pp. 1-22, 3rd Generation Partnership Project, Valbonne, France (Jun. 2017).

* cited by examiner

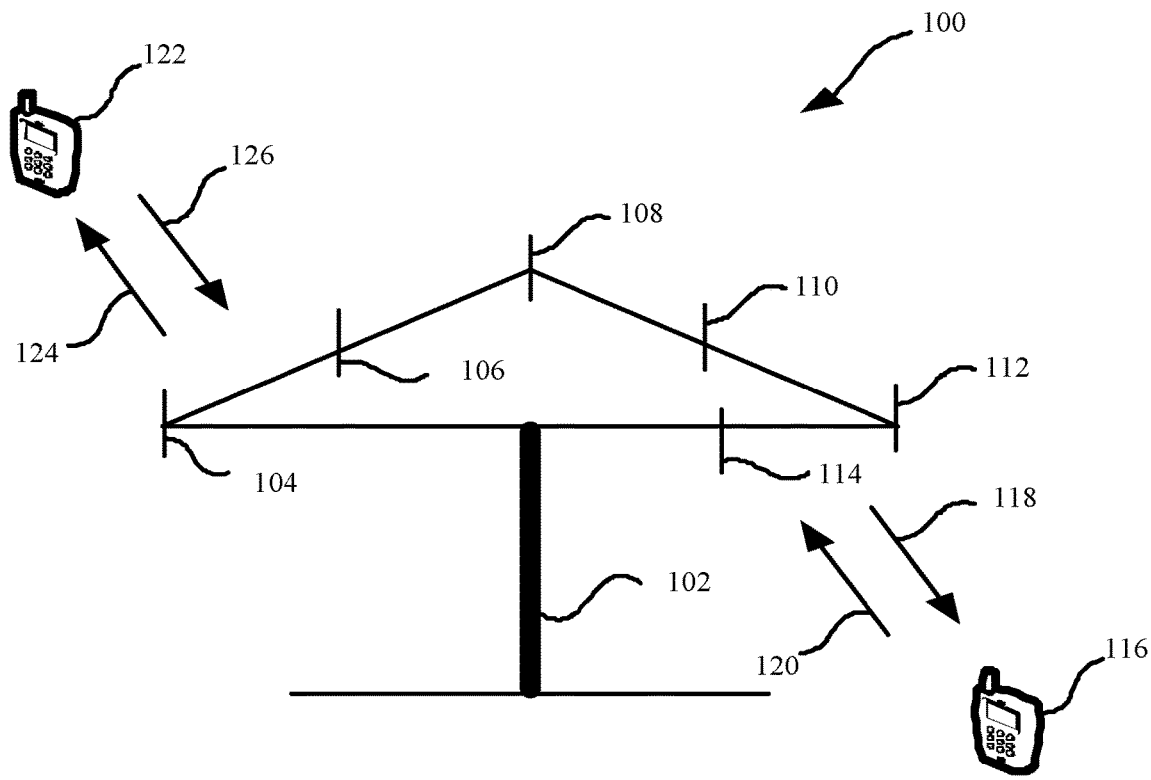

A communications device determines a current mode of a resource scheduling unit, where the current mode is a frequency hopping mode or an aggregation mode, the frequency hopping mode indicates that some symbols in one resource scheduling unit are located in a first frequency band and some other symbols are located in a second frequency band, and the aggregation mode indicates aggregation transmission of a plurality of resource scheduling units ~ 210

The communications device performs DMRS mapping or demapping by using a DMRS pattern corresponding to the current mode, where a location of a symbol occupied by a DMRS in the DMRS pattern corresponding to the current mode is different from a location of a symbol occupied by a DMRS in a preset DMRS pattern ~ 220

FIG. 2

DMRS TRANSMISSION METHOD AND COMMUNICATIONS DEVICE

CROSS-REFERENCE TO RELATED APPLICATIONS

This application is a continuation of International Application No. PCT/CN2018/095989, filed on Jul. 17, 2018, which claims priority to Chinese Patent Application No. 201710808095.3, filed on Sep. 8, 2017 and Chinese Patent Application No. 201710583011.0, filed on Jul. 17, 2017. The disclosures of the aforementioned applications are hereby incorporated by reference in their entireties.

TECHNICAL FIELD

Embodiments of this application relate to the communications field, and more specifically, to a Demodulation Reference Signal (DMRS) transmission method and a communications device.

BACKGROUND

In an existing communications system, during data transmission, a transmit end device (which is, for example, a terminal device during uplink transmission or a network device during downlink transmission) needs to send a DMRS, so that a receive end device (which is, for example, a network device during uplink transmission or a terminal device during downlink transmission) demodulates the data based on the DMRS.

Usually, the transmit end device sends the DMRS based on a preset DMRS pattern. For example, in a Long Term Evolution (LTE) system, for a normal cyclic prefix, a DMRS used for a physical uplink shared channel (PUSCH) demodulation usually constantly occupies the $4^{th}$ symbol and the $11^{th}$ symbol of a resource scheduling unit. For another example, a new radio (NR) system has a rapid feedback requirement. Therefore, in a DMRS pattern in the NR system, a DMRS constantly occupies a front loaded symbol of a resource scheduling unit.

The resource scheduling unit in the new radio (NR) system may be flexibly changed to different modes based on different scenarios. For example, the resource scheduling unit may be changed to a frequency hopping mode, that is, frequency hopping transmission in the resource scheduling unit, or may be changed to an aggregation mode, that is, aggregation transmission of a plurality of resource scheduling units.

However, when the mode of the resource scheduling unit is changed, if the DMRS is sent still in a manner of constantly transmitting the DMRS based on the preset DMRS pattern, an adverse effect such as DMRS resource waste or poor demodulation performance of a receive end is caused. As a result, network performance is affected.

SUMMARY

This application provides a DMRS transmission method and a communications device, to improve network performance.

According to a first aspect, a DMRS transmission method is provided. The method includes:

determining, by a communications device, a current mode of a resource scheduling unit, where the current mode is a frequency hopping mode or an aggregation mode, the frequency hopping mode indicates that some symbols in one resource scheduling unit are located in a first frequency band and some other symbols are located in a second frequency band, and the aggregation mode indicates aggregation transmission of a plurality of resource scheduling units; and performing, by the communications device, DMRS mapping or demapping by using a DMRS pattern corresponding to the current mode, where a location of a symbol occupied by a DMRS in the DMRS pattern corresponding to the current mode is different from a location of a symbol occupied by a DMRS in a preset DMRS pattern.

It should be understood that, the method may be performed by the communications device, and the communications device may be a network device or a terminal device.

It should be understood that, in this embodiment of this application, a symbol indicates a time unit, the symbol herein may alternatively be referred to as an OFDM symbol, and this embodiment of this application is not limited thereto.

It should be further understood that, one resource unit in this embodiment of this application may include n symbols, where n is an integer greater than or equal to 2. For example, n is 7, 14, or any value of 2 to 13, and this embodiment of this application is not limited thereto.

It should be understood that, in this embodiment of this application, a DMRS pattern may alternatively be referred to as DMRS distribution information or a DMRS attribute, the DMRS pattern can indicate locations and a quantity of symbols occupied by a DMRS, and this embodiment of this application is not limited thereto.

It should be understood that, when sending data, the communications device performs DMRS mapping based on the DMRS pattern corresponding to the current mode, and when receiving data, the communications device performs DMRS demapping based on the DMRS pattern corresponding to the current mode.

For example, the communications device is a network device, and when performing uplink transmission, the communications device performs DMRS demapping by using the DMRS pattern corresponding to the current mode; and when performing downlink transmission, the communications device performs DMRS mapping by using the DMRS pattern corresponding to the current mode. For another example, the communications device is a terminal device, and when performing uplink transmission, the communications device performs DMRS mapping by using the DMRS pattern corresponding to the current mode; and when performing downlink transmission, the communications device performs DMRS demapping by using the DMRS pattern corresponding to the current mode.

It should be understood that, in this embodiment of this application, the preset DMRS pattern may alternatively be referred to as a predefined pattern, a default pattern, or a first DMRS pattern, and the DMRS pattern corresponding to the current mode may alternatively be referred to as a second DMRS pattern. In this embodiment of this application, the preset DMRS pattern indicates a DMRS pattern used in a first mode (that is, a non-frequency-hopping and non-aggregation mode).

In the prior art, communication is performed by using a preset DMRS pattern in any transmission mode. To be specific, a location of a symbol occupied by a DMRS is the same as a location of a symbol occupied by a DMRS in the preset DMRS pattern. However, in some application scenarios, when a mode of a resource scheduling unit is changed, if a DMRS is sent still in an existing manner of constantly transmitting the DMRS, because a distribution manner of DMRSs in a preset DMRS pattern has difficulty in satisfying requirements of different modes, an adverse effect such as DMRS resource waste or poor demodulation performance of a receive end is caused. As a result, network performance is affected.

However, DMRS patterns in different modes in this embodiment of this application are different from the preset pattern, and a location of a symbol occupied by a DMRS can be flexibly selected based on the different modes in this embodiment of this application. Therefore, requirements of the different modes can be satisfied in this embodiment of this application, thereby improving network performance.

When the communications device is a network device, the network device may determine the current mode in a plurality of manners.

Optionally, the network device may determine the current mode based on channel state information reported by a terminal device and a network status of a cell.

Optionally, the network device may determine the current mode based on a waveform used by a terminal device, for example, a single-carrier waveform or a multi-carrier waveform. For example, when the terminal device uses the single-carrier waveform, the current mode may be the frequency hopping mode, and when the terminal device uses the multi-carrier waveform, the current mode may be the aggregation mode. This embodiment of this application is not limited thereto. For example, when the terminal device uses the single-carrier waveform, the current mode may alternatively be the aggregation mode.

Optionally, the network device may determine the current mode based on a service type. The service type may include a service requiring rapid demodulation, a service requiring high transmission performance, or the like.

Optionally, the network device may determine the current mode based on indication information sent by the terminal device. To be specific, the terminal device may determine the current mode based on a current status such as a network status or a service status, and then the terminal device indicates the current mode to the network device. In this case, the terminal device sends the indication information to the network device, so that the network device determines the current mode based on the indication information sent by the terminal device.

Optionally, in an implementation of the first aspect, the communications device is a network device, and the method further includes: sending, by the communications device, first indication information to a terminal device, where the first indication information is used by the terminal device to determine the current mode of the resource scheduling unit.

Optionally, in an implementation of the first aspect, the communications device is the network device, and the method further includes: sending, by the communications device, second indication information to the terminal device, where the second indication information is used to indicate the DMRS pattern corresponding to the current mode.

When the communications device is a terminal device, the terminal device may determine the current mode in a plurality of manners.

Optionally, the terminal device may determine the current mode based on an indication of the network device. Specifically, the terminal device may receive first indication information sent by the network device, where the first indication information is used by the terminal device to determine the current mode. After obtaining the first indication information, the terminal device may determine the current mode of the resource scheduling unit according to the first indication information.

It should be understood that, the first indication information may directly indicate that the current mode is the aggregation mode or the frequency hopping mode. Optionally, the first indication information may indirectly indicate the current mode. For example, the first indication information indicates a length of the resource scheduling unit, and the terminal device may determine the current mode based on the length of the resource scheduling unit. For another example, the first indication information indicates a current service type, the terminal device determines the current mode based on the service type, and this embodiment of this application is not limited thereto.

It should be understood that, the network device may send the first indication information to the terminal device by using a plurality of types of signaling such as downlink control information (DCI), radio resource control (RRC) signaling, and media access control (MAC) control element (CE). This is not limited in this embodiment of this application.

Optionally, in an implementation of the first aspect, the communications device is a terminal device, and the method further includes: receiving, by the communications device, first indication information sent by a network device, where the first indication information is used by the terminal device to determine the current mode of the resource scheduling unit; and the determining, by a communications device, a current mode of a resource scheduling unit includes: determining, by the communications device, the current mode according to the first indication information.

Optionally, in an implementation of the first aspect, the communications device is the terminal device, and the method further includes: receiving, by the communications device, second indication information sent by the network device, where the second indication information is used to indicate the DMRS pattern corresponding to the current mode.

It should be understood that, the network device may send the second indication information to the terminal device by using a plurality of types of signaling such as DCI, RRC signaling, and a MAC CE. This is not limited in this embodiment of this application.

Specifically, because the network device needs to determine a DMRS pattern when the network device performs data transmission with the terminal device, the network device notifies the terminal device of a DMRS pattern used when the network device performs data transmission with the terminal device, and the terminal device may determine a time-frequency resource location of a DMRS based on the DMRS pattern, and then may perform DMRS mapping or demapping.

Optionally, the terminal device may determine the current mode based on a current status. For example, the terminal device determines the current mode based on a network status or a service status, and then the terminal device indicates the current mode to the network device.

Optionally, in an implementation of the first aspect, the current mode is the frequency hopping mode, where the DMRS in the preset DMRS pattern occupies N consecutive symbols in one resource scheduling unit without frequency hopping, where N is an integer greater than or equal to 1; and the DMRS in the DMRS pattern corresponding to the current mode occupies $N_1$ consecutive symbols in the first frequency band and $N_2$ consecutive symbols in the second frequency band, where $N_1$ is an integer greater than or equal to 1, and $N_2$ is an integer greater than or equal to 1.

In this embodiment of this application, in the frequency hopping mode, channel statuses of two frequency bands are different. Therefore, a DMRS is transmitted in each frequency band in this embodiment of this application, so that a receive end device can demodulate corresponding data based on the DMRS in the frequency band, thereby improving data demodulation accuracy and improving demodulation performance.

Optionally, in an implementation of the first aspect, $N_1=N_2$, and locations of the $N_1$ symbols in the first frequency band are symmetrical with locations of the $N_2$ symbols in the second frequency band.

Therefore, in this embodiment of this application, DMRSs in two frequency bands are symmetrically disposed, so that the receive end device can perform data demodulation in the two frequency bands in a same manner, thereby reducing demodulation complexity and improving network performance.

Optionally, in an implementation of the first aspect, the $N_2$ symbols include the $1^{st}$ symbol in the second frequency band.

The receive end device may demodulate data only after the receive end device obtains a DMRS. Therefore, in this embodiment of this application, the DMRS is set to occupy the $1^{st}$ symbol in the second frequency band, so that the receive end device can first obtain the DMRS, and then can rapidly demodulate the data.

It should be understood that, the locations of the $N_2$ symbols may be further any location in the second frequency band, and this embodiment of this application is not limited thereto.

For example, the locations of the $N_2$ symbols are in the first half part of the second frequency band, or the $1^{st}$ symbol of the $N_2$ symbols is located in the first half part of the second frequency band. For example, $N_2=2$, the two symbols may be the $2^{nd}$ symbol and the $3^{rd}$ symbol or the $3^{rd}$ symbol and the $4^{th}$ symbol in the second frequency band, and this embodiment of this application is not limited thereto.

Optionally, in an implementation of the first aspect, the $N_1$ symbols include the $1^{st}$ symbol in a first area in the first frequency band, and the first area includes symbols occupied by data and the DMRS.

It should be understood that, in this application, the first area includes a symbol that is in the resource scheduling unit and is used to bear the data and the DMRS.

The $N_1$ symbols include the $1^{st}$ symbol in the first area, thereby implementing rapid demodulation.

Optionally, in an implementation of the first aspect, $N_1=N_2=1$, or $N_1=N_2=2$.

To be specific, each sequence occupies one or two symbols, but this embodiment of this application is not limited thereto. Alternatively, a sequence occupies one symbol, and another sequence occupies two symbols.

Optionally, in an implementation of the first aspect, the current mode is the frequency hopping mode, where the DMRS in the preset DMRS pattern occupies M consecutive symbols and K consecutive symbols in one resource scheduling unit without frequency hopping, where the M symbols are not adjacent to the K symbols; the DMRS in the DMRS pattern corresponding to the current mode occupies $M_1$ consecutive symbols and $K_1$ consecutive symbols of the symbols in the first frequency band, and $M_2$ consecutive symbols and $K_2$ consecutive symbols in the second frequency band, where the $M_1$ symbols are not adjacent to the $K_1$ symbols, the $M_2$ symbols are not adjacent to the $K_2$ symbols, and M, K, $M_1$, $K_1$, $M_2$, and $K_2$ are integers greater than or equal to 1.

It should be understood that, the M symbols are located before the K symbols, the $M_1$ symbols are located before the $K_1$ symbols, and the $M_2$ symbols are located before the $K_2$ symbols.

Optionally, in an implementation of the first aspect, the $K_1$ symbols include the last symbol, the penultimate symbol, or the antepenultimate symbol in the first frequency band.

The $K_1$ symbols are disposed in the second half part of the first frequency band, to enable the receive end to better demodulate data, thereby improving system performance.

Optionally, in an implementation of the first aspect, the $M_1$ symbols include the $1^{st}$ symbol in a first area in the first frequency band, and the first area includes symbols occupied by data and the DMRS.

The $M_1$ symbols include the $1^{st}$ symbol in the first area in the first frequency band, thereby implementing rapid demodulation.

Optionally, in an implementation of the first aspect, the $M_2$ symbols include the $1^{st}$ symbol in the second frequency band.

Optionally, in an implementation of the first aspect, $M_1=M$, and locations of the $M_1$ symbols are the same as those of the M symbols; the $K_1$ symbols include the last symbol in the first frequency band; the $M_2$ symbols include the $1^{st}$ symbol in the first frequency band; and $K_2=K$, and locations of the $K_2$ symbols are the same as those of the K symbols, or locations of the $K_2$ symbols are preset locations.

Optionally, in an implementation of the first aspect, $M_1=M$, and locations of the $M_1$ symbols are the same as those of the M symbols;

the $K_1$ symbols include the $7^{th}$ symbol in the entire resource scheduling unit, the entire resource scheduling unit includes a sum of the symbols occupied in the first frequency band and the symbols occupied in the second frequency band, and the entire resource scheduling unit includes 14 symbols;

the $M_2$ symbols include the $8^{th}$ symbol in the entire resource scheduling unit; and $K_2=K$, and locations of the $K_2$ symbols are the same as those of the K symbols, or locations of the $K_2$ symbols are preset locations.

In this embodiment of this application, in the frequency hopping mode, two groups of DMRSs are transmitted in each of two frequency bands, to ensure accurate data demodulation when a channel status fluctuates relatively greatly.

Optionally, in an implementation of the first aspect, $M_1=M_2$, $K_1=K_2$, and locations of the $M_1$ symbols and the $K_1$ symbols in the first frequency band are symmetrical with locations of the $M_2$ symbols and the $K_2$ symbols in the second frequency band.

In this embodiment of this application, DMRSs in two frequency bands are symmetrically disposed, so that the receive end device can perform data demodulation in the two frequency bands in a same manner, thereby reducing demodulation complexity and improving network performance.

Optionally, in an implementation of the first aspect, the $M_2$ symbols include the $1^{st}$ symbol in the second frequency band.

The receive end may demodulate data only after the receive end obtains a DMRS. Therefore, in this embodiment of this application, the DMRS occupies the $1^{st}$ symbol in the second frequency band, so that the receive end device can first obtain the DMRS and perform rapid demodulation, thereby satisfying a rapid demodulation requirement.

It should be understood that, the locations of the $M_2$ symbols may be further any location in the second frequency band, and this embodiment of this application is not limited thereto.

For example, the locations of the $M_2$ symbols are in the first half part of the second frequency band, or the $1^{st}$ symbol of the $M_2$ symbols is located in the first half part of the second frequency band. For example, $M_{2=2}$, the two symbols may be the $2^{nd}$ symbol and the $3^{rd}$ symbol or the $3^{rd}$ symbol and the $4^{th}$ symbol in the second frequency band, and this embodiment of this application is not limited thereto.

Optionally, in an implementation of the first aspect, the DMRS in the preset DMRS pattern further occupies P consecutive symbols in the one resource scheduling unit without frequency hopping, where the P symbols are adjacent to neither the M symbols nor the K symbols; and the DMRS in the DMRS pattern corresponding to the current mode further occupies $P_1$ consecutive symbols of the symbols in the first frequency band, and $P_2$ consecutive symbols in the second frequency band, where the $P_1$ symbols are adjacent to neither the $M_1$ symbols nor the $K_1$ symbols, the $P_2$ symbols are adjacent to neither the $M_2$ symbols nor the $K_2$ symbols, and P, $P_1$, and $P_2$ are integers greater than or equal to 1.

In this embodiment of this application, in the frequency hopping mode, three groups of DMRSs are transmitted in each of two frequency bands, to ensure accurate data demodulation when a channel status fluctuates relatively greatly.

It should be understood that, the DMRS in the preset DMRS pattern in this embodiment of this application may occupy L groups of symbols, where L may be 2, 3, 4, or a larger value. Similarly, in the frequency hopping mode, the DMRS in the DMRS pattern corresponding to the current mode occupies L groups of symbols in each frequency band.

Optionally, in an implementation of the first aspect, the current mode is the aggregation mode, a quantity of the plurality of resource scheduling units is Y, and Y is an integer greater than or equal to 2;

the DMRS in the preset DMRS pattern occupies at least one consecutive symbol in each of the Y resource scheduling units; and the DMRS in the DMRS pattern corresponding to the current mode occupies at least one consecutive symbol in each of the first $Y_1$ resource scheduling units of the Y resource scheduling units, where $Y_1$ is an integer greater than or equal to 1 and less than Y.

In this embodiment of this application, in the aggregation mode, the DMRS occupies only symbols in the first $Y_1$ resource scheduling units of the Y resource scheduling units in aggregation transmission, thereby reducing resources occupied by the DMRS, avoiding resource waste, and improving network performance.

Optionally, in an implementation of the first aspect, the current mode is the aggregation mode, and a quantity of the plurality of resource scheduling units is Y; the DMRS in the preset DMRS pattern occupies L groups of symbols in each of the Y resource scheduling units, where L is an integer greater than or equal to 2, the L groups of symbols are not adjacent to each other, and each of the L groups of symbols includes at least one consecutive symbol; and the DMRS in the DMRS pattern corresponding to the current mode occupies $L_1$ groups of symbols in each of the Y resource scheduling units, where $L_1$ is an integer less than L, the $L_1$ groups of symbols are not adjacent to each other, and each of the $L_1$ groups of symbols includes at least one consecutive symbol.

In this embodiment of this application, in the aggregation mode, the DMRS occupies only the $L_1$ groups of symbols in each of the Y resource scheduling units in aggregation transmission, thereby reducing resources occupied by the DMRS, avoiding resource waste, and improving network performance.

Optionally, in an implementation of the first aspect, the current mode is the aggregation mode, and a quantity of the plurality of resource scheduling units is Y; the DMRS in the preset DMRS pattern occupies L groups of symbols in each of the Y resource scheduling units, and the DMRS in the DMRS pattern corresponding to the current mode occupies L groups of symbols in each of the Y resource scheduling units, where L is an integer greater than or equal to 2, the L groups of symbols are not adjacent to each other, and each of the L groups of symbols includes at least one consecutive symbol; and a maximum difference between spacings between any two neighboring groups of symbols of the Y*L groups of symbols occupied by the DMRS in the preset DMRS pattern is R symbols, and a maximum difference between spacings between any two neighboring groups of symbols of the Y*L groups of symbols occupied by the DMRS in the DMRS pattern corresponding to the current mode is S symbols, where S<R.

Therefore, in this embodiment of this application, in the aggregation mode, the symbols that are in the Y resource scheduling units in aggregation transmission and that are occupied by the DMRS are distributed relatively uniformly, thereby improving demodulation performance, avoiding resource waste, and improving network performance.

It should be understood that, a quantity of symbols in one group of symbols occupied by the DMRS is not limited herein, and the one group of symbols may include at least one symbol, for example, include one symbol, two symbols, or three symbols. This embodiment of this application is not limited thereto.

According to a second aspect, a DMRS transmission method is provided. The method includes: determining, by a communications device by using indication information of additional DMRS, a DMRS pattern corresponding to a frequency hopping mode, where the additional DMRS is DMRS located after a front-loaded DMRS, the indication information is used to indicate at least one of the following: whether an additional DMRS exists, a quantity of additional DMRSs, and a location of the an additional DMRS, and the frequency hopping mode indicates that some symbols in one resource scheduling unit are located in a first frequency band and some other symbols are located in a second frequency band; and performing, by the communications device, DMRS mapping or demapping by using the DMRS pattern.

It should be noted that, in NR, if only the first half part has a DMRS, and the second half part has no pilot after frequency hopping, data cannot be normally demodulated. If frequency hopping is considered, and a DMRS is designed independently for the second half part, DMRS design complexity is increased, and system implementation complexity is increased.

In this embodiment of this application, the DMRS pattern corresponding to the frequency hopping mode can be flexibly determined based on a parameter existing in a system, that is, the indication information of the additional DMRS, thereby reducing implementation complexity and improving system performance.

Optionally, in an implementation, when the indication information is used to indicate that the additional DMRS do not exist, a DMRS in the DMRS pattern occupies one sequence of symbols in the first frequency band and one sequence of symbols in the second frequency band, where one sequence of symbols includes at least one consecutive symbol.

Optionally, in an implementation, the one sequence of symbols in the first frequency band includes the Pt symbol in a first area in the first frequency band, and the first area includes symbols occupied by data and the DMRS.

Optionally, in an implementation, the one sequence of symbols in the second frequency band includes the $1^{st}$ symbol in the second frequency band.

Optionally, in an implementation, when the indication information is used to indicate that the additional DMRS exists, a quantity of sequences and locations of the symbols in the first frequency band that are occupied by a DMRS in the DMRS pattern and a quantity of sequences and locations of the symbols in the second frequency band that are occupied by the DMRS in the DMRS pattern are the same as a quantity of sequences and locations indicated by the indication information and a quantity of sequences and locations indicated by indication information of the front-loaded DMRS.

For example, a quantity of sequences and locations of the symbols in the first frequency band that are occupied by a DMRS are the same as a quantity of DMRSs sequences and locations indicated by indication information of the front-loaded DMRS, and a quantity of sequences and the locations of the symbols in the first frequency band that are occupied by the DMRS are the same as a quantity of DMRSs sequences and locations indicated by the indication information of the additional DMRS.

Optionally, in an implementation, when the indication information is used to indicate that the additional DMRS exists, a DMRS in the DMRS pattern occupies two inconsecutive sequences of symbols in the first frequency band and two inconsecutive sequences of symbols in the second frequency band; a DMRS in the DMRS pattern occupies two inconsecutive sequences of symbols in the first frequency band and one sequence of symbols in the second frequency band; or a DMRS in the DMRS pattern occupies one sequence of symbols in the first frequency band and two inconsecutive sequences of symbols in the second frequency band, where each of the two sequences of symbols includes at least one consecutive symbol, and the one sequence of symbols includes at least one consecutive symbol.

Optionally, in an implementation, when the DMRS in the DMRS pattern occupies two inconsecutive sequences of symbols in the first frequency band, the latter sequence of symbols of the two sequences of symbols in the first frequency band includes the last symbol in the first frequency band; or when the DMRS in the DMRS pattern occupies two inconsecutive sequences of symbols in the second frequency band, the former sequence of symbols of the two sequences of symbols in the second frequency band includes the $1^{st}$ symbol in the second frequency band.

According to a third aspect, a communications device is provided. The communications device is configured to perform the method according to the first aspect, the second aspect, or any possible implementation of the first aspect and the second aspect. Specifically, the communications device includes units configured to perform the foregoing method.

According to a fourth aspect, a communications device is provided. The communications device includes a processor and a memory, the memory is configured to store a computer program, and the processor is configured to execute the computer program stored in the memory, to perform the method according to the first aspect, the second aspect, or any possible implementation of the first aspect and the second aspect.

According to a fifth aspect, a computer readable medium is provided. The computer readable medium stores a computer program, and when the computer program is executed by a computer, the method according to the first aspect, the second aspect, or any possible implementation of the first aspect and the second aspect is implemented.

According to a sixth aspect, a computer program product is provided. When the computer program product is executed by a computer, the method according to the first aspect, the second aspect, or any possible implementation of the first aspect and the second aspect is implemented.

According to a seventh aspect, a processing apparatus is provided. The processing apparatus includes a processor and an interface; and the processor is configured to perform the method according to the first aspect, the second aspect, or any possible implementation of the first aspect and the second aspect.

It should be understood that, the processing apparatus according to the seventh aspect may be a chip, and the processor may be implemented by using hardware or may be implemented by using software. When the processor is implemented by using hardware, the processor may be a logic circuit, an integrated circuit, or the like; or when the processor is implemented by using software, the processor may be a general purpose processor and be implemented by reading software code stored in a memory, and the memory may be integrated in the processor, or may be located out of the processor and exist independently.

BRIEF DESCRIPTION OF DRAWINGS

FIG. 1 is a schematic block diagram of a communications system to which an embodiment of this application is applicable;

FIG. 2 is a schematic flowchart of a DMRS transmission method according to an embodiment of this application;

DESCRIPTION OF EMBODIMENTS

Figure 3:
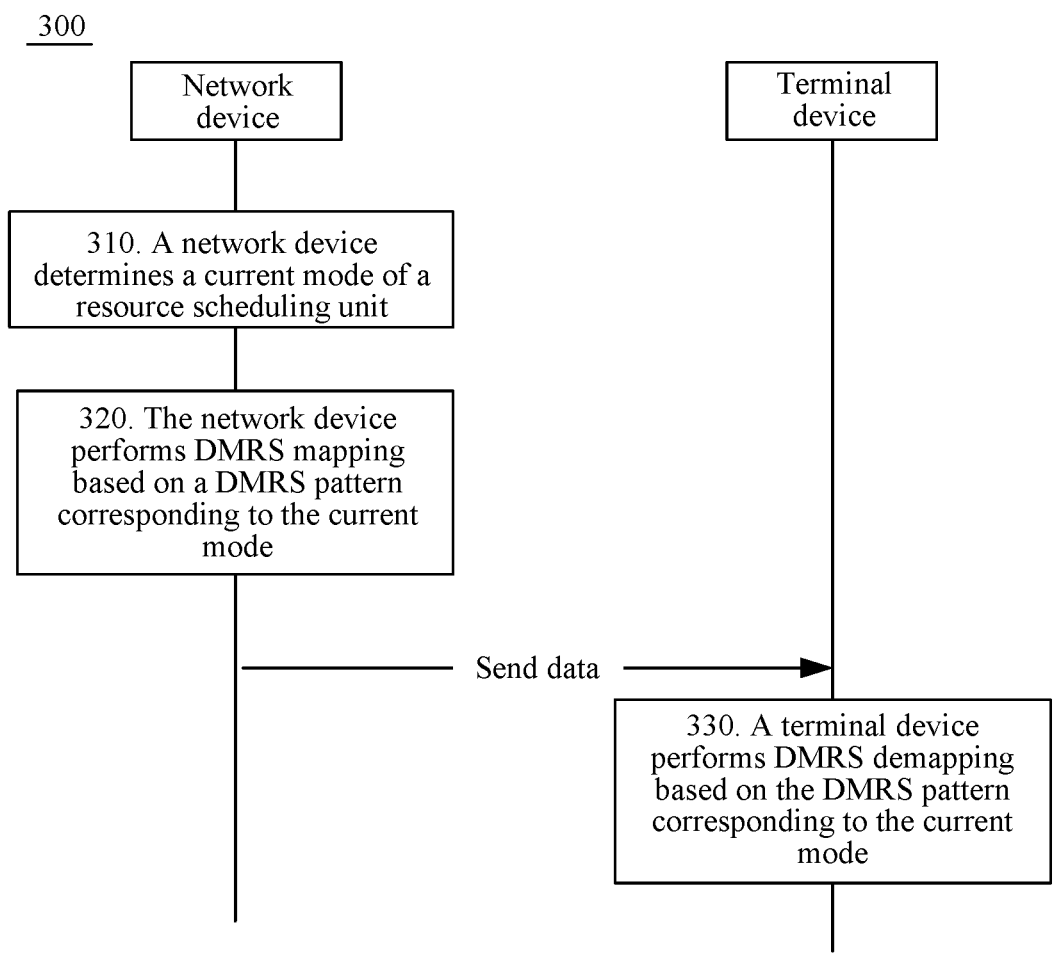
FIG. 3 is a schematic flowchart of a DMRS transmission method according to another embodiment of this application.

The following describes the technical solutions of this application with reference to the accompanying drawings.

The embodiments of this application may be applied to various communications systems. Therefore, the following descriptions are not limited to a particular communications system. For example, the embodiments of this application may be applied to a global system for mobile communications (GSM) system, a code division multiple access (CDMA) system, a wideband code division multiple access (WCDMA) system, a general packet radio service (GPRS), a Long Term Evolution (LTE) system, an LTE frequency division duplex (FDD) system, an LTE time division duplex (TDD), a universal mobile telecommunications system (UMTS), a wireless local area network (WLAN), wireless fidelity (Wi-Fi), and a next generation communications system, that is, a 5th generation (5G) communications system, such as, a new radio (NR) system.

In the embodiments of this application, a network device may be a base transceiver station (BTS) in global system for mobile communications (GSM) or code division multiple access (CDMA), may be a NodeB (NB) in wideband code division multiple access (WCDMA), or may be an evolved node B (eNB/eNodeB) in long term evolution (LTE), a relay station, an access point, or a network side device in a future 5G network, for example, a transmission point (TRP or TP) in an NR system, a gNB in an NR system, or a radio frequency unit in an NR system such as a remote radio unit or one antenna panel or one group (including a plurality of antenna panels) of antenna panels of a base station in a 5G system. Different network devices may be located in a same cell, or may be located in different cells. This is not specifically limited herein.

The terminal device in the embodiments of this application may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, an unmanned aerial vehicle device, or a terminal device in a future 5G network.

FIG. 1 is a schematic diagram of a communications system using a data transmission method of the present disclosure. The communications system may be any communications system, such as those described above. As shown in FIG. 1, the communications system 100 includes a network side device 102, and the network side device 102 may include a plurality of antenna groups. Each antenna group may include a plurality of antennas. For example, an antenna group may include antennas 104 and 106, another antenna group may include antennas 108 and 110, and an additional group may include antennas 112 and 114. For each antenna group, two antennas are shown in FIG. 1. However, more or fewer antennas may be used for each group. The network side device 102 may additionally include a transmitter chain and a receiver chain, and a person of ordinary skill in the art may understand that both the transmitter chain and the receiver chain may include a plurality of components (for example, a processor, a modulator, a multiplexer, a demodulator, a demultiplexer, and an antenna) related to signal sending and receiving.

The network side device 102 may communicate with a plurality of terminal devices (for example, a terminal device 116 and a terminal device 122). However, it can be understood that the network side device 102 may communicate with any quantity of terminal devices similar to the terminal device 116 or 122. The terminal devices 116 and 122 may be, for example, a cellular phone, a smartphone, a portable computer, a handheld communications device, a handheld computing device, a satellite radio apparatus, a global positioning system, a PDA, and/or any other suitable devices used for communication in the wireless communications system 100.

As shown in FIG. 1, the terminal device 116 communicates with the antennas 112 and 114, where the antennas 112 and 114 send information to the terminal device 116 through a forward link 118, and receive information from the terminal device 116 through a reverse link 120. Moreover, the terminal device 122 communicates with the antennas 104 and 106, where the antennas 104 and 106 send information to the terminal device 122 through a forward link 124, and receive information from the terminal device 122 through a reverse link 126.

For example, in a frequency division duplex (FDD) system, the forward link 118 may use a frequency band different from a frequency band used by the reverse link 120, and the forward link 124 may use a frequency band different from a frequency band used by the reverse link 126.

For another example, in a time division duplex (TDD) system and a full duplex system, the forward link 118 and the reverse link 120 may use a same frequency band, and the forward link 124 and the reverse link 126 may use a same frequency band.

Each group of antennas and/or each area designed for communication is referred to as a sector of the network side device 102. For example, an antenna group may be designed to communicate with a terminal device in a sector of a coverage area of the network side device 102. In a process in which the network side device 102 communicates with the terminal devices 116 and 122 respectively through the forward links 118 and 124, a transmit antenna of the network side device 102 may improve signal-to-noise ratios of the forward links 118 and 124 through beamforming. In addition, compared with a manner in which a network side device sends signals to all terminal devices of the network side device by using a single antenna, when the network side device 102 sends, through beamforming, signals to the terminal devices 116 and 122 that are randomly dispersed in a related coverage area, a mobile device in a neighboring cell suffers less interference.

In a given time, the network side device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain (for example, generate, receive from another communications apparatus, or store in a memory) a specific quantity of data bits that need to be sent to the wireless communications receiving apparatus through a channel. The data bits may be included in a transport block (or a plurality of transport blocks) of data, and the transport block may be segmented to produce a plurality of code blocks.

To make the embodiments of the present disclosure more understandable, a DMRS transmission process in implementation of the present disclosure is first described below, and these descriptions should not be considered as a limitation on the protection scope required by the present disclosure.

Specifically, a transmit end device (which is, for example, a network device during downlink transmission or a terminal device during uplink transmission) sends, based on a DMRS pattern, a DMRS and data that are precoded. In this way, after receiving information sent by the transmit end device, a receive end device may obtain the DMRS based on the DMRS pattern, and demodulate the data based on the DMRS, to obtain the data.

During actual application, both the transmit end device and the receive end device need to learn a location of a symbol occupied by the DMRS. To be specific, to enable the receive end device to accurately demodulate the data, the transmit end device and the receive end device need to communicate with each other by using the same DMRS pattern. Specifically, the transmit end device maps the DMRS based on the DMRS pattern, and the receive end device demaps the DMRS based on the DMRS pattern.

The embodiments of this application mainly relate to a DMRS pattern based on which a communications device (a network device or a terminal device) performs DMRS mapping or demapping. A DMRS transmission method according to an embodiment of this application is described in detail below with reference to an accompanying drawing.

FIG. 2 is a schematic flowchart of a DMRS transmission method according to an embodiment of this application. The method 200 shown in FIG. 2 may be applied to any communications system described above. The method shown in FIG. 2 may be performed by a communications device, the communications device may be a network device or a terminal device, the network device may be any network device described above, the terminal device may be any terminal device described above, and this embodiment of this application is not limited thereto. Specifically, the method 200 shown in FIG. 2 includes the following steps.

210. A communications device determines a current mode of a resource scheduling unit, where the current mode is a frequency hopping mode or an aggregation mode, the frequency hopping mode indicates that some symbols in one resource scheduling unit are located in a first frequency band and some other symbols are located in a second frequency band, and the aggregation mode indicates aggregation transmission of a plurality of resource scheduling units.

It should be understood that, in this embodiment of this application, a symbol indicates a time unit, the symbol herein may alternatively be referred to as an OFDM symbol, and this embodiment of this application is not limited thereto.

It should be further understood that, one resource unit in this embodiment of this application may include n symbols, where n is an integer greater than or equal to 2. For example, n is 7, 14, or any value of 2 to 13, and this embodiment of this application is not limited thereto.

It should be understood that, in this embodiment of this application, a DMRS pattern may alternatively be referred to as DMRS distribution information or a DMRS attribute, the DMRS pattern can indicate locations and a quantity of symbols occupied by a DMRS, and this embodiment of this application is not limited thereto.

220. The communications device performs DMRS mapping or demapping by using a DMRS pattern corresponding to the current mode, where a location of a symbol occupied by a DMRS in the DMRS pattern corresponding to the current mode is different from a location of a symbol occupied by a DMRS in a preset DMRS pattern.

It should be understood that, in this embodiment of this application, the DMRS pattern can indicate locations of symbols occupied by a DMRS, the DMRS pattern may alternatively be referred to as a DMRS location, a DMRS attribute, or data distribution information, and this embodiment of this application is not limited thereto.

It should be understood that, when sending data, the communications device performs DMRS mapping based on the DMRS pattern corresponding to the current mode, and when receiving data, the communications device performs DMRS demapping based on the DMRS pattern corresponding to the current mode.

For example, the communications device is a network device, and when performing uplink transmission, the communications device performs DMRS demapping by using the DMRS pattern corresponding to the current mode; and when performing downlink transmission, the communications device performs DMRS mapping by using the DMRS pattern corresponding to the current mode. For another example, the communications device is a terminal device, and when performing uplink transmission, the communications device performs DMRS mapping by using the DMRS pattern corresponding to the current mode; and when performing downlink transmission, the communications device performs DMRS demapping by using the DMRS pattern corresponding to the current mode.

It should be understood that, in this embodiment of this application, the preset DMRS pattern may alternatively be referred to as a predefined pattern, a default pattern, or a first DMRS pattern, and the DMRS pattern corresponding to the current mode may alternatively be referred to as a second DMRS pattern. In this embodiment of this application, the preset DMRS pattern indicates a DMRS pattern used in a first mode (that is, a non-frequency-hopping and non-aggregation mode).

In the prior art, communication is performed by using a preset DMRS pattern in any transmission mode. To be specific, a location of a symbol occupied by a DMRS is the same as a location of a symbol occupied by a DMRS in the preset DMRS pattern. However, in some application scenarios, when a mode of a resource scheduling unit is changed, if a DMRS is sent still in an existing manner of constantly transmitting the DMRS, because a distribution manner of DMRSs in a preset DMRS pattern has difficulty in satisfying requirements of different modes, an adverse effect such as DMRS resource waste or poor demodulation performance of a receive end is caused. As a result, network performance is affected.

However, the DMRS pattern in the current mode in this embodiment of this application is different from the preset pattern, and a location of a symbol occupied by a DMRS can be flexibly selected based on the different modes in this embodiment of this application. Therefore, requirements of the different modes can be satisfied in this embodiment of this application, thereby improving network performance.

Specific examples of a DMRS transmission method according to an embodiment of this application are described below with reference to FIG. 3 and FIG. 4 respectively.

FIG. 3 shows a DMRS transmission method according to an embodiment of this application, and FIG. 3 describes the DMRS transmission method during downlink transmission according to this embodiment of this application. Specifically, as shown in FIG. 3, the method 300 includes the following steps.

310. A network device determines a current mode of a resource scheduling unit.

Specifically, the network device may determine the current mode in a plurality of manners.

Optionally, in an implementation, the network device may determine the current mode based on channel state information reported by a terminal device and a network status of a cell.

Optionally, the network device may determine the current mode based on a waveform used by a terminal device, for example, a single-carrier waveform or a multi-carrier waveform. For example, when the terminal device uses the single-carrier waveform, the current mode may be a frequency hopping mode, and when the terminal device uses the multi-carrier waveform, the current mode may be an aggregation mode. This embodiment of this application is not limited thereto. For example, when the terminal device uses the single-carrier waveform, the current mode may alternatively be the aggregation mode.

Optionally, in another implementation, the network device may determine the current mode based on a service type. The service type may include a service requiring rapid demodulation, a service requiring high transmission performance, or the like.

Optionally, in another implementation, the network device may determine the current mode based on indication information sent by the terminal device. To be specific, the terminal device may determine the current mode based on a current status such as a network status or a service status, and then the terminal device indicates the current mode to the network device. In this case, the terminal device sends the indication information to the network device, so that the network device determines the current mode based on the indication information sent by the terminal device.

320. The network device performs DMRS mapping based on a DMRS pattern corresponding to the current mode.

Specifically, the network device maps a DMRS and data based on the DMRS pattern, and sends the DMRS and the data that are mapped.

In an implementation, the DMRS pattern corresponding to the current mode may be preset by a system. To be specific, the system may preset a correspondence between a mode of a resource scheduling unit and a DMRS pattern, and after determining a current mode, the network device and the terminal device may determine, based on the preset correspondence, a DMRS pattern corresponding to the current mode.

In another implementation, the network device may determine the corresponding DMRS pattern based on the current mode, and indicate the DMRS pattern corresponding to the current mode to the terminal device by using second indication information. For example, the network device may flexibly determine, based on a channel status corresponding to the current mode, a service requirement corresponding to the current mode, or the like, the DMRS pattern corresponding to the current mode, and this embodiment of this application is not limited thereto.

330. A terminal device performs DMRS demapping based on the DMRS pattern corresponding to the current mode.

After receiving data sent by the network device, the terminal device may perform DMRS demapping based on the DMRS pattern corresponding to the current mode, and demodulate the data based on a DMRS.

It should be understood that, before performing DMRS demapping, the terminal device needs to learn of the DMRS pattern used for DMRS mapping by the network device, that is, the DMRS pattern corresponding to the current mode.

In an implementation, the DMRS pattern corresponding to the current mode may be preset by a system. To be specific, the system may preset a correspondence between a mode of a resource scheduling unit and a DMRS pattern, and when determining a mode of a resource scheduling unit, the terminal device may determine, based on the preset correspondence, a DMRS pattern corresponding to the current mode. Specifically, the terminal device may determine the current mode in a plurality of manners.

Optionally, the terminal device may determine the current mode based on an indication of the network device. Specifically, the terminal device may receive first indication information sent by the network device, where the first indication information is used by the terminal device to determine the current mode. After obtaining the first indication information, the terminal device may determine the current mode of the resource scheduling unit according to the first indication information.

It should be understood that, the first indication information may directly indicate that the current mode is the aggregation mode or the frequency hopping mode. Optionally, the first indication information may indirectly indicate the current mode. For example, the first indication information indicates a length of the resource scheduling unit, and the terminal device may determine the current mode based on the length of the resource scheduling unit. For another example, the first indication information indicates a current service type, the terminal device determines the current mode based on the service type, and this embodiment of this application is not limited thereto.

It should be understood that, the network device may send the first indication information to the terminal device by using a plurality of types of signaling such as downlink control information downlink control information (DCI), radio resource control (RRC) signaling, and media access control (MAC) control element (CE). This is not limited in this embodiment of this application.

Optionally, the terminal device may determine the current mode based on a current status. For example, the terminal device determines the current mode based on a network status or a service status, and then the terminal device indicates the current mode to the network device.

Alternatively, in another implementation of determining the DMRS pattern, the terminal device determines, based on second indication information sent by the network device, the DMRS pattern corresponding to the current mode.

It should be understood that, the network device may send the second indication information to the terminal device by using a plurality of types of signaling such as DCI, RRC signaling, and a MAC CE. This is not limited in this embodiment of this application.

Specifically, because the network device needs to determine a DMRS pattern when the network device performs data transmission with the terminal device, the network device notifies the terminal device of a DMRS pattern used when the network device performs data transmission with the terminal device, and the terminal device may determine a time-frequency resource location of a DMRS based on the DMRS pattern, and then may perform DMRS mapping or demapping.

Figure 4:
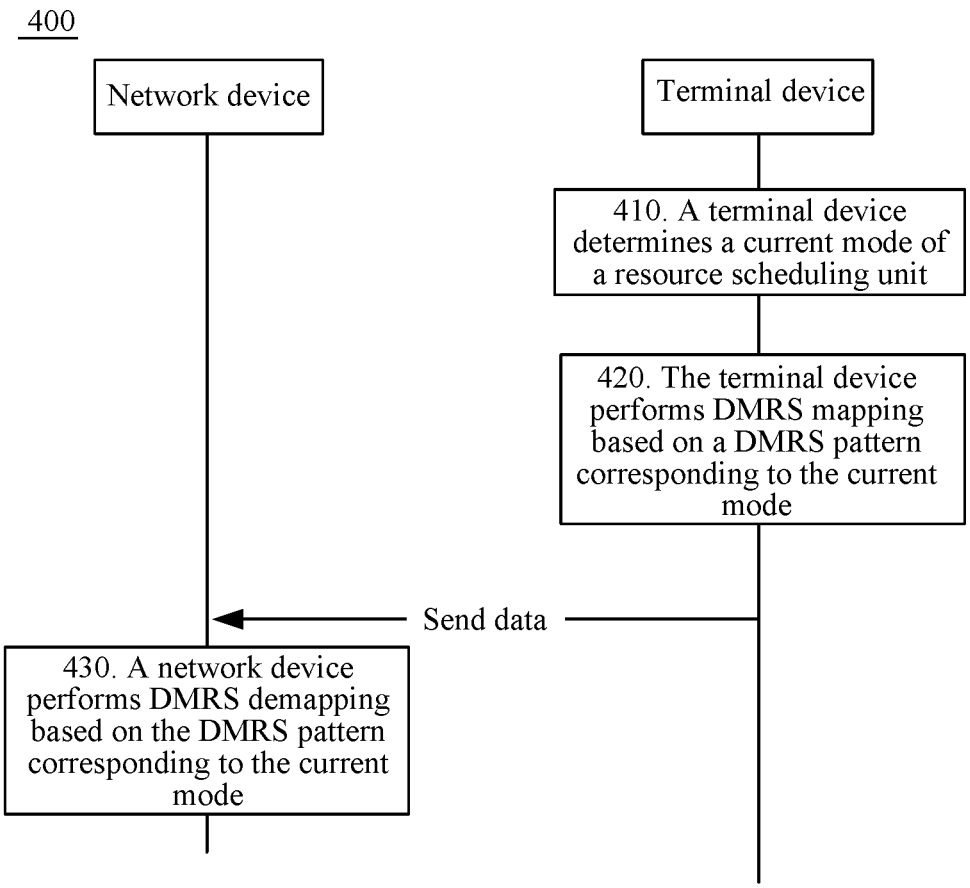
FIG. 4 is a schematic flowchart of a DMRS transmission method according to another embodiment of this application.

FIG. 4 shows a DMRS transmission method according to an embodiment of this application, and FIG. 4 describes the DMRS transmission method during uplink transmission according to this embodiment of this application. Specifically, as shown in FIG. 4, the method 400 includes the following steps.

410. A terminal device determines a current mode of a resource scheduling unit.

It should be understood that, step 410 is similar to a manner in which the terminal device determines the current mode in step 330 in FIG. 3. To avoid repetition, detailed descriptions are appropriately omitted herein.

Optionally, the terminal device may determine the current mode based on an indication of the network device. Specifically, the terminal device may receive first indication information sent by the network device, where the first indication information is used by the terminal device to determine the current mode. After obtaining the first indication information, the terminal device may determine the current mode of the resource scheduling unit according to the first indication information.

It should be understood that, the first indication information may directly indicate that the current mode is an aggregation mode or a frequency hopping mode. Optionally, the first indication information may indirectly indicate the current mode. For example, the first indication information indicates a length of the resource scheduling unit, and the terminal device may determine the current mode based on the length of the resource scheduling unit. For another example, the first indication information indicates a current service type, the terminal device determines the current mode based on the service type, and this embodiment of this application is not limited thereto.

It should be understood that, the network device may send the first indication information to the terminal device by using a plurality of types of signaling such as downlink control information (DCI), radio resource control (RRC) signaling, and media access control (MAC) control element (CE). This is not limited in this embodiment of this application.

Optionally, the terminal device may determine the current mode based on a current status. For example, the terminal device determines the current mode based on a network status or a service status, and then the terminal device indicates the current mode to the network device.

420. The terminal device performs DMRS mapping based on a DMRS pattern corresponding to the current mode.

Specifically, the terminal device first determines the DMRS pattern corresponding to the current mode, maps a DMRS and data based on the DMRS pattern, and sends the DMRS and the data that are mapped.

Specifically, a method for determining, by the terminal device, the DMRS pattern corresponding to the current mode in step 420 corresponds to a method for determining, by the terminal device, the DMRS pattern corresponding to the current mode in step 330 in FIG. 3. To avoid repetition, detailed descriptions are appropriately omitted herein.

In an implementation, the DMRS pattern corresponding to the current mode may be preset by a system. To be specific, the system may preset a correspondence between a mode of a resource scheduling unit and a DMRS pattern, and when determining a mode of a resource scheduling unit, the terminal device may determine, based on the preset correspondence, a DMRS pattern corresponding to the current mode. Specifically, the terminal device may determine the current mode in a plurality of manners.

Alternatively, in another implementation of determining the DMRS pattern, the terminal device determines, based on second indication information sent by the network device, the DMRS pattern corresponding to the current mode.

It should be understood that, the network device may send the second indication information to the terminal device by using a plurality of types of signaling such as DCI, RRC signaling, and a MAC CE. This is not limited in this embodiment of this application.

Specifically, because the network device needs to determine a DMRS pattern when the network device performs data transmission with the terminal device, the network device notifies the terminal device of a DMRS pattern used when the network device performs data transmission with the terminal device, and the terminal device may determine a time-frequency resource location of a DMRS based on the DMRS pattern, and then may perform DMRS mapping or demapping.

430. A network device performs DMRS demapping based on the DMRS pattern corresponding to the current mode.

After receiving data sent by the terminal device, the network device may perform DMRS demapping based on the DMRS pattern corresponding to the current mode, and demodulate the data based on a DMRS.

It should be understood that, before performing DMRS demapping, the network device needs to learn of the DMRS pattern used for DMRS mapping by the terminal device, that is, the DMRS pattern corresponding to the current mode.

It should be understood that, a method for determining, by the network device, the pattern corresponding to the current mode in step 430 corresponds to a method for determining, by the network device, the pattern corresponding to the current mode in step 320 in FIG. 3. To avoid repetition, detailed descriptions are appropriately omitted herein.

In an implementation, the DMRS pattern corresponding to the current mode may be preset by a system. To be specific, the system may preset a correspondence between a mode of a resource scheduling unit and a DMRS pattern, and after determining a current mode, the network device and the terminal device may determine, based on the preset correspondence, a DMRS pattern corresponding to the current mode.

In another implementation, the network device may determine the corresponding DMRS pattern based on the current mode, and indicate the DMRS pattern corresponding to the current mode to the terminal device by using second indication information. For example, the network device may flexibly determine, based on a channel status corresponding to the current mode, a service requirement corresponding to the current mode, or the like, the DMRS pattern corresponding to the current mode, and this embodiment of this application is not limited thereto.

Specifically, the network device may determine the current mode in a plurality of manners.

Optionally, in an implementation, the network device may determine the current mode based on channel state information reported by a terminal device and a network status of a cell.

Optionally, the network device may determine the current mode based on a waveform used by a terminal device, for example, a single-carrier waveform or a multi-carrier waveform. For example, when the terminal device uses the single-carrier waveform, the current mode may be the frequency hopping mode, and when the terminal device uses the multi-carrier waveform, the current mode may be the aggregation mode. This embodiment of this application is not limited thereto. For example, when the terminal device uses the single-carrier waveform, the current mode may alternatively be the aggregation mode.

Optionally, in another implementation, the network device may determine the current mode based on a service type. The service type may include a service requiring rapid demodulation, a service requiring high transmission performance, or the like.

Optionally, in another implementation, the network device may determine the current mode based on indication information sent by the terminal device. To be specific, the terminal device may determine the current mode based on a current status such as a network status or a service status, and then the terminal device indicates the current mode to the network device. In this case, the terminal device sends the indication information to the network device, so that the network device determines the current mode based on the indication information sent by the terminal device.

A specific form of DMRS transmission during uplink/downlink transmission in this embodiment of this application is described above, and a specific form of a DMRS pattern in an embodiment of this application is described in detail below with reference to an accompanying drawing.

Specifically, the preset DMRS pattern may include a plurality of situations, and detailed descriptions are made below by using examples.

Figure 5:
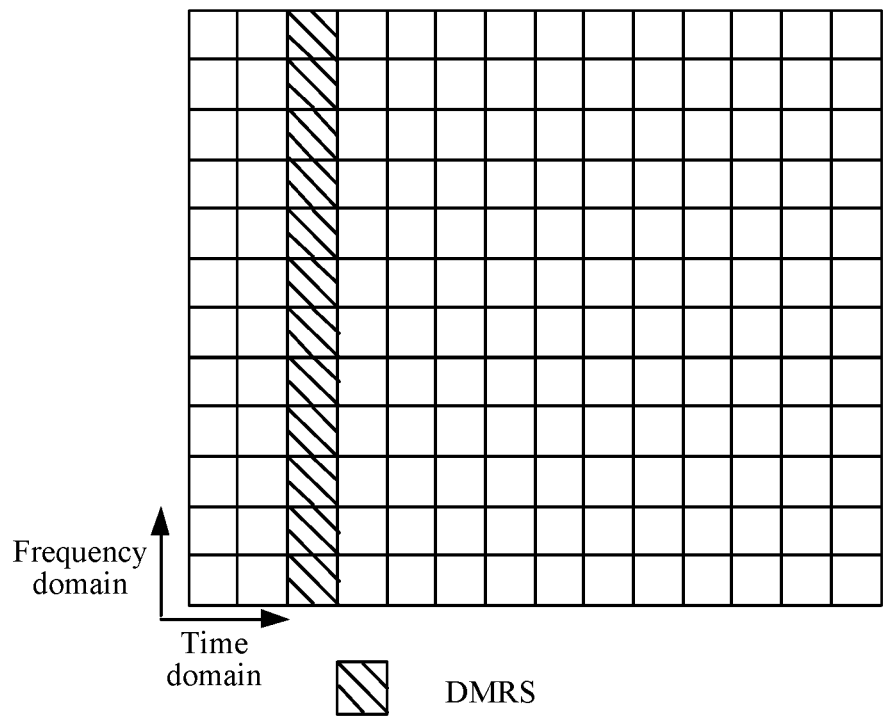
FIG. 5 is a schematic diagram of a preset DMRS pattern according to an embodiment of this application.

Situation 1: A preset pattern is a front-loaded pattern. As shown in FIG. 5, an example in which one resource scheduling unit occupies 14 symbols is used, and a DMRS occupies N consecutive symbols in one resource scheduling unit, where N is an integer greater than or equal to 1. FIG. 5 shows a case in which N=1. It should be understood that, the N consecutive symbols may alternatively be referred to as one group of symbols, the one group of symbols includes at least one (N) consecutive symbol, and this embodiment of this application is not limited thereto.

Figure 6:
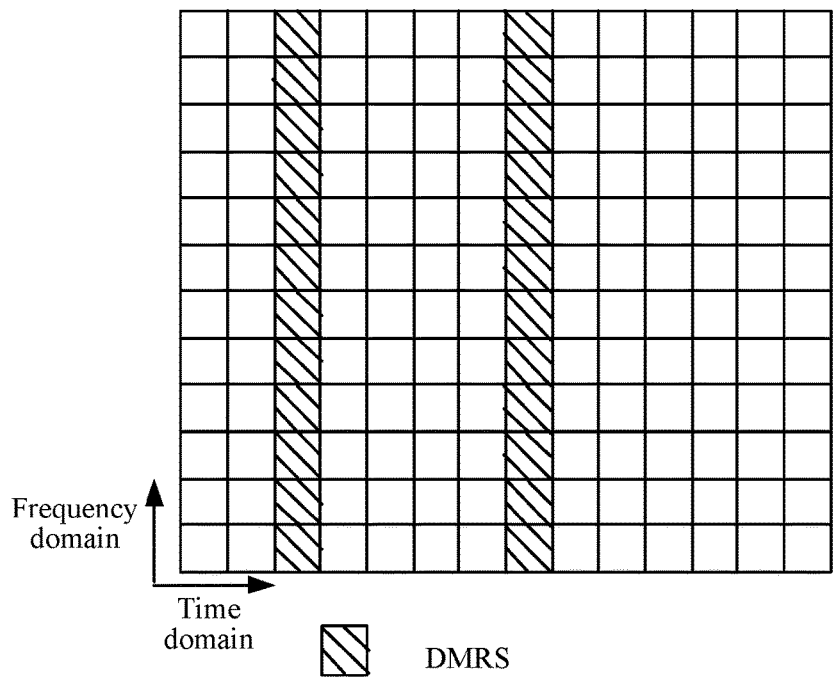
FIG. 6 is a schematic diagram of a preset DMRS pattern according to another embodiment of this application.

Situation 2: A preset pattern is an additional pattern. As shown in FIG. 6, an example in which one resource scheduling unit occupies 14 symbols is used, and a DMRS occupies L groups of symbols, where L is an integer greater than or equal to 2, the L groups of symbols are not adjacent to each other, and each of the L groups of symbols includes at least one consecutive symbol. In FIG. 6, an example in which L=2 is used. To be specific, a DMRS occupies M consecutive symbols and K consecutive symbols in one resource scheduling unit, where the M symbols are not adjacent to the K symbols, and M and K are integers greater than or equal to 1. FIG. 6 shows a situation in which M=1 and K=1, but this embodiment of the present disclosure is not limited thereto. For example, M and K may be further equal to 2, 3, or the like. Optionally, this embodiment of this application is not limited to a case in which a DMRS occupies two groups of symbols, and L may alternatively be equal to 3. To be specific, the DMRS further occupies P consecutive symbols in the one resource scheduling unit without frequency hopping. Optionally, L may be further equal to 4, 5, or the like.

It should be understood that, a DMRS occupies only one group of symbols in the situation 1, a DMRS occupies at least two groups of symbols in the situation 2, and the situation 1 and the situation 2 may correspond to different application scenarios. The situation 2 may correspond to a scenario in which a channel status fluctuates relatively greatly, for example, a scenario in which the terminal device moves rapidly, and in the situation 2, data is accurately demodulated by transmitting a plurality of groups of DMRSs. However, the situation 1 may correspond to a scenario in which a channel status is relatively stable, and therefore data may be accurately demodulated by transmitting one group of DMRSs.

The DMRS pattern corresponding to the current mode of this embodiment of this application is described in detail below with reference to the foregoing two situations respectively when the current mode is the frequency hopping mode or the aggregation mode.

Patterns of this embodiment of this application that correspond to the situation 1 and the situation 2 are first described when the current mode is the frequency hopping mode.

Figure 7:
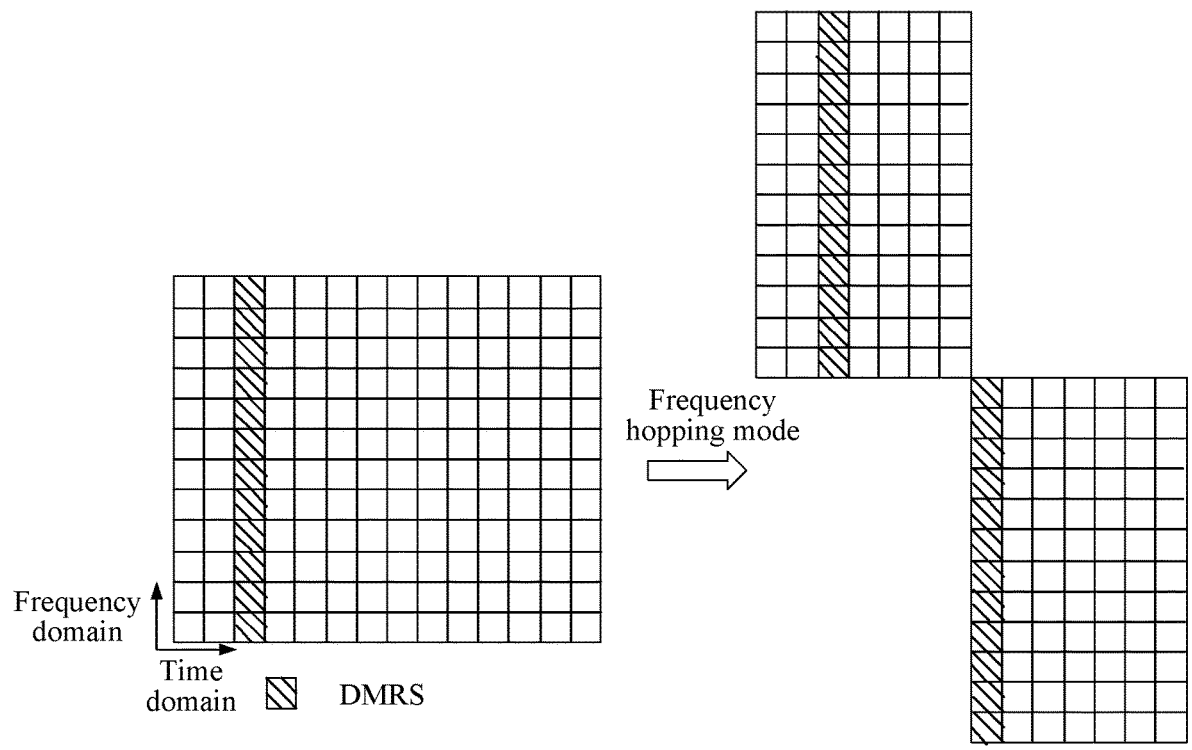
FIG. 7 is a schematic diagram of a DMRS pattern according to an embodiment of this application.

Specifically, when the current mode is the frequency hopping mode, for the foregoing situation 1, in this embodiment of this application, as shown in FIG. 7, the DMRS in the DMRS pattern corresponding to the current mode occupies $N_1$ consecutive symbols in the first frequency band and $N_2$ consecutive symbols in the second frequency band, where $N_1$ is an integer greater than or equal to 1, and $N_2$ is an integer greater than or equal to 1. FIG. 7 shows a case in which $N_1=1$ and $N_2=1$.

Figure 8:
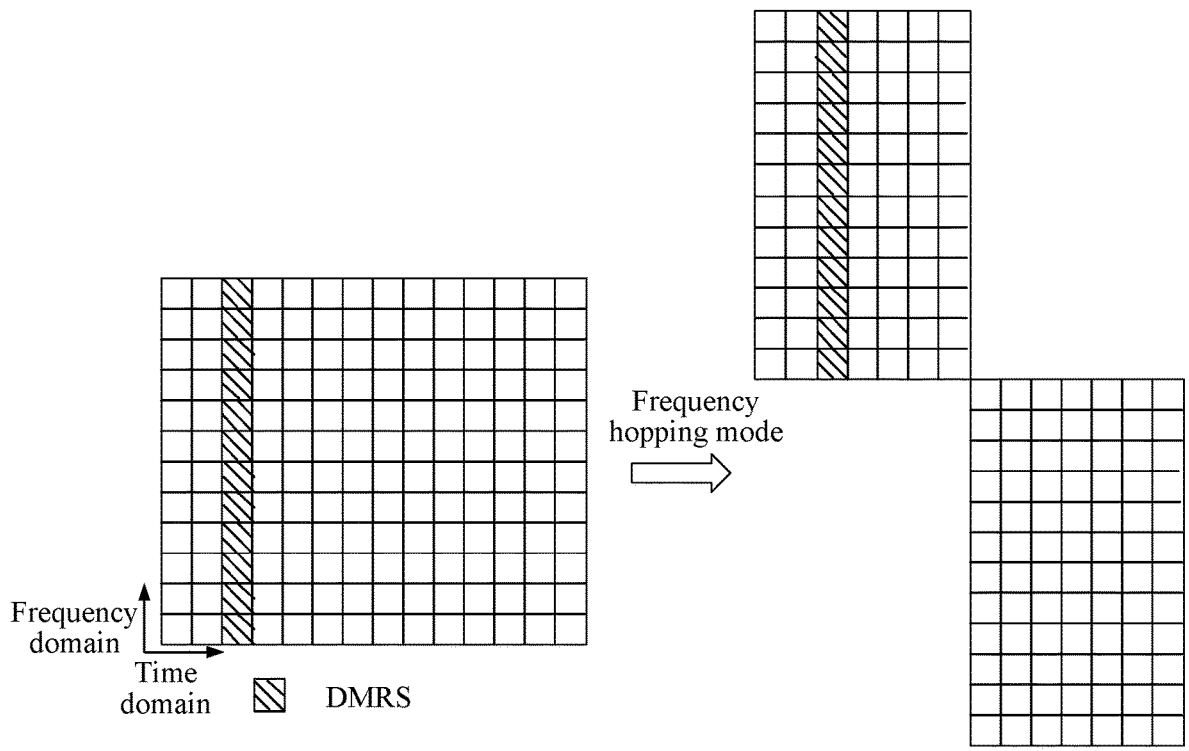
FIG. 8 is a schematic diagram of a DMRS pattern in the prior art.

FIG. 8 shows an existing manner in which a DMRS is transmitted still based on a location in a preset pattern shown in FIG. 5 in the frequency hopping mode. It may be learned from FIG. 8 that, a DMRS is transmitted in a first frequency band, and no DMRS is transmitted in a second frequency band. However, during actual application, a channel status corresponding to the second frequency band is usually different from a channel status corresponding to the first frequency band. Therefore, if data is demodulated based on only the DMRS transmitted in the first frequency band, accuracy of data demodulation in the second frequency band is affected, and network performance is affected.

However, in this embodiment of this application, in the frequency hopping mode, channel statuses of two frequency bands are different. Therefore, a DMRS is transmitted in each frequency band in this embodiment of this application, so that a receive end device can demodulate corresponding data based on the DMRS in the frequency band, thereby improving data demodulation accuracy and improving demodulation performance.

It should be understood that, the locations of the $N_2$ symbols may be any location in the second frequency band, and this embodiment of this application is not limited thereto.

Figure 9:
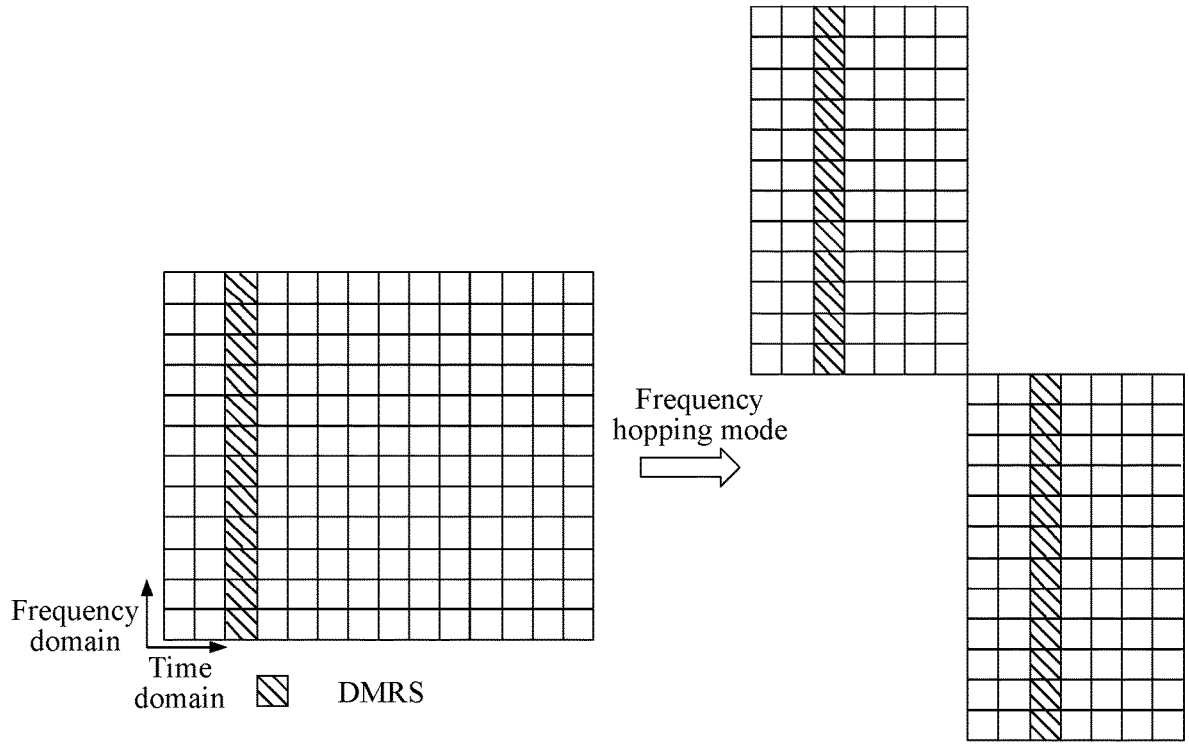
FIG. 9 is a schematic diagram of a DMRS pattern according to another embodiment of this application.

Optionally, in an embodiment, $N_1=N_2$, and locations of the $N_1$ symbols in the first frequency band are symmetrical with locations of the $N_2$ symbols in the second frequency band. For example, as shown in FIG. 9, $N_1=N_2=1$, and the location of the $N_1$ symbol and the location of the $N_2$ symbol are respectively the location of the $3^{rd}$ symbol in the first frequency band and the location of the $3^{rd}$ symbol in the second frequency band.

Therefore, in this embodiment of this application, DMRSs in two frequency bands are symmetrically disposed, so that the receive end device can perform data demodulation in the two frequency bands in a same manner, thereby reducing demodulation complexity and improving network performance.

Optionally, in another embodiment, $N_1=N_2=1$ or 2.

Optionally, the $N_1$ symbols include the 1st symbol in a first area in the first frequency band, and the first area includes symbols occupied by data and the DMRS.

Optionally, the $N_2$ symbols include the $1^{st}$ symbol in the second frequency band.

Optionally, in another embodiment, the $N_2$ symbols include the $1^{st}$ symbol in the second frequency band. For example, as shown in FIG. 7, $N_2=1$, and the DMRS occupies the $1^{st}$ symbol in the second frequency band. It should be understood that, FIG. 7 shows only a situation in which $N_2=1$, but this embodiment of this application is not limited thereto. When the DMRS occupies locations of a plurality of symbols in the second frequency band, the plurality of symbols are consecutively arranged from the $1^{st}$ symbol in the second frequency band. For example, when $N_2=2$, the DMRS occupies the $1^{st}$ symbol and the $2^{nd}$ symbol in the second frequency band.

The receive end device may demodulate data only after the receive end device obtains a DMRS. Therefore, in this embodiment of this application, the DMRS is set to occupy the $1^{st}$ symbol in the second frequency band, so that the receive end device can first obtain the DMRS, and then can rapidly demodulate the data.

It should be understood that, the locations of the $N_2$ symbols may be further any location in the second frequency band, and this embodiment of this application is not limited thereto.

For example, the locations of the $N_2$ symbols are in the first half part of the second frequency band, or the $1^{st}$ symbol of the $N_2$ symbols is located in the first half part of the second frequency band. For example, $N_2=2$, the two symbols may be the $2^{nd}$ symbol and the $3^{rd}$ symbol or the $3^{rd}$ symbol and the $4^{th}$ symbol in the second frequency band, and this embodiment of this application is not limited thereto.

Figure 10:
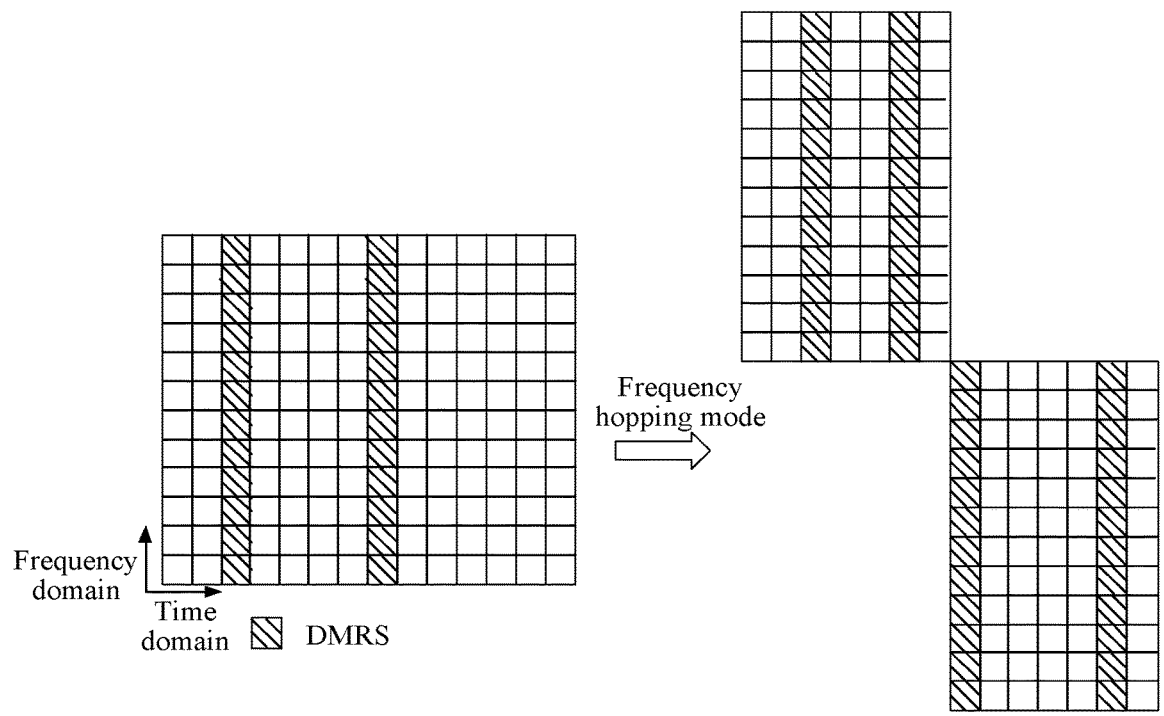
FIG. 10 is a schematic diagram of a DMRS pattern according to another embodiment of this application.

When the current mode is the frequency hopping mode, for a case of the additional pattern in the foregoing situation 2, in this embodiment of this application, as shown in FIG. 10, the DMRS in the DMRS pattern corresponding to the current mode occupies $M_1$ consecutive symbols and $K_1$ consecutive symbols of the symbols in the first frequency band, and $M_2$ consecutive symbols and $K_2$ consecutive symbols in the second frequency band, where the $M_1$ symbols are not adjacent to the $K_1$ symbols, the $M_2$ symbols are not adjacent to the $K_2$ symbols, and $M_1$, $K_1$, $M_2$, and $K_2$ are integers greater than or equal to 1. FIG. 10 shows a case in which each of $M_1$, $K_1$, $M_2$, and $K_2$ is equal to 1.

Optionally, the foregoing describes a case in which if two sequences of DMRSs exist before frequency hopping, two sequences of DMRSs exist in each of the former frequency band and the latter frequency band after frequency hopping, but this embodiment of this application is not limited thereto. For example, provided that more than one sequence of DMRS exists before frequency hopping, this embodiment of this application may be of any one of the following three kinds of type 2 after frequency hopping. For details, refer to the following description for type 2.

Figure 11:
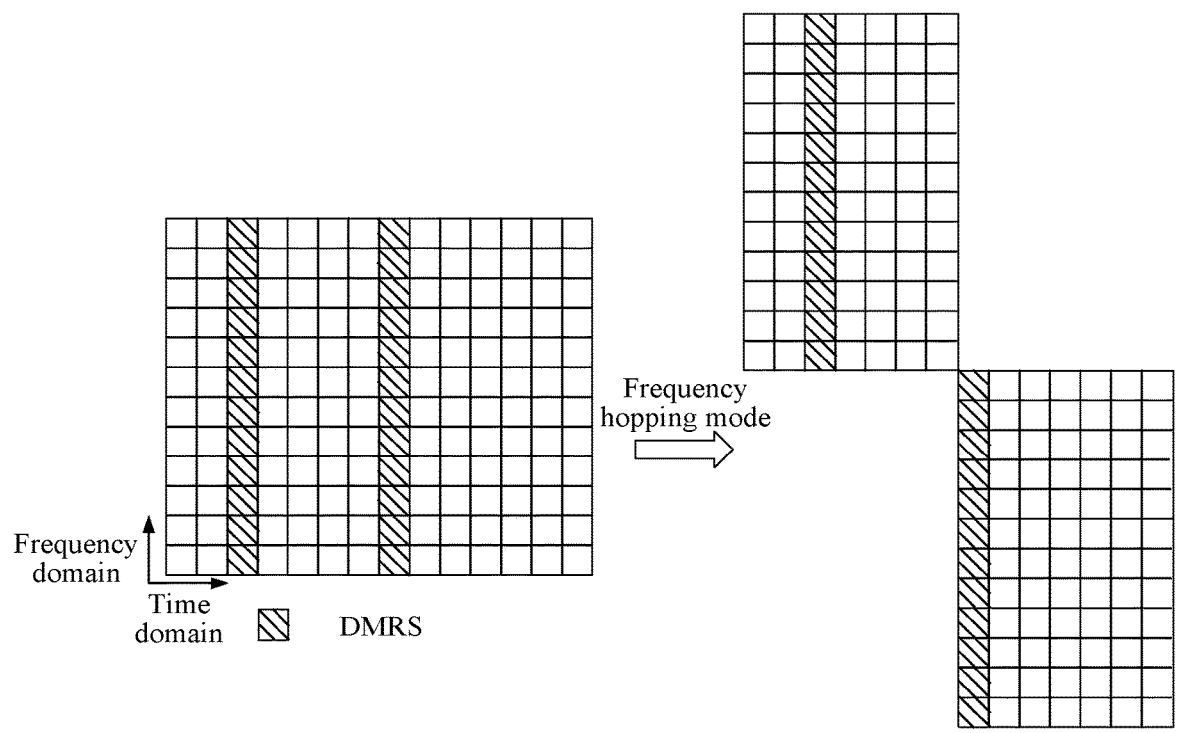
FIG. 11 is a schematic diagram of another DMRS pattern in the prior art.

FIG. 11 shows an existing manner in which a DMRS is transmitted still based on a location in a preset pattern shown in FIG. 6 in the frequency hopping mode. It may be learned from FIG. 11 that, one group of DMRSs is transmitted in each of the first frequency band and the second frequency band. However, in a scenario in the foregoing situation 2, because a channel status fluctuates relatively greatly, it is difficult to ensure accurate data demodulation if only one group of DMRSs is transmitted in one frequency band.

However, in this embodiment of this application, in the frequency hopping mode, a plurality of groups (L groups) of DMRSs are transmitted in each of two frequency bands, to ensure accurate data demodulation when a channel status fluctuates relatively greatly.

It should be understood that, FIG. 6 describes a case in which in two groups of symbols occupied by the DMRS in the preset additional pattern, the first group of symbols is located in the first half part of a resource scheduling unit, and the second group of symbols is located in the second half part of the resource scheduling unit. However, this embodiment of the present disclosure is not limited thereto. For example, the additional pattern in FIG. 6 may evolve into a pattern in which each of the two groups of occupied symbols may be located in the first half part of the resource scheduling unit. For example, the DMRS in the preset additional pattern occupies the $3^{rd}$ symbol and the $6^{th}$ symbol. Therefore, in this case, the pattern in the frequency hopping mode in the existing manner shown in FIG. 11 may evolve into a pattern in which two groups of DMRSs are transmitted in the first frequency band. For example, the DMRS is transmitted in the $3^{rd}$ symbol and the $6^{th}$ symbol in the first frequency band, and the DMRS is not transmitted in the second frequency band. In this case, because the DMRS is not transmitted in the second frequency band, accuracy of data demodulation in the second frequency band is affected, and network performance is affected.

However, in this embodiment of this application, in the frequency hopping mode, channel statuses of two frequency bands are different. Therefore, a DMRS is transmitted in each frequency band in this embodiment of this application, so that a receive end device can demodulate corresponding data based on the DMRS in the frequency band, thereby improving data demodulation accuracy and improving demodulation performance.

It should be understood that, locations of symbols occupied by DMRSs in the first frequency band and the second frequency band are not limited in this embodiment of this application. Provided that each frequency band includes L groups of DMRSs, this is not limited in this embodiment of this application.

Figure 12:
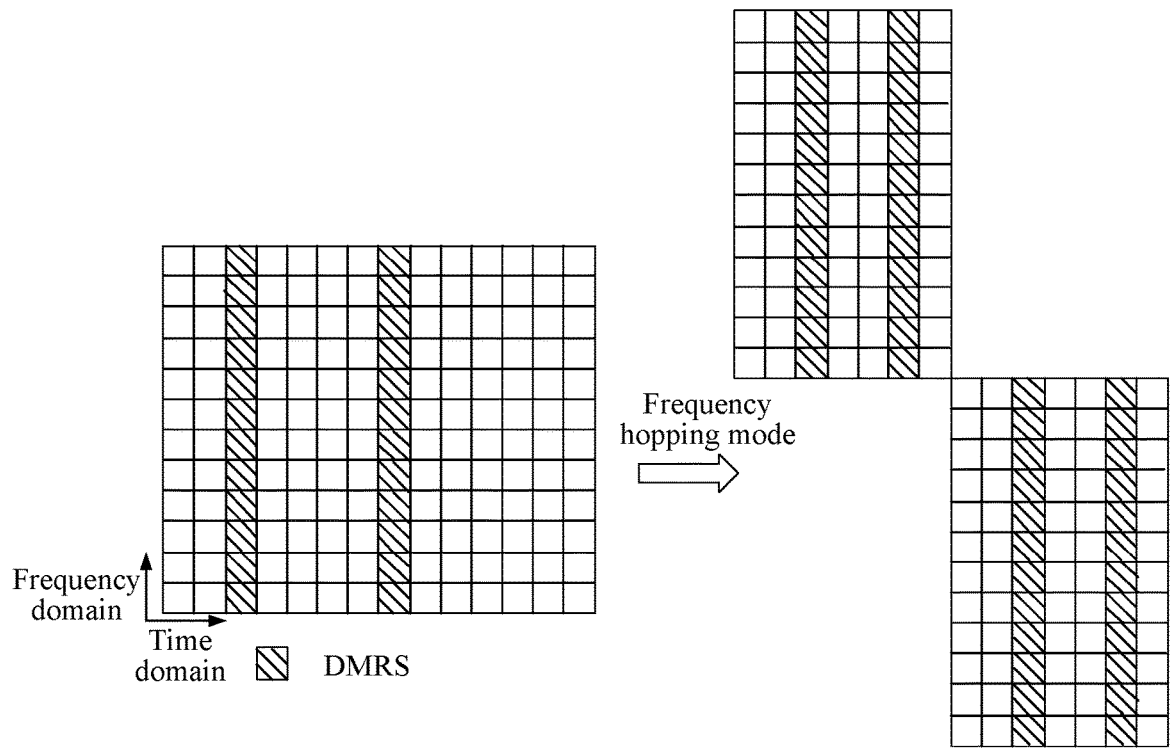
FIG. 12 is a schematic diagram of a DMRS pattern according to another embodiment of this application.

Optionally, in another embodiment, $M_1=M_2$, $K_1=K_2$, and locations of the $M_1$ symbols and the $K_1$ symbols in the first frequency band are symmetrical with locations of the $M_2$ symbols and the $K_2$ symbols in the second frequency band. For example, as shown in FIG. 12, $M_1=M_2=1$, $K_1=K_2=1$, and each DMRS occupies locations of the $3^{rd}$ symbol and the $6^{th}$ symbol in the first frequency band and the second frequency band.

In this embodiment of this application, DMRSs in two frequency bands are symmetrically disposed, so that the receive end device can perform data demodulation in the two frequency bands in a same manner, thereby reducing demodulation complexity and improving network performance.

Optionally, in another embodiment, the $M_2$ symbols include the $1^{st}$ symbol in the second frequency band. For example, as shown in FIG. 10, $M_2=1$, and $M_2$ corresponds to the $1^{st}$ symbol in the second frequency band. It should be understood that, FIG. 10 shows only a situation in which $M_2=1$, but this embodiment of this application is not limited thereto. When the DMRS occupies locations of a plurality of symbols in the second frequency band, the plurality of symbols are consecutively arranged from the $1^{st}$ symbol in the second frequency band. For example, when $M_2=2$, the DMRS occupies the $1^{st}$ symbol and the $2^{nd}$ symbol in the second frequency band.

The receive end may demodulate data only after the receive end device obtains a DMRS. Therefore, in this embodiment of this application, the DMRS occupies the $1^{st}$ symbol in the second frequency band, so that the receive end device can first obtain the DMRS and perform rapid demodulation, thereby satisfying a rapid demodulation requirement.

It should be understood that, the locations of the $M_2$ symbols may be further any location in the second frequency band, and this embodiment of this application is not limited thereto.

For example, the locations of the $M_2$ symbols are in the first half part of the second frequency band, or the $1^{st}$ symbol of the $M_2$ symbols is located in the first half part of the second frequency band. For example, $M_2=2$, the two symbols may be the $2^{nd}$ symbol and the $3^{rd}$ symbol or the $3^{rd}$ symbol and the $4^{th}$ symbol in the second frequency band, and this embodiment of this application is not limited thereto.

Optionally, in another embodiment, $M_1=M_2=1$ or 2, and $K_1=K_2=1$ or 2.

Optionally, the $K_1$ symbols include the last symbol, the penultimate symbol, or the antepenultimate symbol in the first frequency band.

Optionally, in another embodiment, the $M_1$ symbols include the $1^{st}$ symbol in a first area in the first frequency band, and the first area includes symbols occupied by the data and the DMRS.

Optionally, in another embodiment, the $M_2$ symbols include the $1^{st}$ symbol in the second frequency band.

Optionally, in another embodiment, $M_1=M$, and locations of the $M_1$ symbols are the same as those of the M symbols; the $K_1$ symbols include the last symbol in the first frequency band; the $M_2$ symbols include the $1^{st}$ symbol in the first frequency band; and $K_2=K$, and locations of the $K_2$ symbols are the same as those of the K symbols, or locations of the $K_2$ symbols are preset locations.

Optionally, in another embodiment, $M_1=M$, and locations of the $M_1$ symbols are the same as those of the M symbols; the $K_1$ symbols include the $7^{th}$ symbol in the entire resource scheduling unit, the entire resource scheduling unit includes a sum of the symbols occupied in the first frequency band and the symbols occupied in the second frequency band, and the entire resource scheduling unit includes 14 symbols; the $M_2$ symbols include the $8^{th}$ symbol in the entire resource scheduling unit; and $K_2=K$, and locations of the $K_2$ symbols are the same as those of the K symbols, or locations of the $K_2$ symbols are preset locations.

Figure 13:
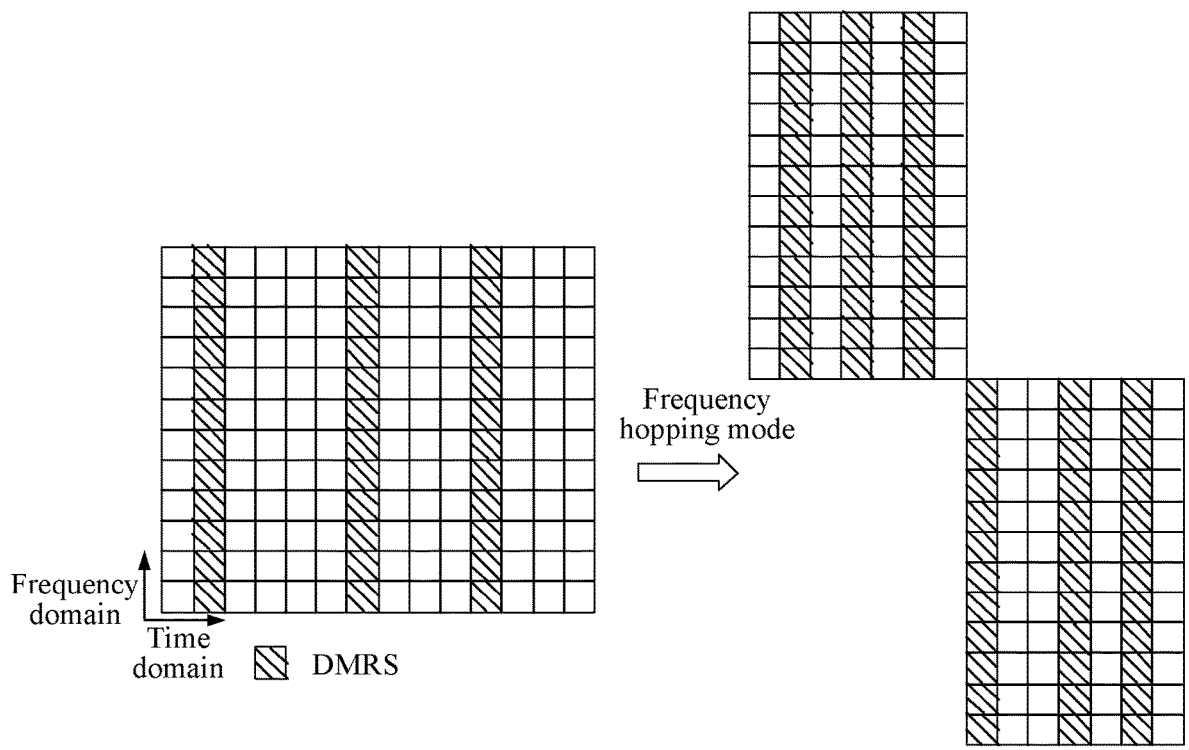
FIG. 13 is a schematic diagram of a DMRS pattern according to another embodiment of this application.

It should be understood that, for the foregoing situation 2, the foregoing describes only a case in which L=2 in one resource scheduling unit, that is, an example in which a DMRS occupies two groups of symbols, but this embodiment of this application is not limited thereto. During actual application, L may alternatively be equal to 3, 4, or the like. To be specific, the DMRS in the DMRS pattern may occupy three groups, four groups, or more groups of DMRS symbols. For example, as shown in FIG. 13, one preset resource scheduling unit includes three groups of DMRSs. To be specific, the DMRS in the preset DMRS pattern occupies M consecutive symbols, K consecutive symbols, and P consecutive symbols in one resource scheduling unit without frequency hopping, where the P symbols, the M symbols, and the K symbols are not adjacent to each other. Therefore, the DMRS in the DMRS pattern corresponding to the current mode further occupies $M_1$ consecutive symbols, $K_1$ consecutive symbols, and $P_1$ consecutive symbols of symbols in the first frequency band, and $M_2$ consecutive symbols, $K_2$ consecutive symbols, and $P_2$ consecutive symbols in the second frequency band. The $P_1$ symbols are adjacent to neither the $M_1$ symbols nor the $K_1$ symbols, and the $P_2$ symbols are adjacent to neither the $M_2$ symbols nor the $K_2$ symbols, where M, K, P, $M_1$, $K_1$, $P_1$, $M_2$, $K_2$, and $P_2$ are integers greater than or equal to 1. For brevity, FIG. 13 shows only a case in which each of M, K, P, $M_1$, $K_1$, $P_1$, $M_2$, $K_2$, and $P_2$ is equal to 1, but this embodiment of this application is not limited thereto.

It should be understood that, a case in which L is equal to 4 or another value may be similar to the foregoing case in which L is equal to 2 or 3. To avoid repetition, details are not described herein again one by one.

The foregoing describes a case of DMRS patterns corresponding to the current mode of this embodiment of this application that correspond to the situation 1 and the situation 2 when the current mode is the frequency hopping mode.

Figure 20:
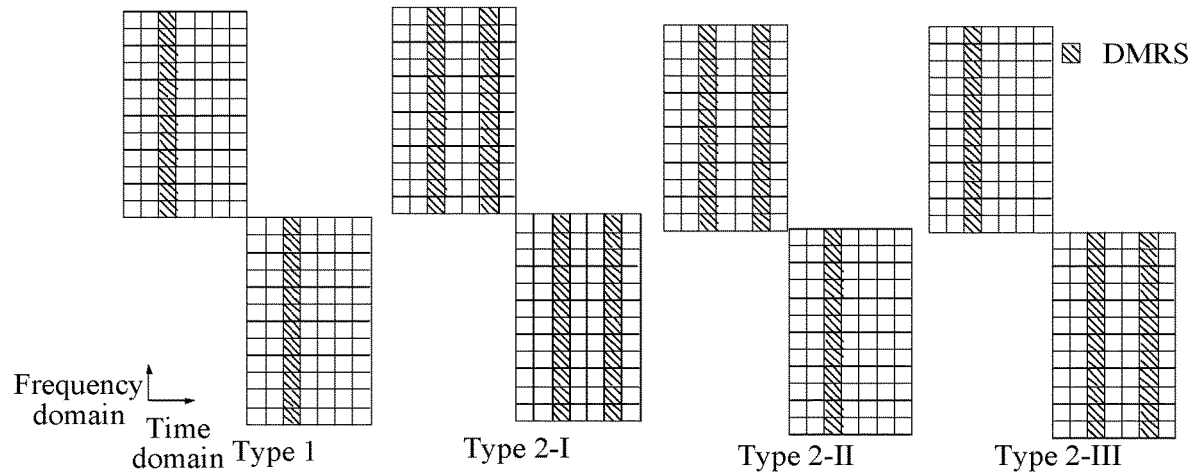
FIG. 20 is a schematic diagram of a DMRS pattern according to another embodiment of this application.

It should be understood that, in this embodiment of this application, a plurality of consecutive symbols occupied by a DMRS may alternatively be referred to as one group of DMRS symbols, or one sequence of DMRS symbols, where the number (or a quantity) of DMRSs herein indicates a quantity of groups of symbols or a quantity of sequences of symbols occupied by the DMRS, but not a quantity of symbols. In other words, in this embodiment of this application, DMRSs may include a plurality of groups or a plurality of sequences, where two sequences of DMRSs are time-inconsecutive. To be specific, the two sequences of DMRSs are spaced apart by at least one symbol. One group of DMRSs or one sequence of DMRS indicates that at least one consecutive symbol (for example, one, two, or three symbols) is occupied in time domain. FIG. 20 shows four kinds of typical types (type) in the frequency hopping mode in this embodiment of this application, that is, type 1 and three kinds of type 2, and the three kinds of type 2 include type 2-I, type 2-II, and type 2-III.

FIG. 20 shows four kinds of typical types (type) in the frequency hopping mode in this embodiment of this application, that is, type 1 and three kinds of type 2, and the three kinds of type 2 include type 2-I, type 2-II, and type 2-III.

Type 1 is that only one sequence of DMRS exists in each frequency band after frequency hopping, type 2-I is that two sequences of DMRSs exist in each frequency band after frequency hopping, type 2-II is that two sequences of DMRSs exist in the first frequency band and one sequence of DMRS exists in the second frequency band after frequency hopping, and type 2-III is that one sequence of DMRS exists in the first frequency band and two sequences of DMRSs exist in the second frequency band after frequency hopping.

It should be understood that, in this embodiment of this application, FIG. 20 shows only a case in which each sequence of DMRS occupies one symbol, but this embodiment of this application is not limited thereto, provided that one sequence of DMRS occupies at least one consecutive symbol. For example, one sequence of DMRS occupies one symbol or occupies two consecutive symbols.

It should be further understood that, in this embodiment of this application, FIG. 20 shows a case in which 14 symbols are divided equally in two frequency bands after frequency hopping. To be specific, seven symbols exist in each frequency band, but this embodiment of this application is not limited thereto, and quantities of symbols in the two frequency bands may alternatively be not equal. For example, the first frequency band includes six symbols, and the second frequency band includes eight symbols; the first frequency band includes four symbols, and the second frequency band includes 10 symbols; or the first frequency band includes nine symbols, and the second frequency band includes five symbols.

It should be understood that, FIG. 20 shows only four kinds of types of the DMRS pattern in this embodiment of this application, but locations of DMRSs in each kind of pattern type and a relationship between the DMRSs are not described. Each kind of type and locations of DMRSs in the type are described in detail below.

It should be understood that, in this embodiment of this application, that a DMRS "is located in" a symbol may indicate that the DMRS occupies the symbol or may indicate that the DMRS is fixed in the symbol, and this embodiment of this application is not limited thereto.

Only one sequence of DMRS exists for the first frequency band, and a location of the one sequence of DMRS may follow the following four principles corresponding to FIG. 21 to FIG. 24.

It should be understood that, the one sequence of DMRS may occupy one symbol or may occupy two consecutive symbols. In this embodiment of this application, for ease of description, only an example in which the one sequence of DMRS occupies one symbol is cited, but this embodiment of this application is not limited thereto.

It should be further understood that, in FIG. 21 to FIG. 24, for ease of description, only locations of DMRSs in the first frequency band are drawn, and locations of DMRSs in the second frequency band are not drawn.

Figure 21:
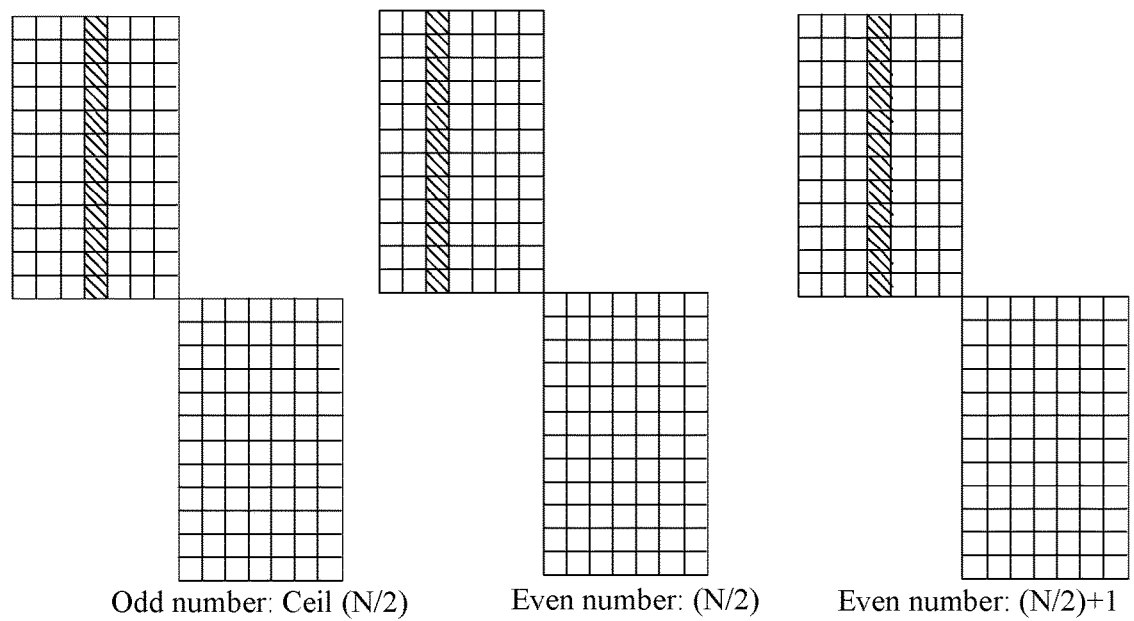
FIG. 21 is a schematic diagram of a DMRS pattern according to another embodiment of this application.

First principle: As shown in FIG. 21, a location of the one sequence of DMRS is in the middle of all OFDM symbols in the first frequency band. As shown in FIG. 21, N indicates a quantity of all OFDM symbols in the first frequency band.

It should be particularly noted that, when the quantity of symbols in the first frequency band is an even number, the one sequence of DMRS may occupy (N/2)+1 or (N/2) symbols. When the quantity of symbols in the first frequency band is an odd number, the one sequence of DMRS may occupy intermediate symbols. For example, when N=7, the one sequence of DMRS occupies the $4^{th}$ symbol.

Figure 22:
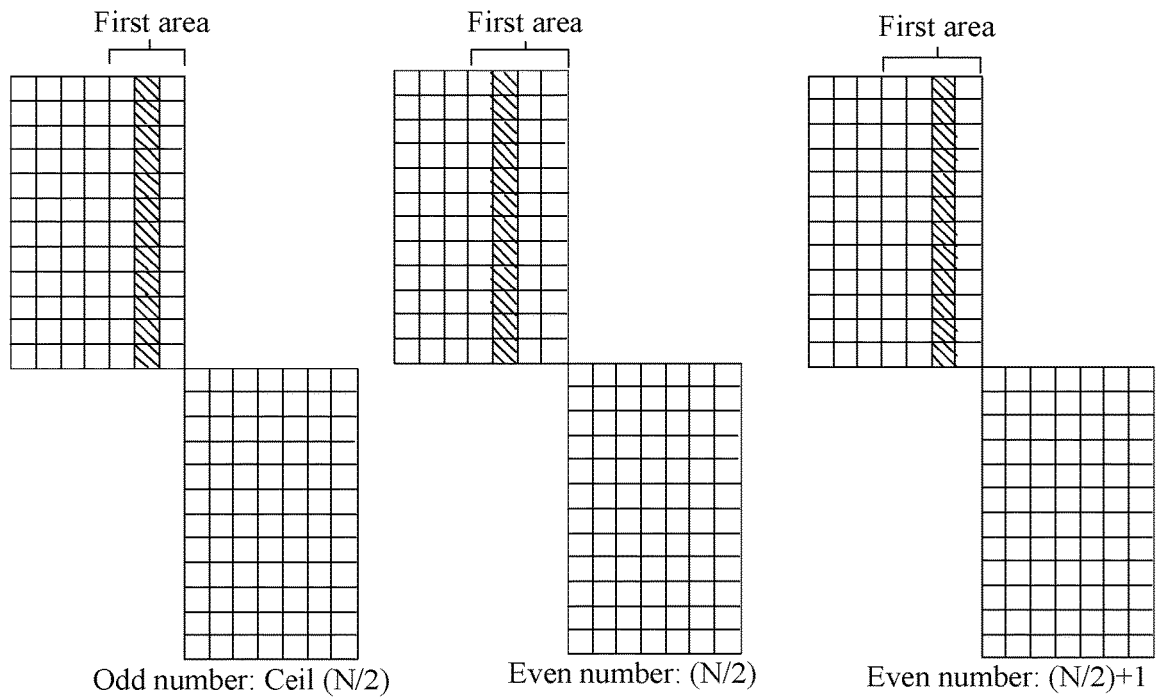
FIG. 22 is a schematic diagram of a DMRS pattern according to another embodiment of this application.

Second principle: As shown in FIG. 22, a location of the one sequence of DMRS is in the intermediate symbol in a first area in the first frequency band, where the first area includes symbols occupied by data and the DMRSs. As shown in FIG. 22, N indicates a quantity of symbols occupied by the first area.

It should be understood that, in this application, a first area in a frequency band includes symbols occupied by data and DMRSs in the frequency band. To avoid repetition, details are not described below again one by one.

Figure 23:
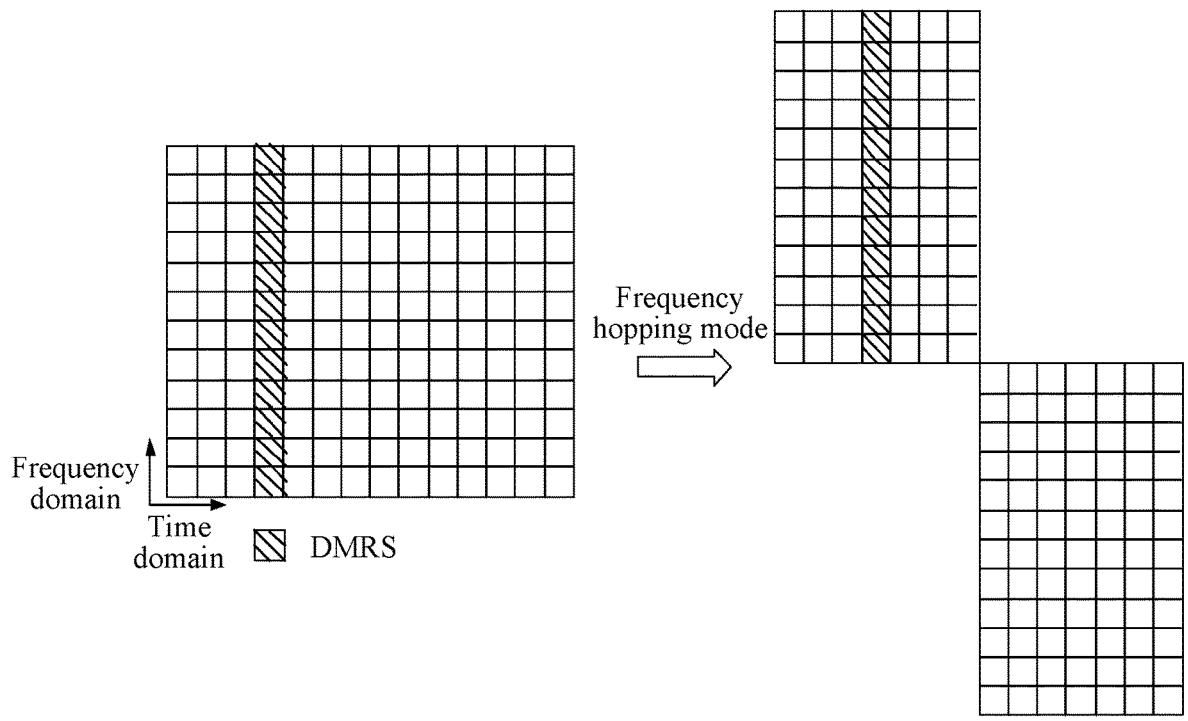
FIG. 23 is a schematic diagram of a DMRS pattern according to another embodiment of this application.

Third principle: As shown in FIG. 23, a location indicated by indication information of a front loaded DMRS is used as a location of the one sequence of DMRS, where without frequency hopping, the indication information indicates a location of the first sequence of DMRS s.

As shown in FIG. 23, the indication information indicates that the front-loaded DMRS is at the $4^{th}$ symbol (without frequency hopping, the DMRS occupies the $4^{th}$ symbol), and therefore the DMRS in the first frequency band also occupies the $4^{th}$ symbol after frequency hopping.

Figure 24:
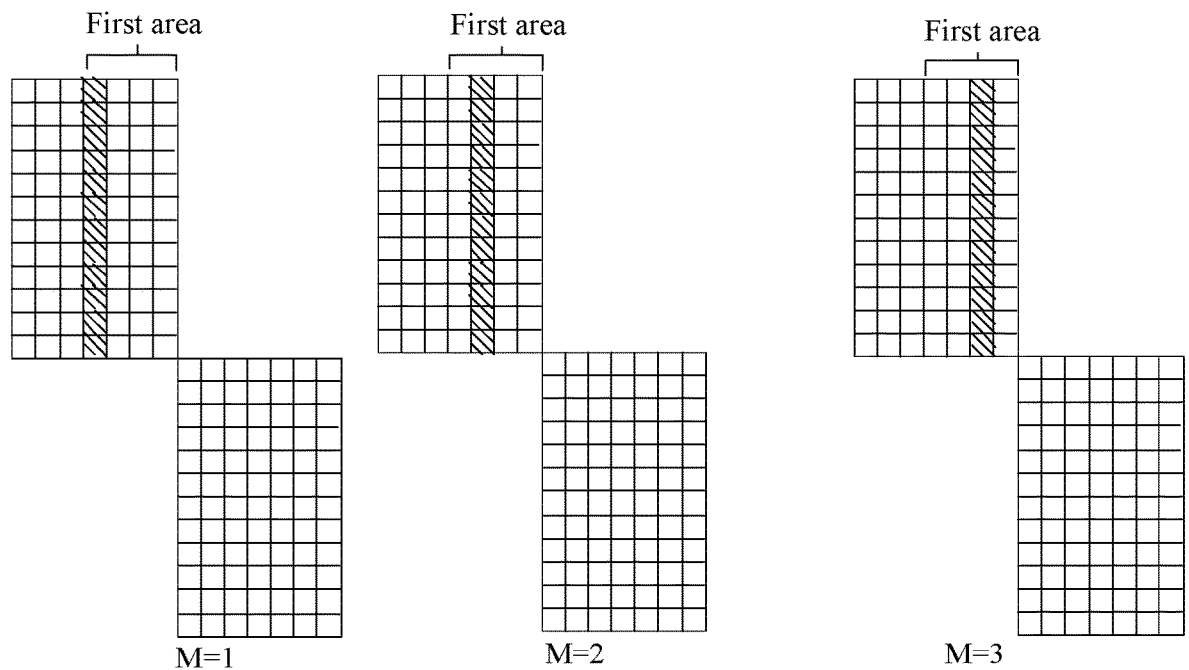
FIG. 24 is a schematic diagram of a DMRS pattern according to another embodiment of this application.

Fourth principle: As shown in FIG. 24, a location of the one sequence of DMRS is in an $M^{th}$ symbol starting from the first area. During actual application, M may be equal to 1, but this embodiment of this application is not limited thereto. For example, M=2, 3, 4 or 5.

Only one sequence of DMRS exists for the second frequency band, and a location of the one sequence of DMRS may follow the following seven principles.

It should be understood that, the one sequence of DMRS may occupy one symbol or may occupy two consecutive symbols. In this embodiment of this application, for ease of description, only an example in which the one sequence of DMRS occupies one symbol is cited, but this embodiment of this application is not limited thereto.

It should be further understood that, in FIG. 25 to FIG. 29, for ease of description, only locations of DMRSs in the second frequency band are drawn, and locations of DMRSs in the first frequency band are not drawn.

Figure 25:
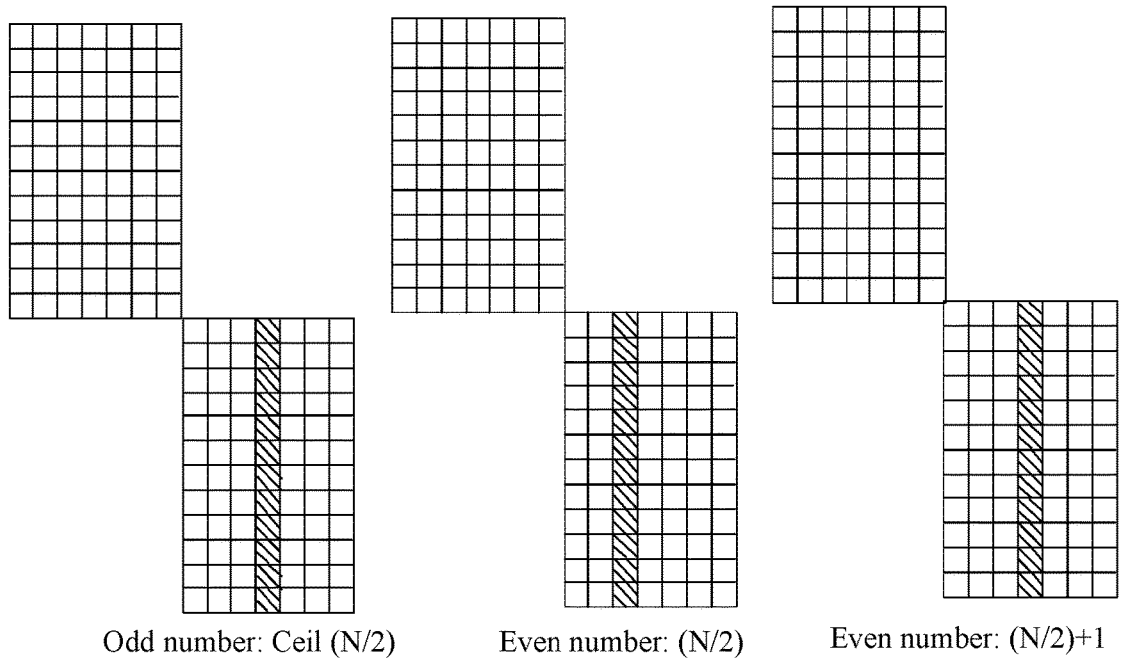
FIG. 25 is a schematic diagram of a DMRS pattern according to another embodiment of this application.

First principle: As shown in FIG. 25, a location of the one sequence of DMRS is in the middle of all OFDM symbols in the second frequency band. As shown in FIG. 25, N indicates a quantity of all OFDM symbols in the second frequency band.

It should be particularly noted that, when the quantity of symbols in the first frequency band is an even number, the one sequence of DMRS may occupy (N/2)+1 or (N/2) symbols. When the quantity of symbols in the first frequency band is an odd number, the one sequence of DMRS may occupy intermediate symbols. For example, when N=7, the one sequence of DMRS occupies the $4^{th}$ symbol.

Figure 26:
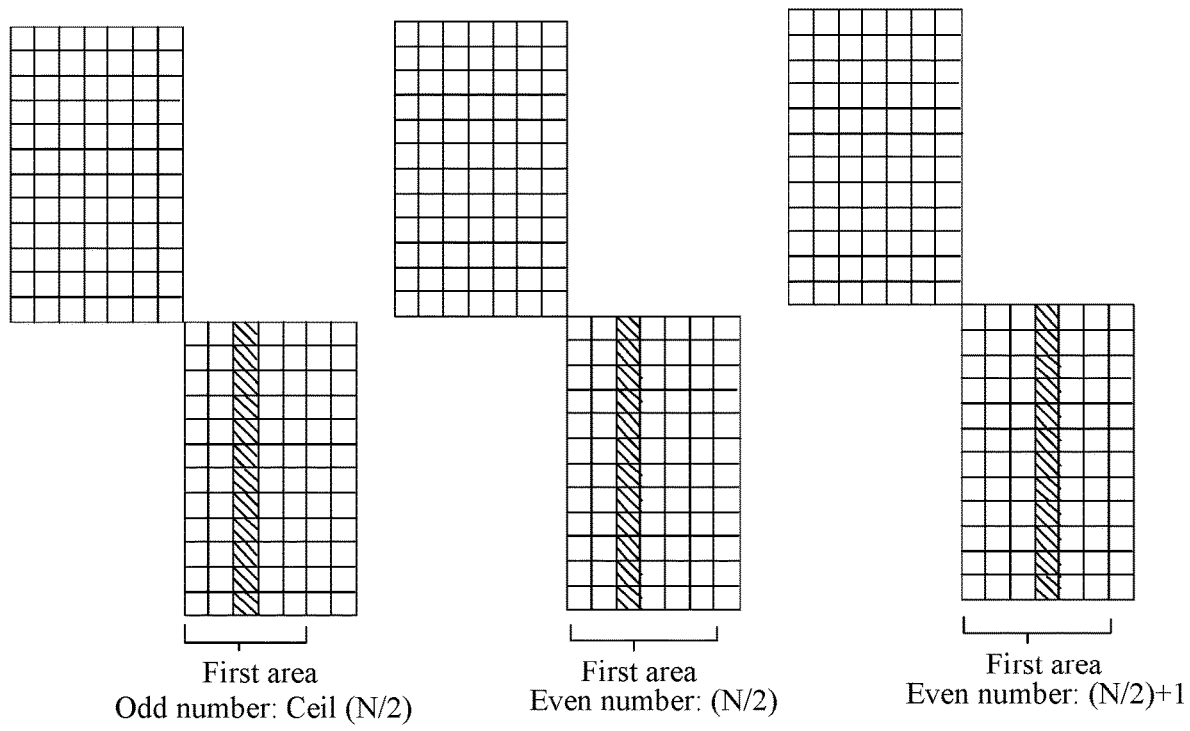
FIG. 26 is a schematic diagram of a DMRS pattern according to another embodiment of this application.

Second principle: As shown in FIG. 26, a location of the one sequence of DMRS is in the intermediate symbol in a first area in the second frequency band. As shown in FIG. 26, N indicates a quantity of symbols occupied by the first area.

Figure 27:
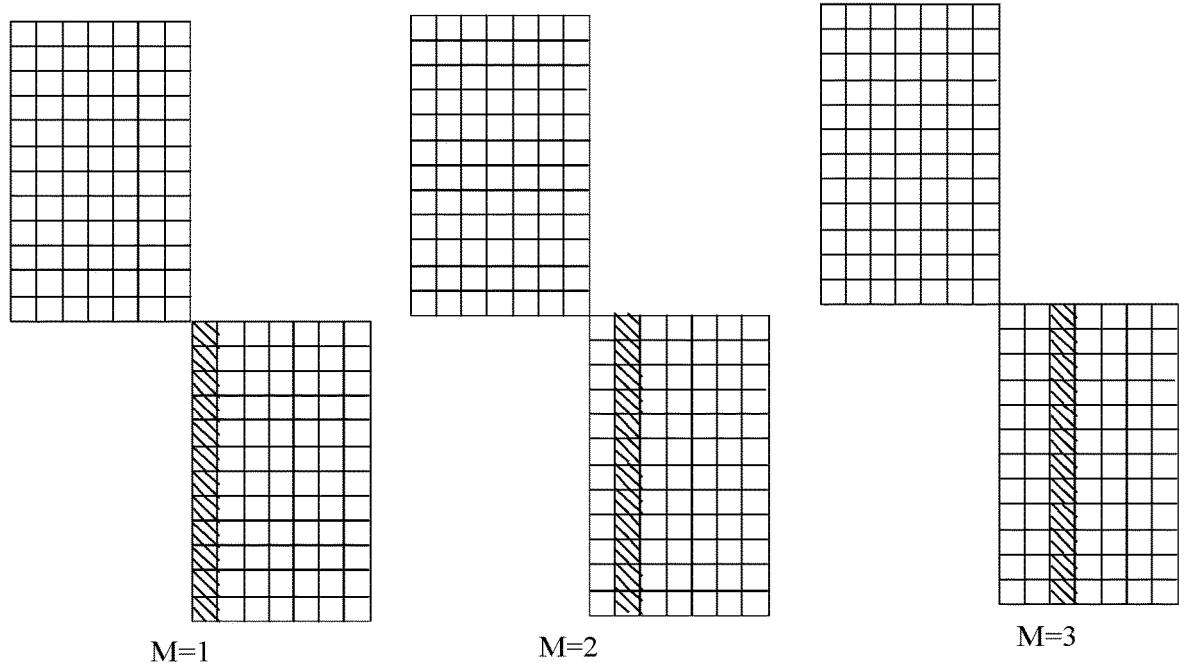
FIG. 27 is a schematic diagram of a DMRS pattern according to another embodiment of this application.

Third principle: As shown in FIG. 27, a location of the one sequence of DMRS is in an $M^{th}$ symbol starting from the first area. During actual application, M may be equal to 1, but this embodiment of this application is not limited thereto. For example, M=2, 3, 4 or 5.

Figure 28:
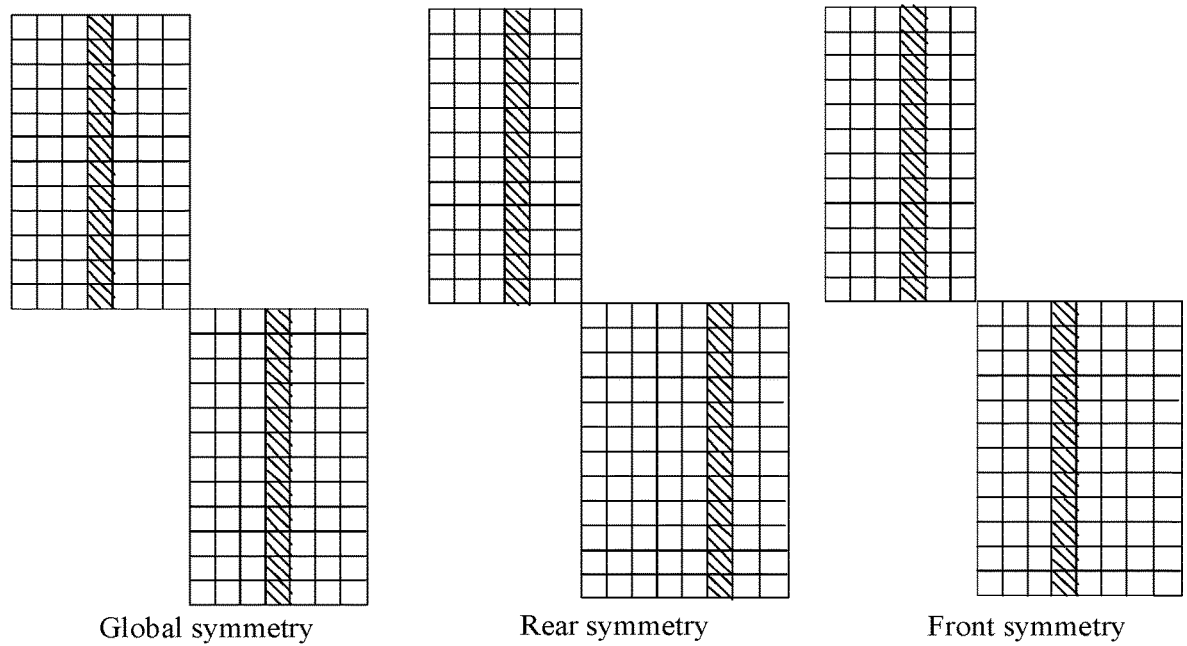
FIG. 28 is a schematic diagram of a DMRS pattern according to another embodiment of this application.
Figure 29:
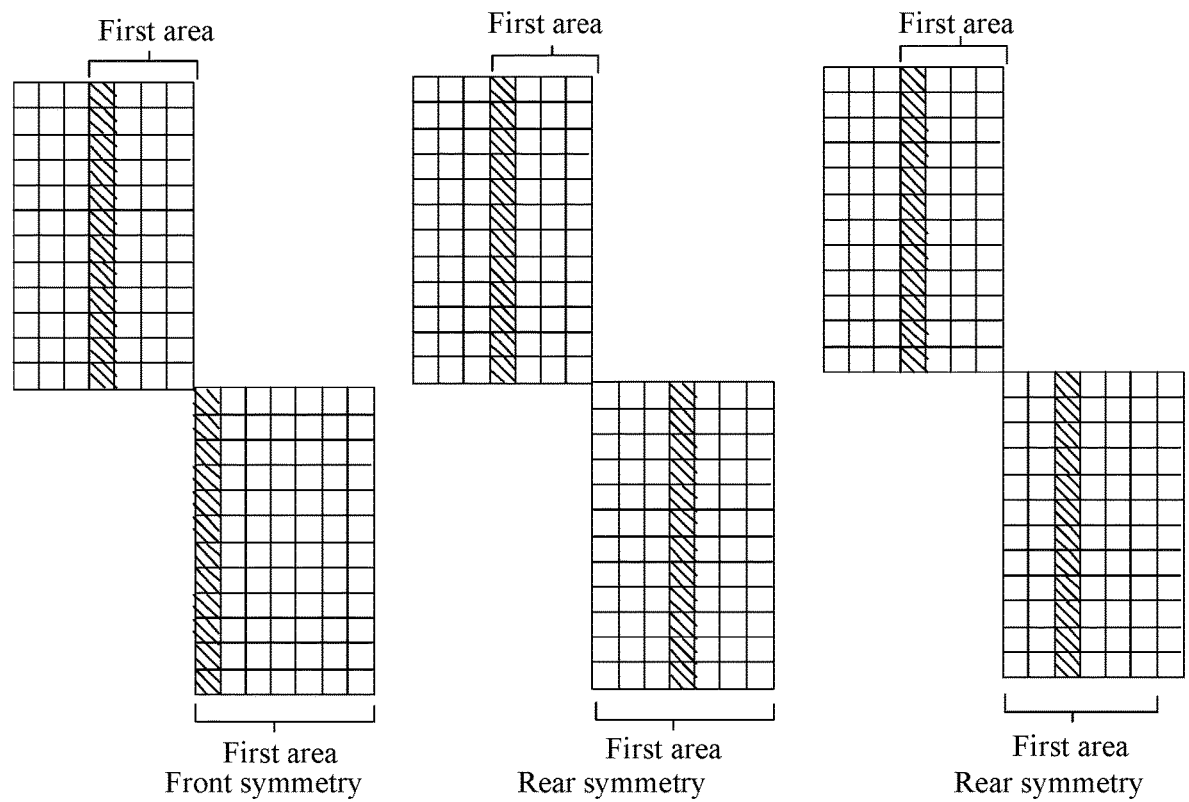
FIG. 29 is a schematic diagram of a DMRS pattern according to another embodiment of this application.

Fourth principle: As shown in FIG. 28 and FIG. 29, a location of one sequence of DMRS in the second frequency band is symmetrical with or corresponds to a location of the first sequence of DMRSs in the first frequency band.

FIG. 28 shows a case in which locations of one sequence of DMRS in the second frequency band in all symbols in the second frequency band are symmetrical with locations of the first DMRS in the first frequency band in all symbols in the first frequency band. FIG. 29 shows a case in which locations of one sequence of DMRS in the second frequency band in symbols in the first area in the second frequency band are symmetrical with locations of the first DMRS in the first frequency band in all symbols in the first area in the first frequency band.

As shown in FIG. 28, symmetry herein may be global symmetry. For example, a quantity of symbols in the first frequency band is equal to a quantity of symbols in the second frequency band, and a location of a symbol occupied by a DMRS in the first frequency band and a location of a symbol occupied by a DMRS in the second frequency band are symmetrical, and are both, for example, intermediate locations. The first accompanying drawing in FIG. 28 shows a case of occupying an intermediate location. Optionally, as shown in FIG. 28, symmetry herein may be rear symmetry. Specifically, the DMRS in the first frequency band occupies a location of an $X^{th}$ symbol from last, and therefore the DMRS in the second frequency band similarly occupies the location of the $X^{th}$ symbol from last. An intermediate accompanying drawing in FIG. 28 shows a case in which X=3. Optionally, as shown in FIG. 28, symmetry herein may be front symmetry. Specifically, the DMRS in the first frequency band occupies a location of an $X^{th}$ symbol, and therefore the DMRS in the second frequency band similarly occupies the location of the $X^{th}$ symbol. A third accompanying drawing in FIG. 28 shows a case in which X=4.

As shown in FIG. 29, symmetry herein may be rear symmetry. Specifically, the DMRS in the first frequency band occupies a location of an $X^{th}$ symbol from last, and therefore the DMRS in the second frequency band similarly occupies the location of the $X^{th}$ symbol from last. The intermediate accompanying drawing in FIG. 29 shows a case in which X=4, and the third accompanying drawing shows a case in which X=4. Optionally, as shown in FIG. 29, symmetry herein may be front symmetry. Specifically, the DMRS in the first frequency band occupies a location of an $X^{th}$ symbol, and therefore the DMRS in the second frequency band similarly occupies the location of the $X^{th}$ symbol. The first accompanying drawing in FIG. 29 shows a case in which X=1.

Figure 30:
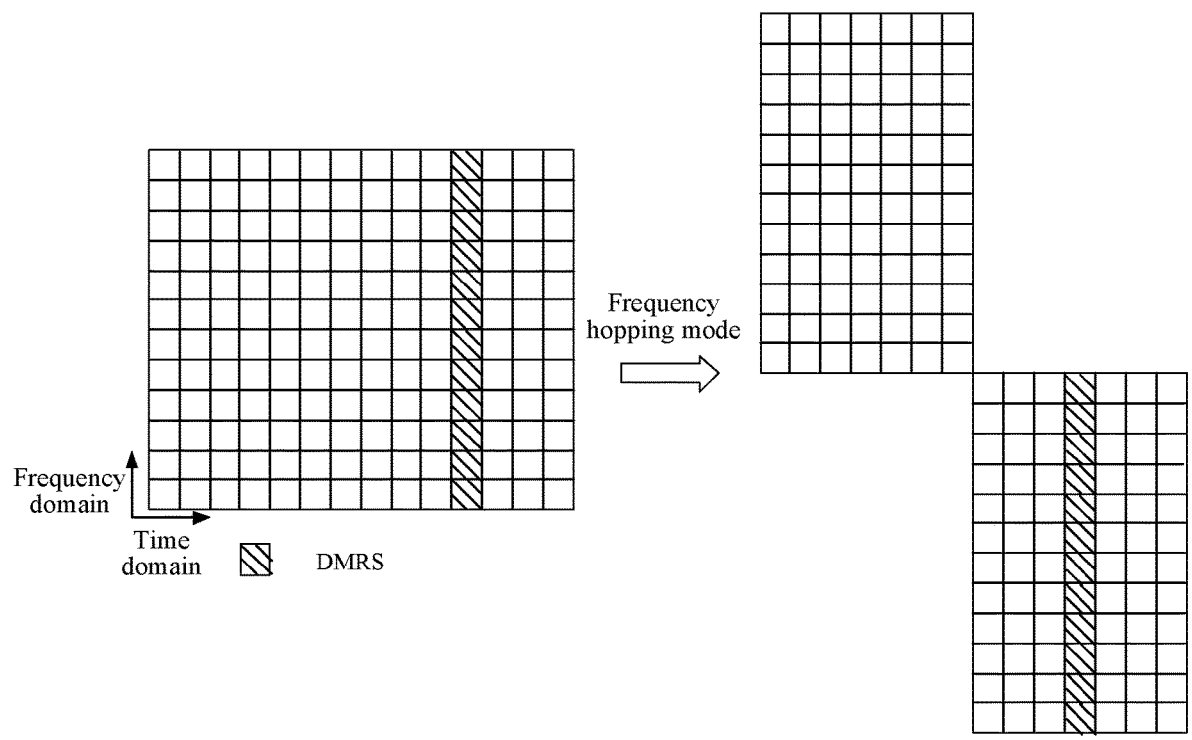
FIG. 30 is a schematic diagram of a DMRS pattern according to another embodiment of this application.

Fifth principle: As shown in FIG. 30, a location of the one sequence of DMRS is a location indicated by indication information of additional DMRS, where without frequency hopping, the indication information indicates location of the additional DMRS. It should be noted that, if a plurality of sequences of additional DMRSs exist, the location of the one sequence of DMRS is the same as that of an $N^{th}$ sequence of additional DMRS indicated by the indication information, for example, is the same as that of the first sequence of additional DMRS. In this manner, the location of the one sequence of DMRS may be one of {7, 8, 10, 12, 13}.

Sixth principle: A location of the one sequence of DMRS is selected from several particular symbols. For example, if the one sequence of DMRS includes one symbol, the one sequence of DMRS may occupy the $1^{st}$ symbol, the $3^{rd}$ symbol, or the $5^{th}$ symbol in the second frequency band, or the one sequence of DMRS may occupy the $8^{th}$ symbol, the $10^{th}$ symbol, or the $12^{th}$ symbol in the entire scheduling unit.

Optionally, the location of the one sequence of DMRS may alternatively be bound to (or have a correspondence with) a frame structure or a PUSCH symbol location (or a location in a first area), one frame structure or one PUSCH symbol location may correspond to one placement location, and this embodiment of this application is not limited thereto.

A location of a symbol that is occupied by the one sequence of DMRS may be configured by using signaling, and this embodiment of this application is not limited thereto.

Seventh principle: The one sequence of DMRS is located in N symbols after the first sequence of DMRSs in the first frequency band. For example, N=4/6/8.

It should be understood that, the foregoing describes locations when one sequence of DMRS exists in each of the first frequency band and the second frequency band. During actual application, a location of a DMRS in type 1 may be obtained through any one of the foregoing combinations, and this embodiment of this application is not limited thereto. To be specific, after type 1 is determined, the network device and the terminal device may determine the DMRS pattern based on a preset rule, that is, a rule in any one of the foregoing combinations.

Optionally, during actual application, the location of the DMRS in type 1 may be configured for the terminal device by the network device by using signaling, and for example, may be configured by using RRC signaling, DCI signaling, or MAC CE signaling, and this embodiment of this application is not limited thereto.

Two sequences of DMRSs (corresponding to type 2-I and type 2-II) exist for the first frequency band, and locations of the two sequences of DMRSs may follow the following seven principles.

It should be understood that, each of the two sequences of DMRSs may occupy one symbol or may occupy two consecutive symbols. In this embodiment of this application, for ease of description, only an example in which each sequence of DMRSs occupies one symbol is cited, but this embodiment of this application is not limited thereto.

It should be further understood that, in FIG. 31 to FIG. 34, for ease of description, only locations of DMRSs in the first frequency band are drawn, and locations of DMRSs in the second frequency band are not drawn.

Figure 31:
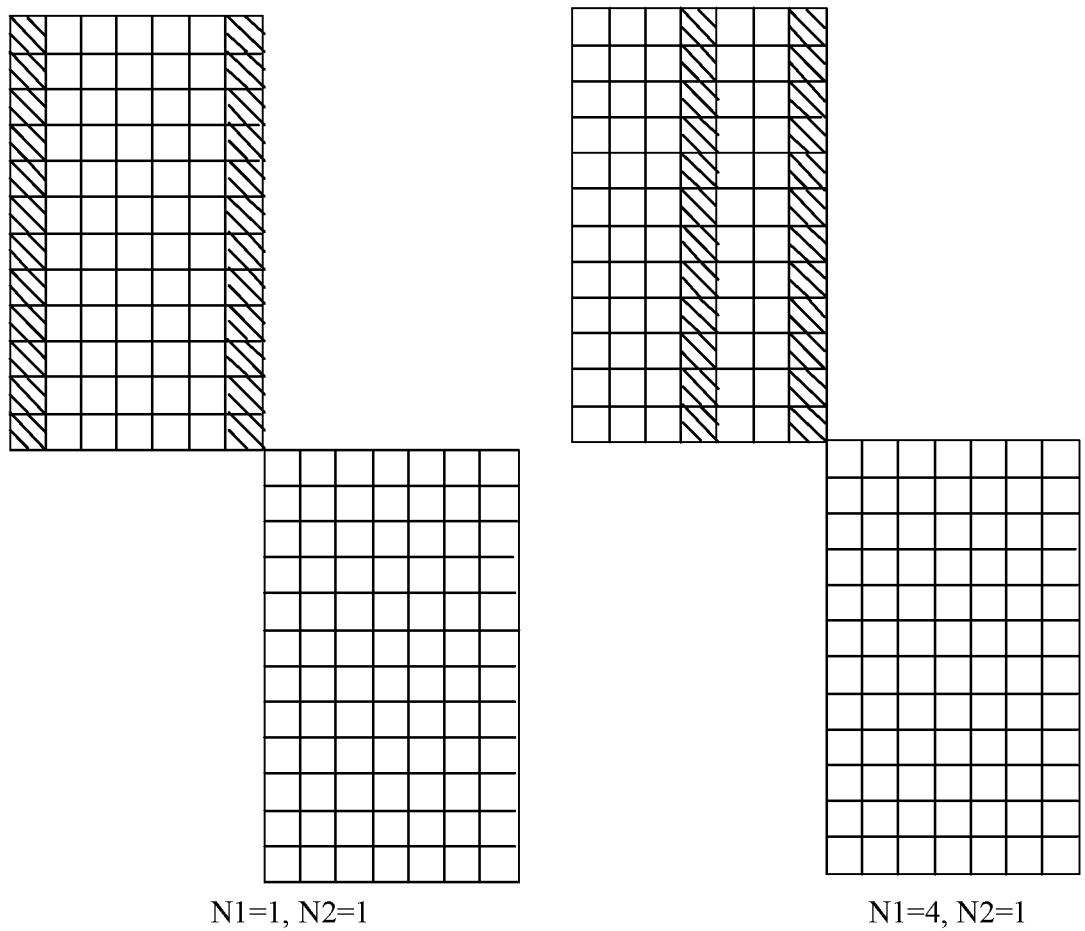
FIG. 31 is a schematic diagram of a DMRS pattern according to another embodiment of this application.

First principle: As shown in FIG. 31, the first sequence of the two sequences of DMRSs is fixed in an $N1^{th}$ OFDM symbol in the entire first frequency band; and the second sequence is fixed in an $N_2^{th}$ OFDM symbol from last in the entire first frequency band.

Figure 32:
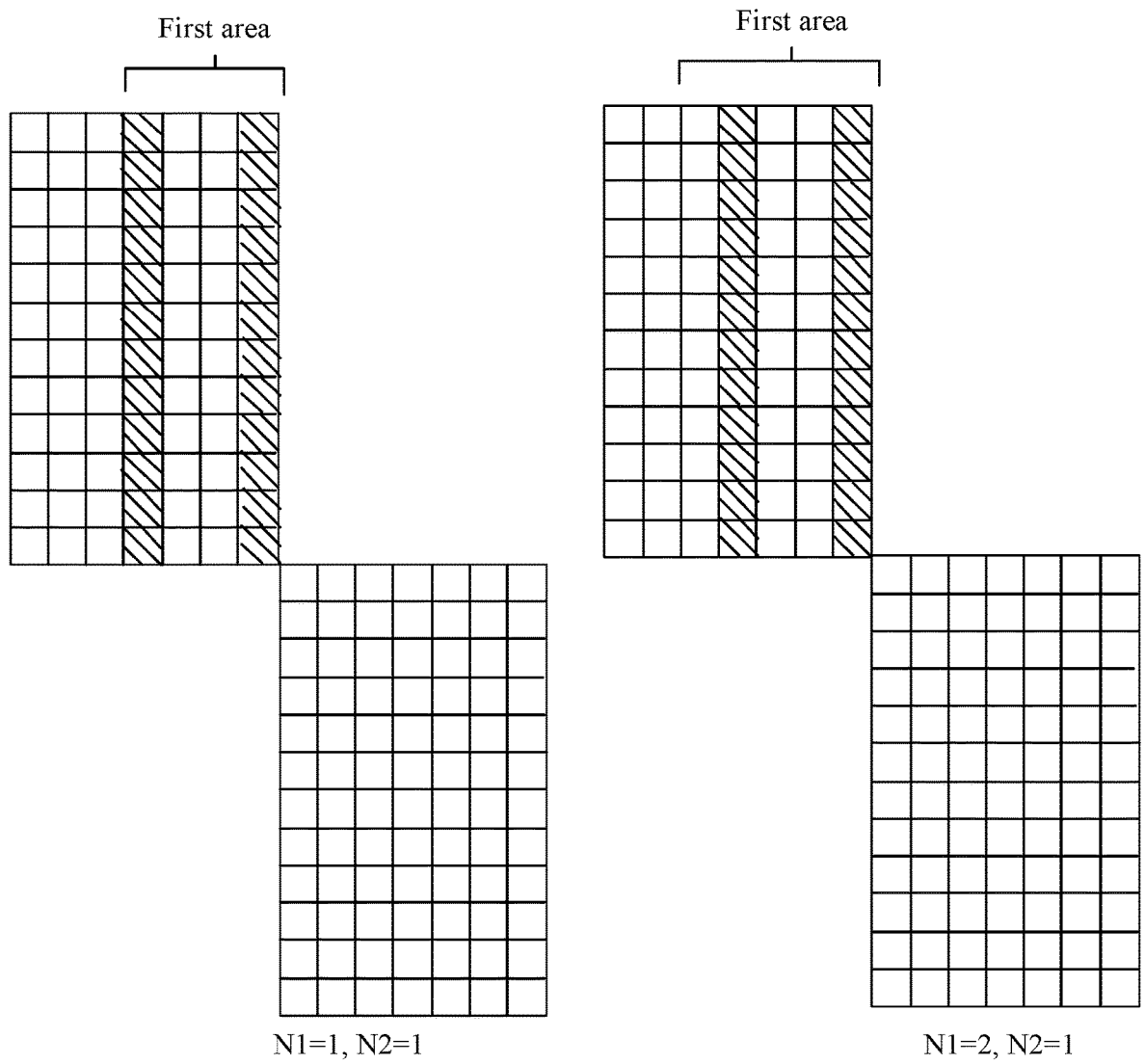
FIG. 32 is a schematic diagram of a DMRS pattern according to another embodiment of this application.

Second principle: As shown in FIG. 32, the first sequence of the two sequences of DMRSs is fixed in an $N1^{th}$ OFDM symbol of the symbols in the first area in the first frequency band; and the second sequence is fixed in an $N_2^{th}$ OFDM symbol from last of the symbols in the first area in the first frequency band.

Figure 33:
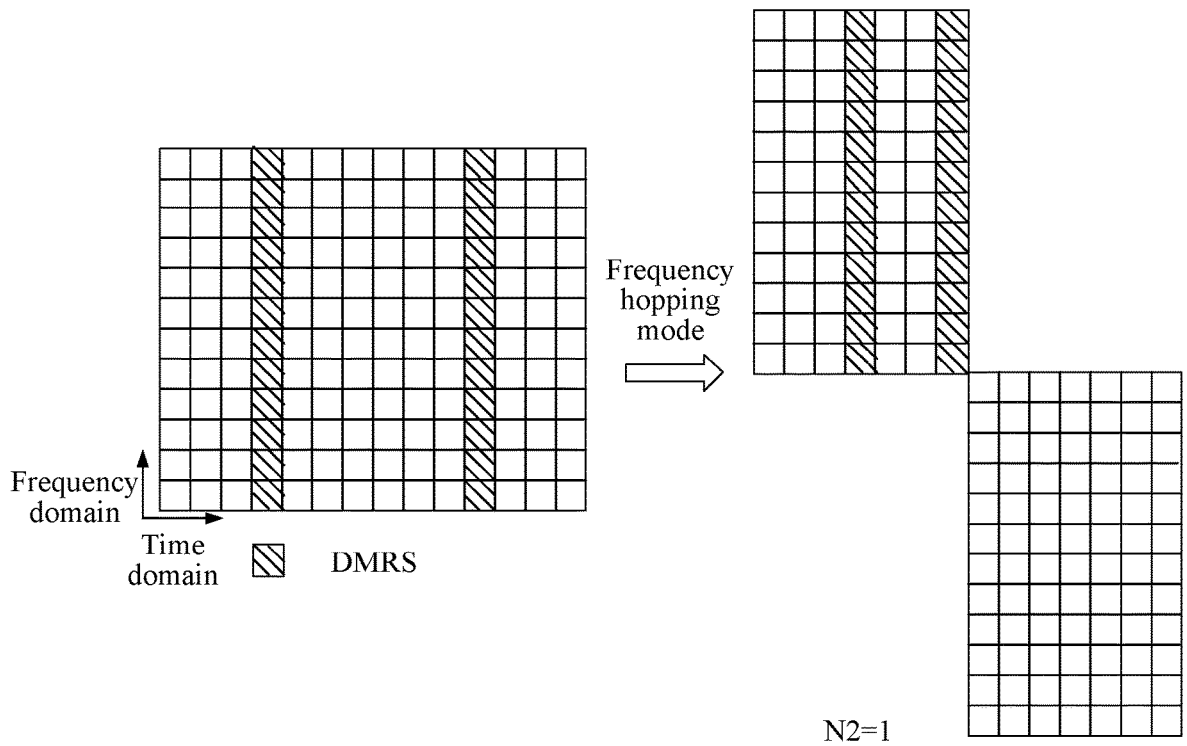
FIG. 33 is a schematic diagram of a DMRS pattern according to another embodiment of this application.

Third principle: As shown in FIG. 33, a location indicated by indication information of a front loaded DMRS is used for the first sequence of the two sequences of DMRSs, where without frequency hopping, the indication information indicates a location of the first sequence of DMRSs. The second sequence is fixed in an $N2^{th}$ OFDM symbol from last of the symbols in the first area in the first frequency band. For example, N2=1, 2, or 3.

It should be understood that, the front-loaded DMRSs in this application are the first sequence of DMRSs in the resource scheduling unit, and are usually located in the first half part of the resource scheduling unit. It should be understood that, a front-loaded DMRS in this application is equivalent to a front-loaded DMRS. Additional DMRS are equivalent to additional DMRS, and are DMRS in another sequence that are located after the front-loaded DMRS.

Figure 34:
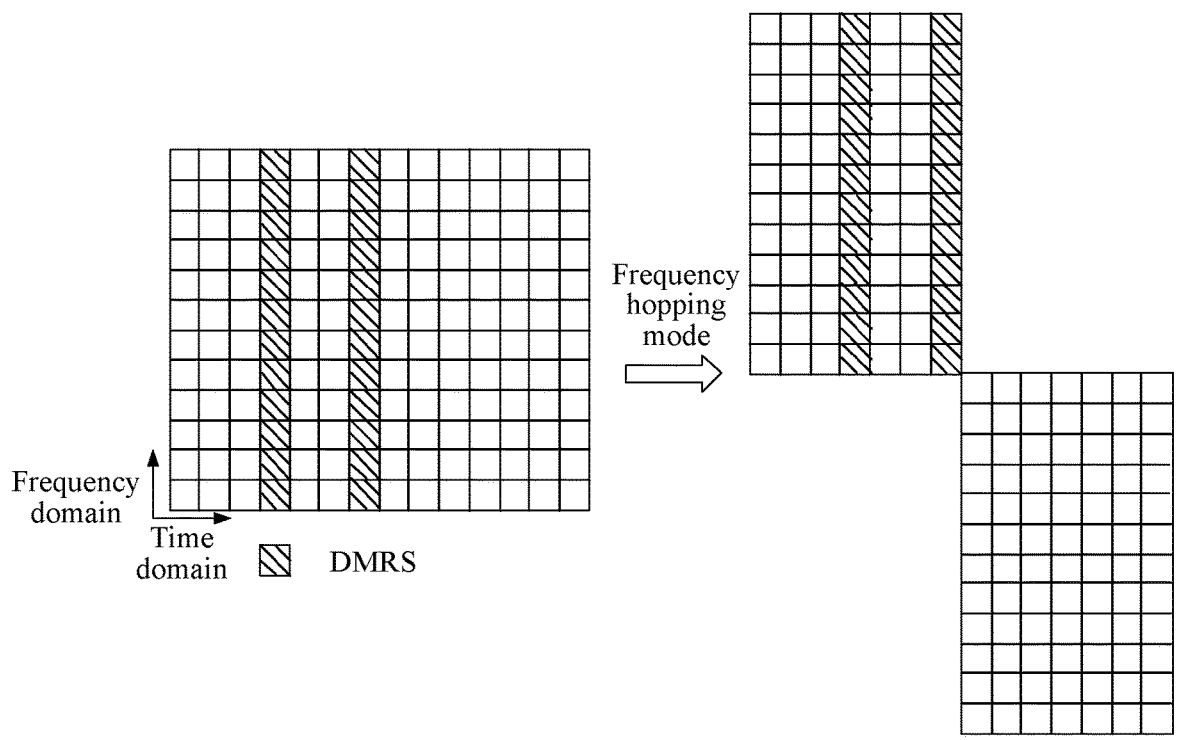
FIG. 34 is a schematic diagram of a DMRS pattern according to another embodiment of this application.

Fourth principle: As shown in FIG. 34, a location indicated by the indication information of the front-loaded DMRS is used as a location of the first sequence of the two sequences of DMRSs; and a location that is in the frequency band and that is indicated by the indication information of the additional DMRS is used for the second sequence, where when the indication information of the additional DMRS indicates a plurality of locations in the frequency band, the location of the second sequence is the last one of the plurality of locations.

Fifth principle: The first sequence of the two sequences of DMRSs is located in the middle of the entire first frequency band or the first area in the first frequency band; and the second sequence is fixed in an $N2^{th}$ OFDM symbol from last of the symbols in the first area in the first frequency band.

Sixth principle: The location of the first sequence of the two sequences of DMRSs is the same as that of the first sequence without frequency hopping; and the second sequence is fixed in the last symbol, the penultimate symbol, or the antepenultimate symbol in the first frequency band. Specifically, the location of the second sequence of DMRSs may be bound to or correspond to a frame structure, and this embodiment of this application is not limited thereto.

Seventh principle: The first sequence of the two sequences of DMRSs is fixed in an $N1^{th}$ OFDM symbol in the entire scheduling resource; and the second sequence is fixed in an $N^{th}$ symbol after the first sequence, where N=1/2/3/4.

Two sequences of DMRSs (corresponding to type 2-I and type 2-III) exist for the second frequency band, and locations of the two sequences of DMRSs may follow the following eight principles.

First principle: The first sequence of the two sequences of DMRSs is fixed in an $N1^{th}$ OFDM symbol in the entire second frequency band; and the second sequence is fixed in an $N2^{th}$ OFDM symbol from last in the entire second frequency band.

Second principle: The first sequence of the two sequences of DMRSs is fixed in an $N1^{th}$ OFDM symbol of the symbols in the first area in the second frequency band; and the second sequence is fixed in an $N2^{th}$ OFDM symbol from last of the symbols in the first area in the second frequency band.

Figures 35, 36:
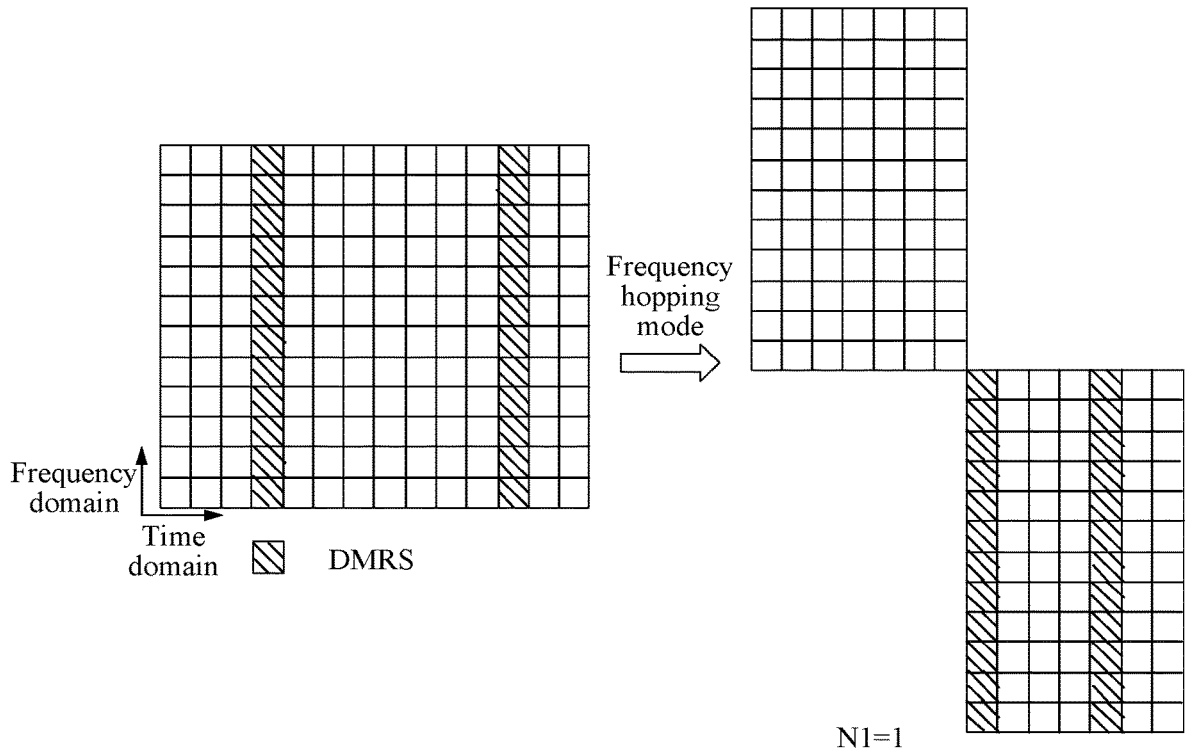
FIG. 35 is a schematic diagram of a DMRS pattern according to another embodiment of this application.
FIG. 36 is a schematic diagram of DMRS multiplexing according to an embodiment of this application.

Third principle: As shown in FIG. 35, a location indicated by the indication information of the additional DMRS is used for the second sequence of the two sequences of DMRSs, where without frequency hopping, the indication information indicates locations of the DMRSs in the frequency band; and when the indication information indicates locations of a plurality of sequences of DMRSs, the location of the second sequence is a location of the last sequence of DMRSs indicated by the indication information. The first sequence is fixed in an $N1^{th}$ OFDM symbol of the symbols in the first area in the second frequency band. For example, N1=1, 2, or 3.

Fourth principle: Locations indicated by the indication information of the additional DMRS are used for the two sequences of DMRSs, where without frequency hopping, the indication information indicates locations of the two sequences of DMRSs; and when the indication information indicates locations of a plurality of DMRSs in the frequency band, two locations may be selected as locations of the two sequences of DMRSs. For example, the first location and the last location are selected as the locations of the two sequences of DMRSs.

Fifth principle: The two sequences of DMRSs are located in predetermined symbol locations. For example, if each of the two sequences of DMRSs includes one symbol, the two sequences of DMRSs may include two of the $1^{st}$ symbol, the $3^{rd}$ symbol, and the $5^{th}$ symbol in the second frequency band, or the two sequences of DMRSs may include two of the $8^{th}$ symbol, the $10^{th}$ symbol, and the $12^{th}$ symbol in the entire resource scheduling unit.

Optionally, the locations of the two sequences of DMRSs may alternatively be bound to (or have a correspondence with) a frame structure or a PUSCH symbol location (or a location in a first area), one frame structure or one PUSCH symbol location may correspond to one placement location, and this embodiment of this application is not limited thereto.

A location of a symbol that is occupied by the two sequences of DMRSs may be configured by using signaling, and this embodiment of this application is not limited thereto.

Sixth principle: The first sequence of the two sequences of DMRSs is located in the $1^{st}$ symbol, and the second sequence of DMRSs is located in one symbol in a candidate set. For example, the second sequence of DMRSs is located in one of symbol 10 and symbol 12 in the entire scheduling unit, and this embodiment of this application is not limited thereto.

Optionally, the location of the second sequence of DMRSs may alternatively be bound to (or have a correspondence with) a frame structure or a PUSCH symbol location (or a location in a first area), one frame structure or one PUSCH symbol location may correspond to one placement location, and this embodiment of this application is not limited thereto.

Seventh principle: The first sequence of the two sequences of DMRSs is fixed in an $N1^{th}$ OFDM symbol in the entire second frequency band; and the second sequence is fixed in an $M^{th}$ symbol (M=1/2/3/4) after the first sequence.

Eighth principle: The first sequence of the two sequences of DMRSs is located in an $N1^{th}$ symbol after the first sequence of DMRSs in the first frequency band; and the second sequence is fixed in an $M^{th}$ symbol (N1=2*M; and M=1/2/3/4) after the first sequence.

It should be understood that, the foregoing describes locations when one sequence of DMRS exists in each of the first frequency band and the second frequency band, and specific locations when two sequences of DMRSs exist in each of the first frequency band and the second frequency band. During actual application, the location of the DMRS in type 2-I may be obtained through any combination of the specific locations when two sequences of DMRSs exist in each of the first frequency band and the second frequency band, and this embodiment of this application is not limited thereto. To be specific, after type 2-I is determined, the network device and the terminal device may determine the DMRS pattern based on a preset rule, that is, a rule in any one of the foregoing combinations.

Similarly, the location of the DMRS in type 2-II may be obtained through various combinations of locations when two sequences of DMRSs exist for the first frequency band and locations when only one sequence of DMRS exists for the second frequency band, and this embodiment of this application is not limited thereto. To be specific, after type 2-II is determined, the network device and the terminal device may determine the DMRS pattern based on a preset rule, that is, a rule in any one of the foregoing combinations.

Similarly, the location of the DMRS in type 2-III may be obtained through various combinations of locations when only one sequence of DMRS exists for the first frequency band and locations when two sequences of DMRSs exist for the second frequency band, and this embodiment of this application is not limited thereto. To be specific, after type 2-III is determined, the network device and the terminal device may determine the DMRS pattern based on a preset rule, that is, a rule in any one of the foregoing combinations.

Optionally, during actual application, the location of the DMRS in the foregoing three kinds of type 2 may be configured for the terminal device by the network device by using signaling, and for example, may be configured by using RRC signaling, DCI signaling, or MAC CE signaling, and this embodiment of this application is not limited thereto.

A specific example in which data transmission is performed by using a DMRS pattern corresponding to one of the foregoing four types in FIG. 20 in a situation in an embodiment of this application is described in detail below by using uplink transmission in a frequency hopping mode as an example.

To make this embodiment of this application more understandable, before a method according to this embodiment of this application is described, some nouns in this embodiment of this application are first defined as follows:

In this embodiment of this application, configuration of additional DMRS (additional DMRS) may be implemented by configuring a quantity of the additional DMRSs, a location of the additional DMRS, or indication information of the additional DMRS.

It should be understood that, a terminal device may determine locations of the DMRSs based on the configuration of the additional DMRS, and then may transmit the DMRSs and data.

It should be understood that, in this embodiment of this application, an additional DMRS configuration parameter may be configured by using one or more of RRC, DCI, and a MAC CE.

It should be understood that, in this embodiment of this application, the additional DMRS configuration parameter may alternatively be referred to as additional DMRS indication information, and this embodiment of this application is not limited thereto. The additional DMRS is a DMRS located after a front-loaded DMRS, and the additional DMRS indication information or the additional DMRS configuration parameter is used to indicate at least one of the following: whether an additional DMRS exists, a quantity of additional DMRS, and a location of an additional DMRS.

It should be understood that, only one sequence of front-loaded DMRS exists, and if additional DMRS are configured in the additional DMRS configuration parameter, an entire resource scheduling unit includes at least two sequences of DMRSs, where a first sequence of DMRS is the front-loaded DMRS, and remaining DMRS is the additional DMRS.

A case in which a DMRS configuration parameter is configured by using RRC is first described below.

The quantity of additional DMRSs may be configured by using a quantity of uplink additional DMRSs (UL_DMRS_add_num) or a quantity of uplink DMRSs (UL_DMRS_num). For example, UL_DMRS_add_num=0, and it indicates that no additional DMRS exists; and UL_DMRS_add_num=N (N>0), and it indicates that N additional DMRSs exist. UL_DMRS_num=1, and it indicates that no additional DMRS exists; and UL_DMRS_num=N (N>1), and it indicates that N−1 additional DMRSs exist. Optionally, in this embodiment of this application, the quantity of additional DMRSs may alternatively be indirectly implemented by using a DMRS type, for example, indexed to a type of DMRS by giving an index number, and the type of DMRS implies whether additional DMRS exist, and how many additional DMRSs exist. In other words, in this embodiment of this application, a correspondence between an index number and a DMRS number may be established, where one index number corresponds to one DMRS number. During actual application, one index number may be used to indicate a DMRS number corresponding to the index number.

It should be understood that, in this embodiment of this application, a total number of DMRSs in a DMRS pattern is equal to the quantity of additional DMRSs plus 1.

It should be understood that, in this embodiment of this application, after a quantity of DMRSs is configured, the terminal device may determine a location of each DMRS based on a preset rule. Optionally, in this embodiment of this application, a location of each DMRS may be further determined based on a configured additional DMRS location parameter, and this embodiment of this application is not limited thereto.

Optionally, in this embodiment of this application, a quantity of symbols occupied by the additional DMRS may be equal to a quantity of symbols occupied by the first DMRS, and this embodiment of this application is not limited thereto.

An additional DMRS location may be configured by using an uplink additional DMRS location (UL_DMRS_add_pos) or an uplink DMRS location (UL_DMRS_pos). For example, UL_DMRS_add_pos={Null} or UL_DMRS_add_pos={0}, indicating that no additional DMRS exists; and UL_DMRS_add_pos={N1, N1+N2, or N1+N2+N3} (N1>0, N2>0, and N3>0), indicating that additional DMRSs exist, where a quantity of non-zero parameters indicates a quantity of the additional DMRSs. For example, UL_DMRS_add_pos={N1, N1+N2, or N1+N2+N3}, respectively indicating that one, two, or three additional DMRSs exist. N1=3, indicating that the first additional DMRS and the first DMRS are spaced apart by three symbols, or indicating that the first additional DMRS occupies the $3^{rd}$ symbol. For example, when the first additional DMRS occupies two symbols, and N1=3, the first additional DMRS occupies the $3^{rd}$ symbol and the $4^{th}$ symbol.

UL_DMRS_pos={N1} (for example, N1=2 or 3). To be specific, only one parameter exists, indicating that no additional DMRS exists. UL_DMRS_pos={N1+N2, N1+N2+N3, or N1+N2+N3+N4}, indicating that additional DMRSs exist, where a quantity of non-zero parameters in values of UL_DMRS_pos minus 1 indicates a quantity of the additional DMRS s.

The additional DMRS indication information may be configured by using an uplink additional DMRS location (UL_DMRS_add_pos) or an uplink additional DMRS indication (UL_DMRS_add_indication).

Specifically, as shown in Table 1, in this embodiment of this application, a one-to-one correspondence between indication information, that is, UL_DMRS_add_pos/UL_DMRS_add_indication and a DMRS location may be set. In this embodiment of this application, a specific value may be indicated by using indication information. For example, as shown in Table 1, an indication information value is one value from 0 to p, to indicate a DMRS location corresponding to the one value. For example, when an indication information value is 0, a corresponding DMRS location is N0, indicating that no additional DMRS exists and a DMRS in a front-loaded pattern occupies an N0$^{th}$ symbol ((No add DMRS, FL at N0)); and when an indication information value is 3, a corresponding DMRS location is N0+N3, indicating that one additional DMRS exists and occupies an (N0+N3)$^{th}$ symbol (1 add DMRS at N0+N3). It should be understood that, the (N0+N3)$^{th}$ symbol indicates the 1$^{st}$ symbol of at least one consecutive symbol occupied by the additional DMRS. When an indication information value is p, corresponding DMRS locations are N0+N1, N0+N2, and N0+N3, indicating that three additional DMRSs exist and respectively occupy an (N0+N1)$^{th}$ symbol, an (N0+N2)$^{th}$ symbol, and an (N0+N3)$^{th}$ symbol.

It should be understood that, in this embodiment of this application, different quantities of additional DMRSs may correspond to different tables, and content in the tables is similar to that in Table 1. Details are not described herein again. In this way, a corresponding table may be determined based on the quantity of additional DMRSs, and the table includes a correspondence between an indication information value and a DMRS location. Therefore, a DMRS location may be indicated by using a specific indication information value.

TABLE 1

| UL_DMRS_add_pos/ UL_DMRS_add_indication (uplink additional DMRS location/ uplink additional DMRS indication) | DMRS location (DMRS location) |
| --- | --- |
| 0 | N0 (No add DMRS, FL at N0) |
| 1 | N0 + N1 (1 add DMRS at N0 + N1) |
| 2 | N0 + N2 (1 add DMRS at N0 + N2) |
| 3 | N0 + N3 (1 add DMRS at N0 + N3) |
| 4 | N0 + N1, N0 + N2 (2 add DMRS) |
| ... | ... |
| p | N0 + N1, N0 + N2, N0 + N3 (3 add DMRS) |

It should be understood that, in this embodiment of this application, after additional DMRS configuration is completed by using RRC, it does not mean that an additional DMRS is necessarily triggered or activated. After the configuration is completed by using the RRC, the additional DMRS may be triggered in the following three forms.

First form, triggering performed by using data: After additional DMRS configuration is completed by using RRC, an additional DMRS may exist provided that data is sent. To be specific, the data is sent based on an additional pattern.

Second form, activation performed by using a MAC CE, and triggering performed by using data: After additional DMRS configuration is completed by using RRC, if activation is performed by using a MAC CE (for example, UL_DMRS_add_active=1), an additional DMRS exists only when data is sent; or if deactivation is performed by using a MAC CE (for example, UL_DMRS_add_active=0), no additional DMRS exists.

Third form, triggering performed by using DCI: After additional DMRS configuration is completed by using RRC, if triggering is performed by using DCI (for example, UL_DMRS_add_flag=1), an additional DMRS exists when data is sent; or if triggering is not performed by using DCI (for example, UL_DMRS_add_flag=0), no additional DMRS exists when data is sent.

The foregoing describes a manner of configuring an additional DMRS by using RRC, and similarly, in this embodiment of this application, an additional DMRS may alternatively be configured by using a MAC CE.

Similar to configuration performed by using RRC, additional DMRS may alternatively be configured by using a MAC CE, and configuration may be completed by configuring the quantity of the additional DMRS, a location of an additional DMRS, or indication information of the additional DMRS by using a MAC CE. For a signaling form and a signaling function of specific configuration, refer to corresponding signaling in the configuration performed by using the RRC. To avoid repetition, details are not described herein again.

It should be understood that, in this embodiment of this application, after additional DMRS configuration is completed by using a MAC CE, it does not mean that the additional DMRS is necessarily triggered or activated. After the configuration is completed by using the RRC, the additional DMRS may be triggered in the following two forms.

First form, triggering performed by using data: After additional DMRS configuration is completed by using a MAC CE, an additional DMRS exists provided that data is sent.

Second form, triggering performed by using DCI: After additional DMRS configuration is completed by using a MAC CE, if triggering is performed by using DCI (for example, UL_DMRS_add_flag=1), an additional DMRS exists when data is sent; or if triggering is not performed by using DCI (for example, UL_DMRS_add_flag=0), no additional DMRS exists when data is sent.

The foregoing describes manners of configuring an additional DMRS by using RRC and a MAC CE, and similarly, in this embodiment of this application, an additional DMRS may alternatively be configured by using DCI.

Similar to configuration performed by using RRC or a MAC CE, additional DMRS may be configured by using DCI, and configuration may be completed by configuring the quantity of the additional DMRS, location of the additional DMRS, or indication information of the additional DMRS. For a signaling form and a signaling function of specific configuration, refer to corresponding signaling in the configuration performed by using the RRC. To avoid repetition, details are not described herein again.

If an additional DMRS is configured by using DCI, the additional DMRS is triggered.

It should be understood that, herein, in the additional DMRS configuration, a corresponding parameter may be configured by using signaling. Optionally, in this embodiment of this application, a one-to-one correspondence (table) between various signaling values and indexes may alternatively be established. When DMRS configuration is performed, the configuration may be implemented by configuring a corresponding index number directly by using RRC, a MAC CE, or DCI.

The foregoing describes configuration parameter configuration manners and specific meanings of configuration parameters of the configuration parameter configuration manners in this embodiment of this application. The following describes, based on different situations, a solution about how to determine the DMRS pattern in the frequency hopping mode during uplink transmission, that is, determine a pattern in the frequency hopping mode being a pattern corresponding to a specific type in FIG. 20 based on the foregoing configuration parameters in this embodiment of this application.

Specifically, a communications device determines, by using indication information of additional DMRS, a DMRS pattern corresponding to a frequency hopping mode, where the additional DMRS indicate DMRS located after a front-loaded DMRS, the indication information is used to indicate at least one of the following: whether an additional DMRS exists, the quantity of the additional DMRS, and locations of the additional DMRS, and the frequency hopping mode indicates that some symbols in one resource scheduling unit are located in a first frequency band and some other symbols are located in a second frequency band.

The communications device performs DMRS mapping or demapping by using the DMRS pattern.

Optionally, in an embodiment, when the indication information is used to indicate that an additional DMRS do not exist, a DMRS in the DMRS pattern occupies one sequence of symbols in the first frequency band and one sequence of symbols in the second frequency band, where one sequence of symbols includes at least one consecutive symbol.

Optionally, in an embodiment, the one sequence of symbols in the first frequency band includes the $1^{st}$ symbol in a first area in the first frequency band, and the first area includes symbols occupied by data and the DMRS.

Optionally, in an embodiment, the one sequence of symbols in the second frequency band includes the $1^{st}$ symbol in the second frequency band.

Optionally, in an embodiment, when the indication information is used to indicate that the additional DMRS exists, a quantity of sequences and locations of the symbols in the first frequency band that are occupied by a DMRS in the DMRS pattern and a quantity of sequences and locations of the symbols in the second frequency band that are occupied by the DMRS in the DMRS pattern are the same as a quantity of sequences and locations indicated by the indication information without frequency hopping.

Optionally, in an embodiment, when the indication information is used to indicate that the additional DMRS exists,
a DMRS in the DMRS pattern occupies two inconsecutive sequences of symbols in the first frequency band and two inconsecutive sequences of symbols in the second frequency band;
a DMRS in the DMRS pattern occupies two inconsecutive sequences of symbols in the first frequency band and one sequence of symbols in the second frequency band; or
a DMRS in the DMRS pattern occupies one sequence of symbols in the first frequency band and two inconsecutive sequences of symbols in the second frequency band, where
each of the two sequences of symbols includes at least one consecutive symbol, and the one sequence of symbols includes at least one consecutive symbol.

Optionally, in an embodiment, when the DMRS in the DMRS pattern occupies two inconsecutive sequences of symbols in the first frequency band, the latter sequence of symbols of the two sequences of symbols in the first frequency band includes the last symbol in the first frequency band; or
when the DMRS in the DMRS pattern occupies two inconsecutive sequences of symbols in the second frequency band, the former sequence of symbols of the two sequences of symbols in the second frequency band includes the $1^{st}$ symbol in the second frequency band.

Specific examples of determining a frequency hopping pattern based on an additional DMRS configuration parameter (that is, indication information of an additional DMRS) in an embodiment of this application are described based on different situations below with reference to specific examples.

Situation 1:
A same set of parameters is used without frequency hopping and with frequency hopping. In other words, no new additional DMRS configuration parameter is required.

In the frequency hopping mode, regardless of a value of an additional DMRS configuration parameter without frequency hopping, each pattern after frequency hopping is of type 1.

Specifically, in this embodiment of this application, the frequency hopping mode may be triggered by using signaling such as one or more of RRC, DCI, and a MAC CE, and after obtaining the foregoing signaling for triggering the frequency hopping mode, the terminal device may transmit a DMRS and data based on type 1.

Optionally, using an example of triggering the frequency hopping mode by using DCI, when a quantity of signaling is format 0, a resource allocation type is 0 (Resource allocation type=0), and a frequency hopping flag is 1 (Frequency hopping flag=1), type 1 is to be used for a corresponding pattern.

It should be understood that, in this case, the additional DMRS configuration parameter works only without frequency hopping. To be specific, the frequency hopping mode is not activated. To be specific, the additional DMRS configuration parameter works only when the quantity of signaling is format 0, the resource allocation type is not 0 (Resource allocation type≠0), no resource allocation typeparameter exists, or the frequency hopping flag is 0 (Frequency hopping flag=0).

Situation 2:
No frequency hopping and frequency hopping correspond to respective additional DMRS configuration parameters. In other words, in the frequency hopping mode, an independent set of additional DMRS configuration parameters is required.

In other words, in this case, a set of additional DMRS configuration parameters (which may be referred to as a first set of configuration parameters) is used without frequency hopping, and another set of additional DMRS configuration parameters (which may be referred to as a second set of configuration parameters) is used with frequency hopping.

It should be understood that, for a type and a function of each set of configuration parameters, reference may be made to the foregoing description. To avoid repetition, details are not described herein again.

Specifically, in this embodiment of this application, the frequency hopping mode may be triggered by using signaling such as one or more of RRC, DCI, and a MAC CE, and after obtaining the foregoing signaling for triggering the frequency hopping mode, the terminal device may transmit data based on the second set of configuration parameters.

Optionally, using an example of triggering the frequency hopping mode by using DCI, when a quantity of signaling is format 0 (format 0), a resource allocation type is 0 (Resource allocation type=0), and a frequency hopping flag is 1 (Frequency hopping flag=1), the second set of configuration parameters is used correspondingly.

It should be understood that, the first set of configuration parameters works only without frequency hopping. To be specific, the frequency hopping mode is not activated. To be specific, the first set of configuration parameters works only when the quantity of signaling is format 0 (format 0), the resource allocation type is not 0 (Resource allocation type≠0), no resource allocation type (no Resource allocation type) parameter exists, or the frequency hopping flag is 0 (Frequency hopping flag=0).

It should be understood that, in situation 2, the second set of configuration parameters may only indicate that a pattern corresponding to the frequency hopping mode is one of two pattern types, to be specific, a pattern type corresponding to the frequency hopping mode is one of type 1 or type 2.

Description is made by using examples based on different situations below. In situation 2-1 to situation 2-3, when a frame structure cannot satisfy a requirement, to be specific, when a symbol interval between two DMRSs in one frequency band during frequency hopping does not satisfy an interval requirement, frequency hopping is not performed to ensure uniformity of pattern types. In situation 2-4 to situation 2-6, when a frame structure cannot satisfy a requirement, to be specific, a symbol interval between two DMRSs in one frequency band during frequency hopping does not satisfy an interval requirement, backoff is performed, and a quantity of DMRSs in the frequency band is reduced to one, thereby ensuring enabling of frequency hopping.

Situation 2-1

If the second set of configuration parameters (for example, UL_DMRS_add_type_hopping=0) indicates that a pattern corresponding to the frequency hopping mode is of type 1, the terminal device sends a DMRS and data based on the pattern corresponding to type 1 during frequency hopping.

Alternatively, if the second set of configuration parameters (for example, UL_DMRS_add_type_hopping=1) indicates that a pattern corresponding to the frequency hopping mode is of type 2-I, the terminal device sends a DMRS and data based on the pattern corresponding to type 2-I during frequency hopping. If a symbol interval between two DMRSs in any one of two frequency bands does not satisfy an interval requirement, frequency hopping is not performed for the frame structure. The interval requirement indicates whether interval data between two DMRSs is greater than or equal to a preset interval threshold $N_j$, where a value of $N_j$ may be 1, 2, 3, or the like, and this embodiment of this application is not limited thereto.

Situation 2-2

If the second set of configuration parameters (for example, UL_DMRS_add_type_hopping=0) indicates that a pattern corresponding to the frequency hopping mode is of type 1, the terminal device sends a DMRS and data based on the pattern corresponding to type 1 during frequency hopping.

Alternatively, if the second set of configuration parameters (for example, UL_DMRS_add_type_hopping=1) indicates that a pattern corresponding to the frequency hopping mode is of type 2-II, the terminal device sends a DMRS and data based on the pattern corresponding to type 2-II during frequency hopping. If a symbol interval between two DMRSs in a first frequency band of two frequency bands does not satisfy the interval requirement, frequency hopping is not performed for the frame structure. The interval requirement indicates whether interval data between two DMRSs is greater than or equal to a preset interval threshold $N_j$, where a value of $N_j$ may be 1, 2, 3, or the like, and this embodiment of this application is not limited thereto.

Situation 2-3

If the second set of configuration parameters (for example, UL_DMRS_add_type_hopping=0) indicates that a pattern corresponding to the frequency hopping mode is of type 1, the terminal device sends a DMRS and data based on the pattern corresponding to type 1 during frequency hopping.

Alternatively, if the second set of configuration parameters (for example, UL_DMRS_add_type_hopping=1) indicates that a pattern corresponding to the frequency hopping mode is of type 2-III, the terminal device sends a DMRS and data based on the pattern corresponding to type 2-III during frequency hopping. If a symbol interval between two DMRSs in a second frequency band of two frequency bands does not satisfy the interval requirement, frequency hopping is not performed for the frame structure. The interval requirement indicates whether interval data between two DMRSs is greater than or equal to a preset interval threshold $N_j$, where a value of $N_j$ may be 1, 2, 3, or the like, and this embodiment of this application is not limited thereto.

It should be understood that, in the foregoing situations 2-1 to 2-3, it is assumed that the network device and the terminal device prestore two pattern types (that is, type 1, and one of three kinds of type 2), where when UL_DMRS_add_type_hopping=0, pattern type 1 is correspondingly used, or when UL_DMRS_add_type_hopping=1, another pattern of the two prestored pattern types is correspondingly used, that is, a pattern corresponding to one of the three kinds of type 2 is correspondingly used. Optionally, the network device and the terminal device may prestore three or four of the foregoing four kinds of pattern types. Using an example in which the network device and the terminal device prestore four of the foregoing four kinds of pattern types, when UL_DMRS_add_type_hopping=0, pattern type 1 is correspondingly used; when UL_DMRS_add_type_hopping=1, pattern type 2-I is correspondingly used; when UL_DMRS_add_type_hopping=2, pattern type 2-II is correspondingly used; and when UL_DMRS_add_type_hopping=3, pattern type 2-III is correspondingly used.

Situation 2-4

If the second set of configuration parameters (for example, UL_DMRS_add_type_hopping=0) indicates that a pattern corresponding to the frequency hopping mode is of type 1, the terminal device sends a DMRS and data based on the pattern corresponding to type 1 during frequency hopping.

Alternatively, if the second set of configuration parameters (for example, UL_DMRS_add_type_hopping=1) indicates that a pattern corresponding to the frequency hopping mode is of type 2-I, and each of two frequency bands satisfies a DMRS interval requirement, the terminal device sends a DMRS and data based on the pattern corresponding to type 2-I during frequency hopping.

Alternatively, if the second set of configuration parameters (for example, UL_DMRS_add_type_hopping=1) indicates that a pattern corresponding to the frequency hopping mode is of type 2-I, the former frequency band satisfies a DMRS interval requirement, and the latter frequency band does not satisfy the DMRS interval requirement, the terminal device sends a DMRS and data based on the pattern corresponding to type 2-II during frequency hopping.

Alternatively, if the second set of configuration parameters (for example, UL_DMRS_add_type_hopping=1) indicates that a pattern corresponding to the frequency hopping mode is of type 2-I, the former frequency band does not satisfy a DMRS interval requirement, and the latter frequency band satisfies the DMRS interval requirement, the terminal device sends a DMRS and data based on the pattern corresponding to type 2-III during frequency hopping.

Situation 2-5

If the second set of configuration parameters (for example, UL_DMRS_add_type_hopping=0) indicates that a pattern corresponding to the frequency hopping mode is of type 1, the terminal device sends a DMRS and data based on the pattern corresponding to type 1 during frequency hopping.

Alternatively, if the second set of configuration parameters (for example, UL_DMRS_add_type_hopping=1) indicates that a pattern corresponding to the frequency hopping mode is of type 2-II, and the former frequency band satisfies a DMRS interval requirement, the terminal device sends a DMRS and data based on the pattern corresponding to type 2-II during frequency hopping.

Alternatively, if the second set of configuration parameters (for example, UL_DMRS_add_type_hopping=1) indicates that a pattern corresponding to the frequency hopping mode is of type 2-II, and the former frequency band does not satisfy a DMRS interval requirement, the terminal device sends a DMRS and data based on the pattern corresponding to type 1 during frequency hopping.

Situation 2-6

If the second set of configuration parameters (for example, UL_DMRS_add_type_hopping=0) indicates that a pattern corresponding to the frequency hopping mode is of type 1, the terminal device sends a DMRS and data based on the pattern corresponding to type 1 during frequency hopping.

Alternatively, if the second set of configuration parameters (for example, UL_DMRS_add_type_hopping=1) indicates that a pattern corresponding to the frequency hopping mode is of type 2-III, and the latter frequency band satisfies a DMRS interval requirement, the terminal device sends a DMRS and data based on the pattern corresponding to type 2-III during frequency hopping.

Alternatively, if the second set of configuration parameters (for example, UL_DMRS_add_type_hopping=1) indicates that a pattern corresponding to the frequency hopping mode is of type 2-II, and the latter frequency band does not satisfy a DMRS interval requirement, the terminal device sends a DMRS and data based on the pattern corresponding to type 1 during frequency hopping.

Situation 3:

In the frequency hopping mode, an additional DMRS configuration parameter without frequency hopping is multiplexed, and the parameter has a same meaning.

Specifically, when an additional DMRS is configured in the additional DMRS configuration parameter, to be specific, when two sequences of DMRSs are included, frequency hopping may be performed only when the terminal device sends data, and a location of a DMRS after frequency hopping is the same as a location of the DMRS configured in the additional DMRS configuration parameter without frequency hopping.

Optionally, using an example of triggering the frequency hopping mode by using DCI, when a quantity of signaling is format 0, a resource allocation type is 0, and a frequency hopping flag is 1, and when the additional DMRS is configured, that is, on the basis of including at least two DMRSs, for example, UL_DMRS_add_num=N (N>0) or UL_DMRS_add_pos={N1, N1+N2, or N1+N2+N3} (N1>0, N2>0, and N3>0), the terminal device uses the frequency hopping mode when sending uplink data.

Specifically, the DMRS pattern corresponding to the frequency hopping mode depends on the additional DMRS configuration parameter. To be specific, a quantity and locations of DMRSs in the DMRS pattern corresponding to the frequency hopping mode are the same as a quantity and locations of DMRSs configured in the additional DMRS configuration parameter without frequency hopping.

Optionally, in situation 3, when no additional DMRS is configured in the additional DMRS configuration parameter, the additional DMRS configuration parameter without frequency hopping may be multiplexed in this embodiment of this application. For example, the value of the additional DMRS configuration parameter is changed to configure an additional DMRS, and then frequency hopping is performed based on the changed additional DMRS configuration parameter. Specifically, the DMRS pattern corresponding to the frequency hopping mode depends on the changed additional DMRS configuration parameter. To be specific, a quantity and locations of DMRSs in the DMRS pattern corresponding to the frequency hopping mode are the same as a quantity and locations of DMRSs configured in the changed additional DMRS configuration parameter without frequency hopping.

To be specific, when two DMRSs are included, frequency hopping may be performed only when the terminal device sends data, and a location of a DMRS after frequency hopping is the same as a location of the DMRS configured in the additional DMRS configuration parameter without frequency hopping.

Situation 4:

In the frequency hopping mode, an additional DMRS configuration parameter without frequency hopping is multiplexed, but the parameter has a different meaning.

Specifically, using an example of triggering the frequency hopping mode by using DCI, when a quantity of signaling is format 0, a resource allocation type is 0, and a frequency hopping flag is 1, if an additional DMRS is configured in the additional DMRS configuration parameter, to be specific, if two DMRSs are included, type 2 such as type 2-I, type 2-II, or type 2-III is used in the frequency hopping mode. If no additional DMRS is configured in the additional DMRS configuration parameter, to be specific, if one DMRS is included, type 1 is used in the frequency hopping mode.

It should be understood that, in situation 4, if an additional DMRS is configured in the additional DMRS configuration parameter, to be specific, if two DMRSs are included, one of type 2-I, type 2-II, and type 2-III is used in the frequency hopping mode.

Description is made by using examples based on different situations below. In situation 4-1 to situation 4-3, when a frame structure cannot satisfy a requirement, to be specific, a symbol interval between two DMRSs in one frequency band during frequency hopping does not satisfy an interval requirement, frequency hopping is not performed to ensure uniformity of pattern types. In situation 4-4 to situation 4-6, when a frame structure cannot satisfy a requirement, to be specific, when a symbol interval between two DMRSs in one frequency band during frequency hopping does not satisfy an interval requirement, a quantity of DMRSs in the frequency band is reduced to one, thereby ensuring enabling of frequency hopping.

Situation 4-1

When no additional DMRS is configured in the additional DMRS configuration parameter, to be specific, when one DMRS is included, a corresponding pattern is of type 1 after frequency hopping.

Alternatively, when an additional DMRS is configured in the additional DMRS configuration parameter, to be specific, when at least two DMRSs are included, a corresponding pattern is of type 2-I after frequency hopping. If a symbol interval between two DMRSs in any one of two frequency bands does not satisfy an interval requirement, frequency hopping is not performed for the frame structure. The interval requirement indicates whether interval data between two DMRSs is greater than or equal to a preset interval threshold $N_j$, where a value of $N_j$ may be 1, 2, 3, or the like, and this embodiment of this application is not limited thereto.

Situation 4-2

When no additional DMRS is configured in the additional DMRS configuration parameter, to be specific, when one DMRS is included, a corresponding pattern is of type 1 after frequency hopping.

Alternatively, when an additional DMRS is configured in the additional DMRS configuration parameter, to be specific, when at least two DMRSs are included, a corresponding pattern is of type 2-II after frequency hopping. If a symbol interval between two DMRSs in the former one of two frequency bands does not satisfy an interval requirement, frequency hopping is not performed for the frame structure.

Situation 4-3

When no additional DMRS is configured in the additional DMRS configuration parameter, to be specific, when one DMRS is included, a corresponding pattern is of type 1 after frequency hopping.

Alternatively, when an additional DMRS is configured in the additional DMRS configuration parameter, to be specific, when at least two DMRSs are included, a corresponding pattern is of type 2-III after frequency hopping. If a symbol interval between two DMRSs in a second frequency band of two frequency bands does not satisfy the interval requirement, frequency hopping is not performed for the frame structure.

Situation 4-4

When no additional DMRS is configured in the additional DMRS configuration parameter, to be specific, when one DMRS is included, a corresponding pattern is of type 1 after frequency hopping.

Alternatively, when an additional DMRS is configured in the additional DMRS configuration parameter, to be specific, when at least two DMRSs are included, and each of two frequency bands satisfies a DMRS interval requirement, the terminal device sends a DMRS and data based on the pattern corresponding to type 2-I during frequency hopping.

Alternatively, when an additional DMRS is configured in the additional DMRS configuration parameter, to be specific, when at least two DMRSs are included, the former frequency band satisfies a DMRS interval requirement, and the latter frequency band does not satisfy the DMRS interval requirement, the terminal device sends a DMRS and data based on the pattern corresponding to type 2-II during frequency hopping.

Alternatively, when an additional DMRS is configured in the additional DMRS configuration parameter, to be specific, when at least two DMRSs are included, the former frequency band does not satisfy a DMRS interval requirement, and the latter frequency band satisfies the DMRS interval requirement, the terminal device sends a DMRS and data based on the pattern corresponding to type 2-III during frequency hopping.

Situation 4-5

When no additional DMRS is configured in the additional DMRS configuration parameter, to be specific, when one DMRS is included, a corresponding pattern is of type 1 after frequency hopping.

Alternatively, when an additional DMRS is configured in the additional DMRS configuration parameter, to be specific, when at least two DMRSs are included, and the former frequency band satisfies a DMRS interval requirement, the terminal device sends a DMRS and data based on the pattern corresponding to type 2-II during frequency hopping.

Alternatively, when an additional DMRS is configured in the additional DMRS configuration parameter, to be specific, when at least two DMRSs are included, and the former frequency band does not satisfy a DMRS interval requirement, the terminal device sends a DMRS and data based on the pattern corresponding to type 1 during frequency hopping.

Situation 4-6

When no additional DMRS is configured in the additional DMRS configuration parameter, to be specific, when one DMRS is included, a corresponding pattern is of type 1 after frequency hopping.

Alternatively, when an additional DMRS is configured in the additional DMRS configuration parameter, to be specific, when at least two DMRSs are included, and the latter frequency band satisfies a DMRS interval requirement, the terminal device sends a DMRS and data based on the pattern corresponding to type 2-III during frequency hopping.

Alternatively, when an additional DMRS is configured in the additional DMRS configuration parameter, to be specific, when at least two DMRSs are included, and the latter frequency band does not satisfy a DMRS interval requirement, the terminal device sends a DMRS and data based on the pattern corresponding to type 1 during frequency hopping.

Optionally, in situation 4, if no additional DMRS is configured in the additional DMRS configuration parameter, frequency hopping is performed based on a pattern corresponding to type 1.

If an additional DMRS is configured in the additional DMRS configuration parameter, a DMRS pattern is determined based on the configuration parameter. Specifically, the DMRS pattern corresponding to the frequency hopping mode depends on the additional DMRS configuration parameter. To be specific, a quantity and locations of DMRSs in the DMRS pattern corresponding to the frequency hopping mode are the same as a quantity and locations of DMRSs configured in the additional DMRS configuration parameter without frequency hopping.

It should be understood that, in the foregoing situation 1 to situation 4, after it is determined that one of the foregoing four kinds of types is used, any one of a plurality of patterns corresponding to the type described above may be used. This is not limited in this embodiment of this application. For patterns corresponding to the types, refer to the foregoing description. Details are not described herein again.

The following describes a multiplexing relationship between DMRSs corresponding to two waveform devices when multi-user MU is served by using a single-carrier DFT-S-OFDM waveform device and a multi-carrier CP-OFDM device.

Figure 37:
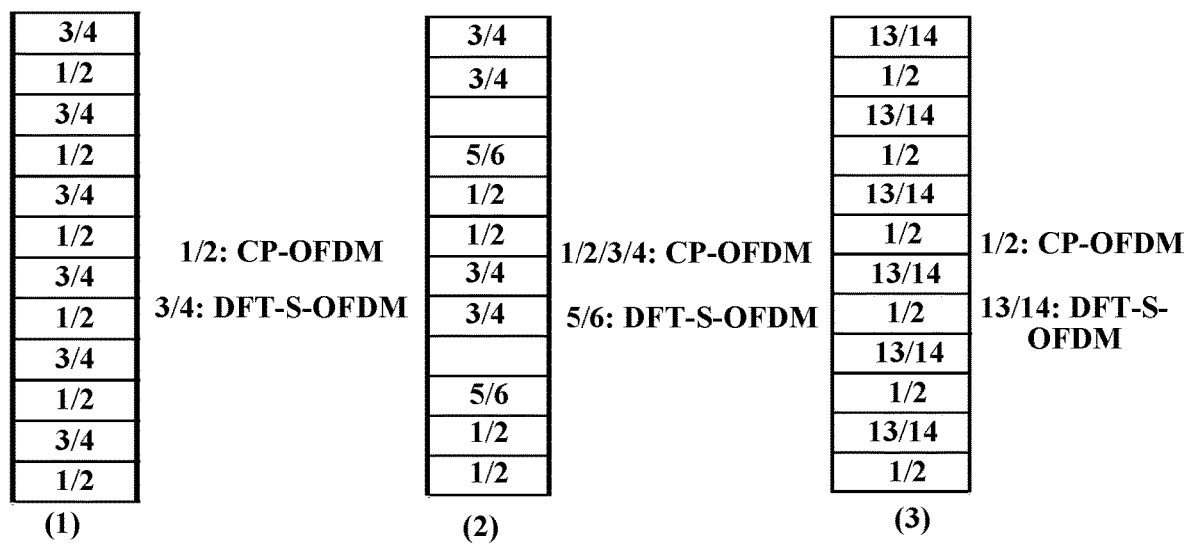
FIG. 37 is a schematic diagram of DMRS multiplexing according to another embodiment of this application.

A frequency division multiplexing (FDM) or time division multiplexing (TDM) manner may be used between the DMRSs corresponding to CP-OFDM and DFT-S-OFDM, TDM is shown in FIG. 36, and FDM is shown in FIG. 37. To be specific, in NR, in some scenarios, multiplexing of the two waveforms through FDM is supported; and in some scenarios, multiplexing of the two waveforms through TDM is supported.

In (1) and (2) in FIG. 36, independent numbering is performed between CP-OFDM and DFT-S-OFDM, the single-carrier waveform uses ports 1 to 12, and the multi-carrier waveform uses ports 13 to 16.

In (3) in FIG. 36, joint numbering is performed between CP-OFDM and DFT-S-OFDM, and ports 1 to 12 are shared.

In (1) and (2) in FIG. 37, joint numbering is performed between CP-OFDM and DFT-S-OFDM, and ports 1 to 12 are shared.

In (3) in FIG. 37, independent numbering is performed between CP-OFDM and DFT-S-OFDM, the multi-carrier waveform uses ports 1 to 12, and the single-carrier waveform uses ports 13 to 16.

Whether frequency division multiplexing or time division multiplexing may be used between the DMRSs corresponding to CP-OFDM and DFT-S-OFDM may be implemented by using the following two methods.

Method 1: When a quantity of CP-OFDM ports is less than or equal to N (for example, N=2/4/6), FDM is used for the DMRSs between the two waveforms. In this case, a location of a symbol in which the DMRS of DFT-S-OFDM is located is the same as that of CP-OFDM. When the quantity of CP-OFDM ports is greater than or equal to N, TDM is used for the DMRSs between the two waveforms. The location of the symbol in which the DMRS of DFT-S-OFDM is located may include the following four forms.

An OFDM symbol in which the single-carrier waveform is located is after that of the multi-carrier waveform, and is closely adjacent to that of the multi-carrier waveform (as shown in (1) in FIG. 37).

The OFDM symbol in which the single-carrier waveform is located is before that of the multi-carrier waveform, and is closely adjacent to that of the multi-carrier waveform.

The OFDM symbol in which the single-carrier waveform is located is after that of the multi-carrier waveform, and is spaced apart from that of the multi-carrier waveform by N symbols (N is greater than or equal to 1).

The OFDM symbol in which the single-carrier waveform is located is before that of the multi-carrier waveform, and is spaced apart from that of the multi-carrier waveform by N symbols (N is greater than or equal to 1).

Method 2: The location of the symbol in which the DMRS of DFT-S-OFDM is located is configured/indicated by using signaling, and a multiplexing manner between the DMRS of DFT-S-OFDM and the DMRS of CP-OFDM is implied.

The location of the single-carrier DMRS includes three situations:

(1) The location of the symbol in which the DMRS of DFT-S-OFDM is located is directly indicated by a signaling indication (for example, RRC, MAC CE, or DCI); when the indicated location is the same as that of the DMRS of CP-OFDM, FDM is used for the DMRSs between the two waveforms; and when the locations are different, TDM is used for the DMRSs between the two waveforms.

(2) The location of the symbol in which the DMRS of DFT-S-OFDM is located is implied by a signaling indication (for example, RRC, MAC CE, or DCI). For example, "0" indicates that the location of the symbol in which the DMRS of DFT-S-OFDM is located is the same as the location for CP-OFDM, and FDM is used between the two; and "1" indicates that the location of the symbol in which the DMRS of DFT-S-OFDM is located is closely adjacent to and after the location of the symbol on which the DMRS of CP-OFDM is located.

(3) The location of the symbol in which the DMRS of DFT-S-OFDM is located is implied by a port number. For example, the port number of the DMRS of DFT-S-OFDM is 1 to 12, indicating that the location of the symbol in which the DMRS of DFT-S-OFDM is located is the same as the location of the symbol in which the DMRS of CP-OFDM is located, and FDM is used between the two; and the port number of the DMRS of DFT-S-OFDM is 13 to 16, indicating that the location of the symbol in which the DMRS of DFT-S-OFDM is located is closely adjacent to and after the location of the symbol in which the DMRS of CP-OFDM is located.

The following describes a case of DMRS patterns corresponding to the current mode of this embodiment of this application that correspond to the situation 1 and the situation 2 when the current mode is the aggregation mode.

Figure 14:
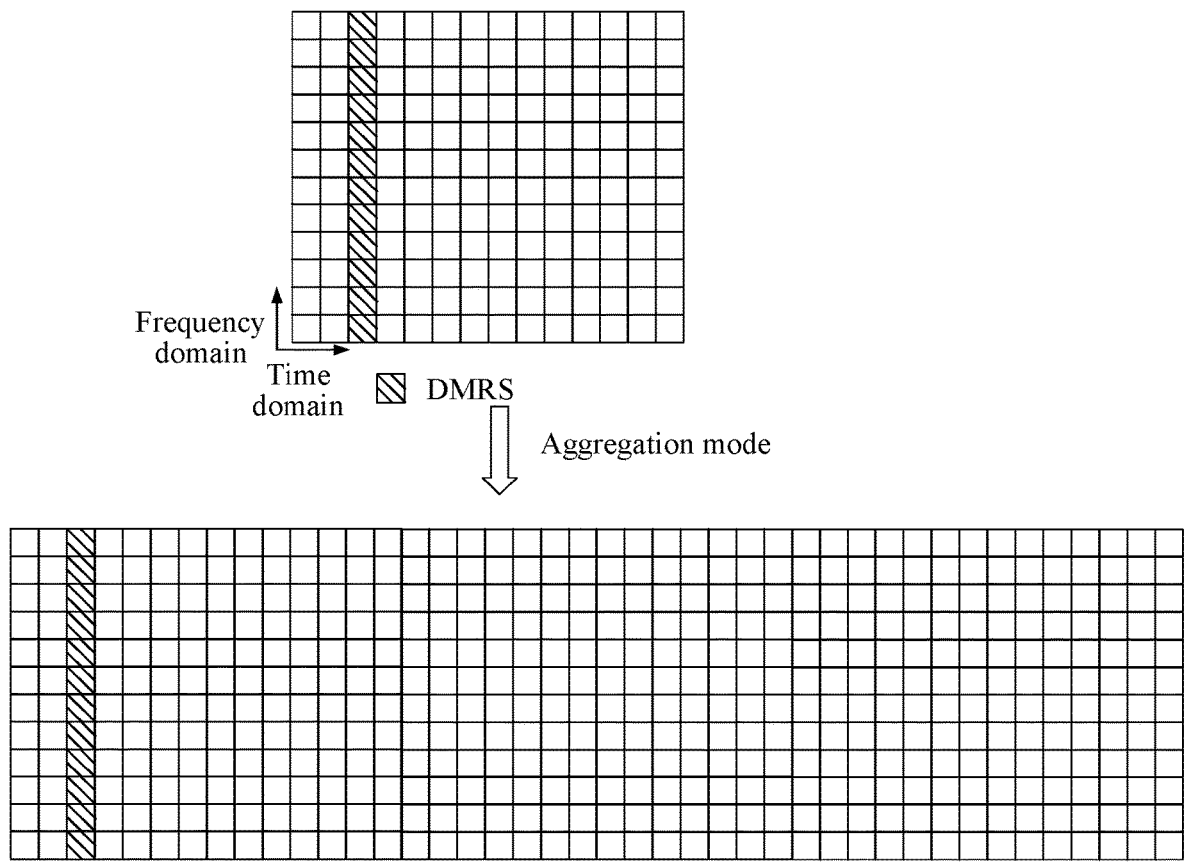
FIG. 14 is a schematic diagram of a DMRS pattern according to another embodiment of this application.

Optionally, in an embodiment, when the current mode is the aggregation mode, the aggregation mode corresponds to aggregation transmission of Y resource scheduling units, and Y is an integer greater than or equal to 2. For the foregoing situation 1, in this embodiment of this application, as shown in FIG. 14, the DMRS in the DMRS pattern corresponding to the current mode occupies at least one consecutive symbol in each of the first $Y_1$ resource scheduling units of Y resource scheduling units, where $Y_1$ is an integer greater than or equal to 1 and less than Y. FIG. 12 shows a case in which Y=3 and $Y_1$=1.

Figure 15:
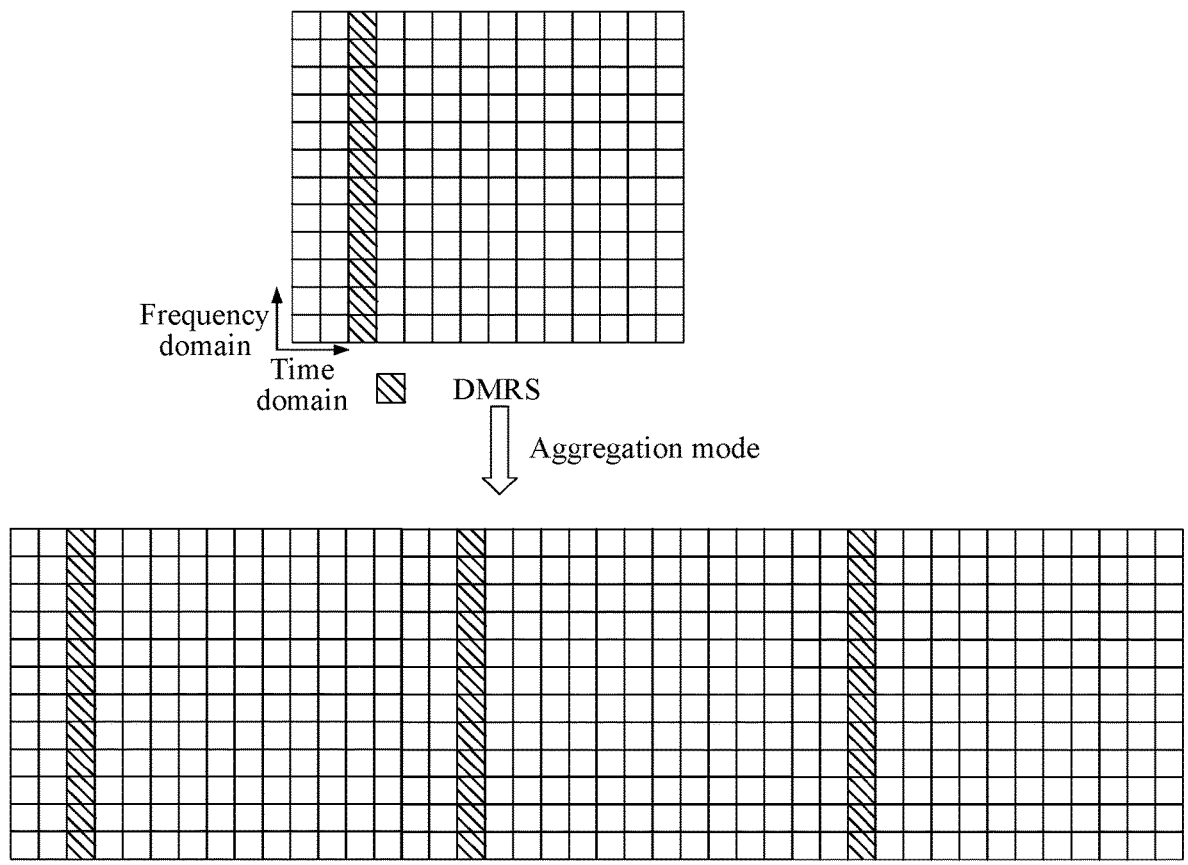
FIG. 15 is a schematic diagram of another DMRS pattern in the prior art.

FIG. 15 shows an existing manner in which a DMRS is transmitted still based on a location in a preset pattern shown in FIG. 5 in the aggregation mode. It may be learned from FIG. 15 that, the DMRS in the preset DMRS pattern occupies at least one consecutive symbol in each of the Y resource scheduling units.

A channel status is relatively stable in a scenario of situation 1, and channel statuses of the Y resource scheduling units are similar because of joint transmission of the Y resource scheduling units. Therefore, a small quantity of DMRSs needs to be transmitted for data demodulation. Because a DMRS is transmitted in each resource scheduling unit in FIG. 15, resource waste is caused.

However, in this embodiment of this application, in the aggregation mode, the DMRS occupies only symbols in the first $Y_1$ resource scheduling units of the Y resource scheduling units in aggregation transmission, thereby reducing resources occupied by the DMRS, avoiding resource waste, and improving network performance.

Figure 16:
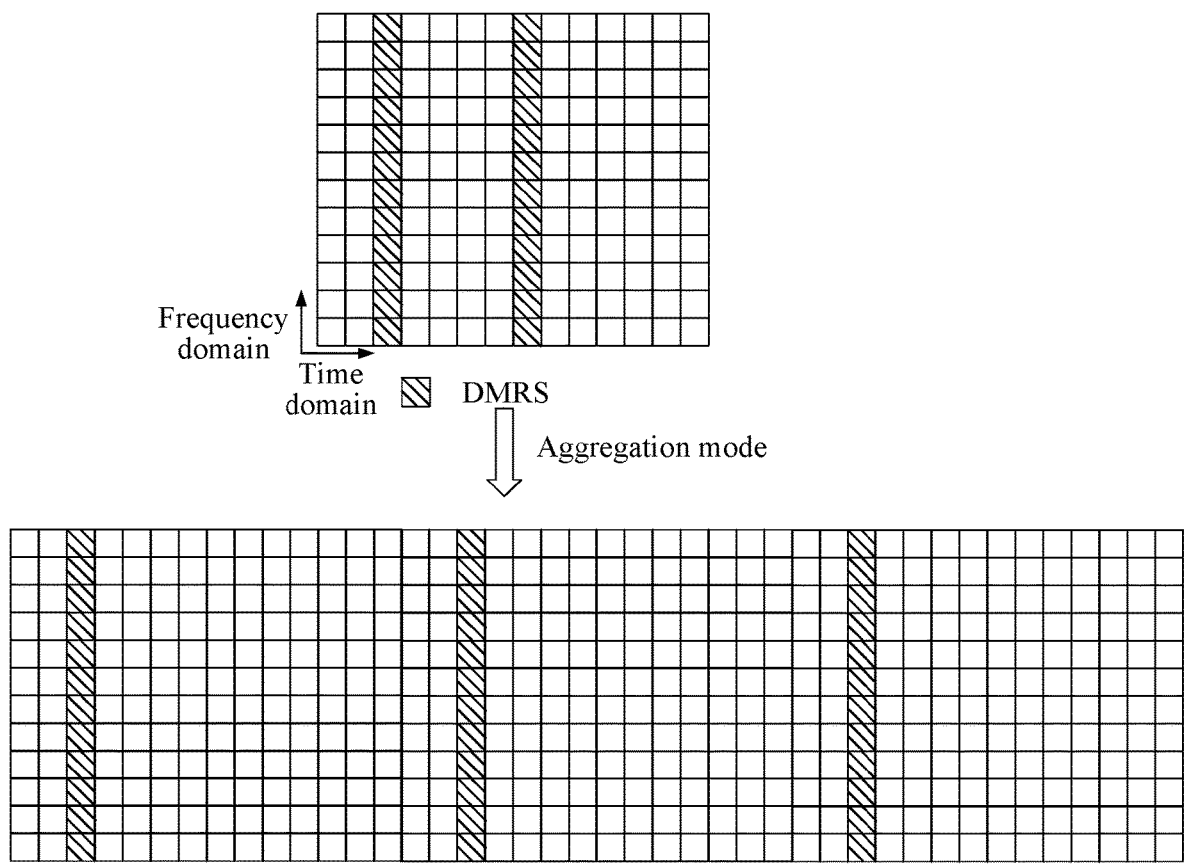
FIG. 16 is a schematic diagram of a DMRS pattern according to another embodiment of this application.

Optionally, in an embodiment, when the current mode is the aggregation mode, the aggregation mode corresponds to aggregation transmission of Y resource scheduling units, and Y is an integer greater than or equal to 2. For the foregoing situation 2, in this embodiment of this application, as shown in FIG. 16, the DMRS in the DMRS pattern corresponding to the current mode occupies $L_1$ groups of symbols in each of the Y resource scheduling units, where $L_1$ is an integer less than L, the $L_1$ groups of symbols are not adjacent to each other, and each of the $L_1$ groups of symbols includes at least one consecutive symbol. FIG. 16 shows a case in which $L_1$=1 and the one group of symbols includes one symbol.

Figure 17:
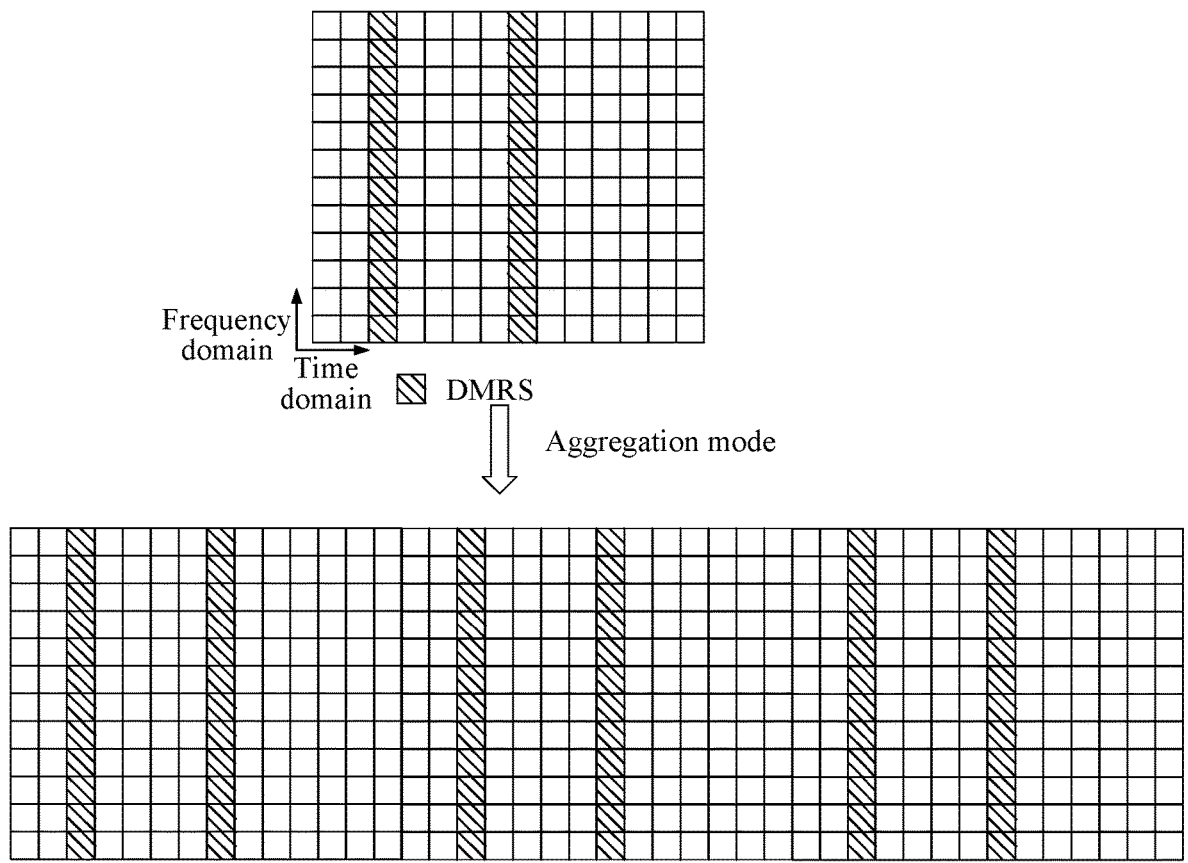
FIG. 17 is a schematic diagram of another DMRS pattern in the prior art.

FIG. 17 shows an existing manner in which a DMRS is transmitted still based on a location in a preset pattern shown in FIG. 6 in the aggregation mode. It may be learned from FIG. 17 that, the DMRS in the preset DMRS pattern occupies L groups of symbols in each of the Y resource scheduling units, where L is an integer greater than or equal to 2, the L groups of symbols are not adjacent to each other, and each of the L groups of symbols includes at least one consecutive symbol.

It may be learned from FIG. 17 that, in the aggregation mode, a DMRS in each resource scheduling unit occupies L groups of symbols. However, in the aggregation mode, a plurality of resource scheduling units perform joint transmission. Therefore, channels of the plurality of resource scheduling units in joint transmission have a particular association relationship. Therefore, data may be accurately demodulated by using only a relatively small quantity of DMRSs. However, because L groups of DMRSs are transmitted in each resource scheduling unit in FIG. 17, resource waste is caused.

However, in this embodiment of this application, in the aggregation mode, the DMRS occupies only the $L_1$ groups of symbols in each of the Y resource scheduling units in aggregation transmission, thereby reducing resources occupied by the DMRS, avoiding resource waste, and improving network performance.

It should be understood that, FIG. 16 describes an example in which L is 2, but this embodiment of this application is not limited thereto. A DMRS in each resource scheduling unit may occupy a plurality of groups of symbols, and for example, occupy three groups, four groups, or more groups of symbols. Similarly, FIG. 16 shows only a case in which $L_1=1$, but this embodiment of this application is not limited thereto, provided that $L_1$ is less than L.

It should be noted that, FIG. 17 shows an existing manner in which a DMRS is transmitted still based on a location in a preset pattern shown in FIG. 6 in the frequency hopping mode. It may be learned from FIG. 17 that, DMRSs in an entire aggregation resource are not distributed uniformly. Because a receive end needs to demodulate subsequent data by using a DMRS and spacings between neighboring DMRS symbols are not uniform, when a spacing between two neighboring groups of DMRS symbols is relatively large and after the receive end receives a DMRS transmitted previously, the receive end needs to demodulate subsequent data by using the DMRS. Because the spacing is relatively large, a channel status may fluctuate relatively greatly, and the data may be demodulated insufficiently accurately. Similarly, when the spacing between the two neighboring groups of DMRS symbols is relatively small, the channel status may be relatively stable, and the receive end device further receives one group of DMRSs after a relatively short symbol interval, causing resource waste.

Figure 18:
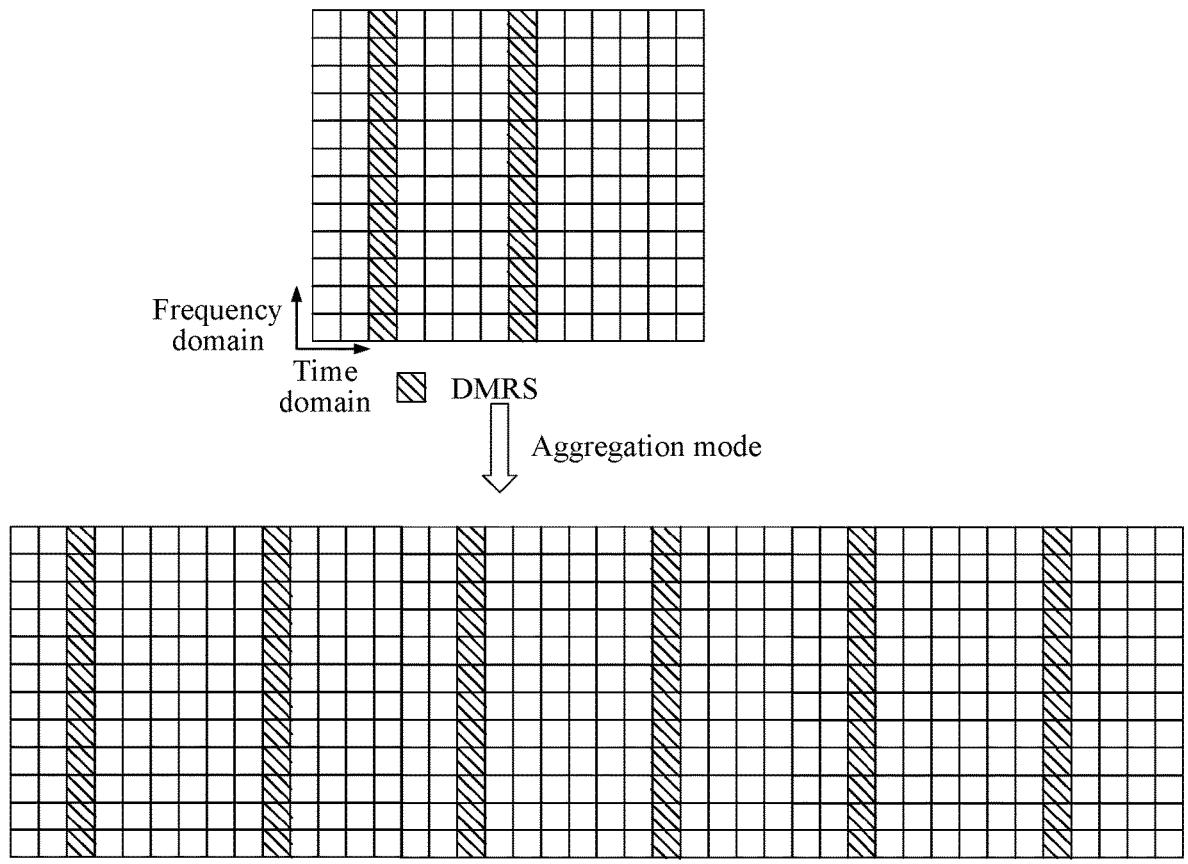
FIG. 18 is a schematic diagram of a DMRS pattern according to another embodiment of this application.

Alternatively, in this embodiment of this application, as shown in FIG. 18, a DMRS in a DMRS pattern corresponding to the current mode occupies L groups of symbols in each of Y resource scheduling units, and a maximum difference between spacings between any two neighboring groups of symbols of Y*L groups of symbols occupied by the DMRS in the DMRS pattern corresponding to the current mode is S symbols, where S<R. A maximum difference between spacings between any two neighboring groups of symbols of Y*L groups of symbols occupied by a DMRS in the preset DMRS pattern is R symbols. For example, as shown in FIG. 17, because a maximum value of a spacing between two connected groups of symbols is eight symbols, and a minimum value of the spacing between the two connected groups of symbols is four symbols, R=8−4=4. As shown in FIG. 18, because a maximum value of a spacing between two connected groups of symbols is six symbols, and a minimum value of the spacing between the two connected groups of symbols is six symbols, S=6−6=0.

Therefore, in this embodiment of this application, in the aggregation mode, the symbols that are in the Y resource scheduling units in aggregation transmission and that are occupied by the DMRS are distributed relatively uniformly, thereby improving demodulation performance, avoiding resource waste, and improving network performance.

It should be understood that, a quantity of symbols in one group of symbols occupied by the DMRS is not limited herein, and the one group of symbols may include at least one symbol, for example, include one symbol, two symbols, or three symbols. This embodiment of this application is not limited thereto.

It should be noted that, examples in the foregoing embodiments are intended to only help a person skilled in the art understand the embodiments of this application, but not intended to limit the embodiments of this application to specific values or specific scenarios described by using the examples. A person skilled in the art apparently can make various equivalent modifications or changes according to the examples described above, and such modifications or changes also fall within the scope of the embodiments of this application.

The DMRS transmission method according to the embodiments of this application is described in detail above with reference to FIG. 1 to FIG. 37, and a communications device according to an embodiment of this application is described in detail below with reference to FIG. 19.

Figure 19:
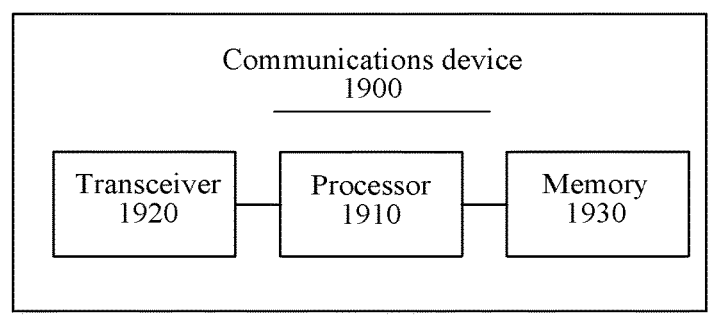
FIG. 19 is a schematic block diagram of a communications device according to an embodiment of this application.

FIG. 19 is a schematic block diagram of a communications device 1900 according to an embodiment of this application. The communications device may be a network device or a terminal device. Specifically, as shown in FIG. 19, the communications device 1900 includes: a processor 1910 and a transceiver 1920.

The processor is configured to determine a current mode of a resource scheduling unit, where the current mode is a frequency hopping mode or an aggregation mode, the frequency hopping mode indicates that some symbols in one resource scheduling unit are located in a first frequency band and some other symbols are located in a second frequency band, and the aggregation mode indicates aggregation transmission of a plurality of resource scheduling units.

The transceiver is configured to perform DMRS mapping or demapping by using a DMRS pattern corresponding to the current mode, where a location of a symbol occupied by a DMRS in the DMRS pattern corresponding to the current mode is different from a location of a symbol occupied by a DMRS in a preset DMRS pattern.

Therefore, the DMRS pattern in the current mode in this embodiment of this application is different from the preset pattern, and a location of a symbol occupied by a DMRS can be flexibly selected based on the different modes in this embodiment of this application. Therefore, requirements of the different modes can be satisfied in this embodiment of this application, thereby improving network performance.

Optionally, in another embodiment, the current mode is the frequency hopping mode, where the DMRS in the preset DMRS pattern occupies N consecutive symbols in one resource scheduling unit without frequency hopping, where N is an integer greater than or equal to 1; and the DMRS in the DMRS pattern corresponding to the current mode occupies $N_1$ consecutive symbols in the first frequency band and $N_2$ consecutive symbols in the second frequency band, where $N_1$ is an integer greater than or equal to 1, and $N_2$ is an integer greater than or equal to 1.

Optionally, in another embodiment, $N_1=N_2$, and locations of the $N_1$ symbols in the first frequency band are symmetrical with locations of the $N_2$ symbols in the second frequency band.

Optionally, in another embodiment, the $N_2$ symbols include the $1^{st}$ symbol in the second frequency band.

Optionally, in another embodiment, the current mode is the frequency hopping mode, where the DMRS in the preset DMRS pattern occupies M consecutive symbols and K consecutive symbols in one resource scheduling unit without frequency hopping, where the M symbols are not adjacent to the K symbols;

the DMRS in the DMRS pattern corresponding to the current mode occupies $M_1$ consecutive symbols and $K_1$ consecutive symbols of the symbols in the first frequency band, and $M_2$ consecutive symbols and $K_2$ consecutive symbols in the second frequency band, where the $M_1$ symbols are not adjacent to the $K_1$ symbols, the $M_2$ symbols are not adjacent to the $K_2$ symbols, and M, K, $M_1$, $K_1$, $M_2$, and $K_2$ are integers greater than or equal to 1.

Optionally, in another embodiment, $M_1=M_2$, $K_1=K_2$, and locations of the $M_1$ symbols and the $K_1$ symbols in the first frequency band are symmetrical with locations of the $M_2$ symbols and the $K_2$ symbols in the second frequency band.

Optionally, in another embodiment, the $M_2$ symbols include the 1st symbol in the second frequency band.

Optionally, in another embodiment, the DMRS in the preset DMRS pattern further occupies P consecutive symbols in the one resource scheduling unit without frequency hopping, where the P symbols are adjacent to neither the M symbols nor the K symbols; and the DMRS in the DMRS pattern corresponding to the current mode further occupies $P_1$ consecutive symbols of the symbols in the first frequency band, and $P_2$ consecutive symbols in the second frequency band, where the $P_1$ symbols are adjacent to neither the $M_1$ symbols nor the $K_1$ symbols, the $P_2$ symbols are adjacent to neither the $M_2$ symbols nor the $K_2$ symbols, and P, $P_1$, and $P_2$ are integers greater than or equal to 1.

Optionally, in another embodiment, the current mode is the aggregation mode, a quantity of the plurality of resource scheduling units is Y, and Y is an integer greater than or equal to 2;

the DMRS in the preset DMRS pattern occupies at least one consecutive symbol in each of the Y resource scheduling units.

the DMRS in the DMRS pattern corresponding to the current mode occupies at least one consecutive symbol in each of the first $Y_1$ resource scheduling units of Y resource scheduling units, where $Y_1$ is an integer greater than or equal to 1 and less than Y.

Optionally, in another embodiment, the current mode is the aggregation mode, and a quantity of the plurality of resource scheduling units is Y;

the DMRS in the preset DMRS pattern occupies L groups of symbols in each of the Y resource scheduling units, where L is an integer greater than or equal to 2, the L groups of symbols are not adjacent to each other, and each of the L groups of symbols includes at least one consecutive symbol; and the DMRS in the DMRS pattern corresponding to the current mode occupies $L_1$ groups of symbols in each of the Y resource scheduling units, where $L_1$ is an integer less than L, the $L_1$ groups of symbols are not adjacent to each other, and each of the $L_1$ groups of symbols includes at least one consecutive symbol.

Optionally, in another embodiment, the current mode is the aggregation mode, and a quantity of the plurality of resource scheduling units is Y;

the DMRS in the preset DMRS pattern occupies L groups of symbols in each of the Y resource scheduling units, and the DMRS in the DMRS pattern corresponding to the current mode occupies L groups of symbols in each of the Y resource scheduling units, where L is an integer greater than or equal to 2, the L groups of symbols are not adjacent to each other, and each of the L groups of symbols includes at least one consecutive symbol; and a maximum difference between spacings between any two neighboring groups of symbols of the Y*L groups of symbols occupied by the DMRS in the preset DMRS pattern is R symbols, and a maximum difference between spacings between any two neighboring groups of symbols of the Y*L groups of symbols occupied by the DMRS in the DMRS pattern corresponding to the current mode is S symbols, where S<R.

Optionally, in another embodiment, the communications device is a network device, and the transceiver is further configured to send first indication information to a terminal device, where the first indication information is used by the terminal device to determine the current mode of the resource scheduling unit.

Optionally, in another embodiment, the communications device is the network device, and the transceiver is further configured to send second indication information to the terminal device, where the second indication information is used to indicate the DMRS pattern corresponding to the current mode.

Optionally, in another embodiment, the communications device is a terminal device, and the transceiver is further configured to receive first indication information sent by a network device, where the first indication information is used by the terminal device to determine the current mode of the resource scheduling unit; and the processor is specifically configured to determine the current mode according to the first indication information.

Optionally, in another embodiment, the communications device is the terminal device, and the transceiver is further configured to receive second indication information sent by the network device, where the second indication information is used to indicate the DMRS pattern corresponding to the current mode.

Therefore, the DMRS pattern in the current mode in this embodiment of this application is different from the preset pattern, and a location of a symbol occupied by a DMRS can be flexibly selected based on the different modes in this embodiment of this application. Therefore, requirements of the different modes can be satisfied in this embodiment of this application, thereby improving network performance.

It should be understood that, the communications device 1900 shown in FIG. 19 can implement each process related to the network device or the terminal device in the method embodiments in FIG. 1 to FIG. 37. Operations and/or functions of modules in the communications device 1900 are respectively intended to implement corresponding procedures in the foregoing method embodiments. For details, refer to the description in the foregoing method embodiments. To avoid repetition, the detailed description is appropriately omitted herein.

It should be understood that, the processor 1910 in this embodiment of this application may be implemented by using a processing unit or a chip. Optionally, the transceiver 1920 may include a transmitter or a receiver or include a transceiver unit, and this embodiment of this application is not limited thereto.

It should be noted that, a processor (for example, the processor 1910 in FIG. 19) in the embodiments of this application may be an integrated circuit chip and have a signal processing capability. In an implementation process, steps in the foregoing method embodiments can be implemented by using a hardware integrated logical circuit in the processor, or by using instructions in a form of software. The processor may be a general purpose processor, a digital signal processor (DSP), an application-specific integrated circuit (ASIC), a field programmable gate array (FPGA) or another programmable logic device, a discrete gate or transistor logic device, or a discrete hardware component. It may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and implemented by using a hardware decoding processor, or may be executed and implemented by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It can be understood that, a memory (for example, a memory 1930 in FIG. 19) in the embodiments of this application may be a volatile memory or a non-volatile memory, or may include both a volatile memory and a non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). It should be noted that the memory of the systems and methods described in this specification includes but is not limited to these and any memory of another proper type.

An embodiment of this application further provides a computer readable medium storing a computer program. When executed by a computer, the computer program implements a DMRS transmission method according to any one of the foregoing method embodiments.

An embodiment of this application further provides a computer program product. When executed by a computer, the computer program product implements a DMRS transmission method according to any one of the foregoing method embodiments.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on the computer, the procedures or functions according to the embodiments of this application are all or partially generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD), a semiconductor medium (for example, a solid state disk (SSD)), or the like.

An embodiment of this application further provides a processing apparatus including a processor and an interface; and the processor is configured to perform a DMRS transmission method according to any one of the foregoing method embodiments.

It should be understood that, the foregoing processing apparatus may be a chip, and the processor may be implemented by using hardware or may be implemented by using software. When the processor is implemented by using hardware, the processor may be a logic circuit, an integrated circuit, or the like; or when the processor is implemented by using software, the processor may be a general purpose processor and be implemented by reading software code stored in a memory, and the memory may be integrated in the processor, or may be located out of the processor and exist independently.

It should be understood that "one embodiment" or "an embodiment" mentioned in the whole specification does not mean that particular features, structures, or characteristics related to the embodiment are included in at least one embodiment of this application. Therefore, "in one embodiment" or "in an embodiment" appearing in the specification does not refer to a same embodiment. In addition, these particular features, structures, or characteristics may be combined in one or more embodiments by using any appropriate manner. It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined according to A. However, it should further be understood that determining B according to A does not mean that B is determined according to A only; that is, B may be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments in this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

With descriptions of the foregoing implementations, a person skilled in the art may clearly understand that this application may be implemented by hardware, firmware or a combination thereof. When the present disclosure is implemented by software, the foregoing functions may be stored in a computer readable medium or transmitted as one or more instructions or code in the computer readable medium. The computer readable medium includes a computer storage medium and a communications medium, where the communications medium includes any medium that enables a computer program to be transmitted from one place to another. The storage medium may be any available medium accessible to a computer. The following provides an example but does not impose a limitation: The computer readable medium may include a RAM, a ROM, an EEPROM, a CD-ROM, or another optical disc storage or a disk storage medium, or another magnetic storage device, or any other medium that can carry or store expected program code in a form of an instruction or a data structure and can be accessed by a computer. In addition, any connection may be appropriately defined as a computer readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. A disk and disc used by this application includes a compact disc CD, a laser disc, an optical disc, a digital versatile disc (DVD), a floppy disk and a Blu-ray disc, where the disk generally copies data in a magnetic manner, and the disc copies data optically in a laser manner. The foregoing combination should also be included in the protection scope of the computer readable medium.

In summary, what is described above is merely example embodiments of the technical solutions of this application, but is not intended to limit the protection scope of this application. Any modification, equivalent replacement, or improvement made without departing from the spirit and principle of this application shall fall within the protection scope of this application.

What is claimed is:

1. A demodulation reference signal (DMRS) transmission method, comprising:
   receiving, by a terminal device, an additional DMRS configuration parameter, wherein the additional DMRS configuration parameter is used to indicate at least one of the following: whether an additional DMRS exists, a quantity of additional DMRSs, and a location of an additional DMRS, and wherein the additional DMRS is another sequence of DMRS that is located after a front-loaded DMRS;
   determining, by the terminal device based on the received additional DMRS configuration parameter, a DMRS pattern corresponding to a frequency hopping mode, wherein the frequency hopping mode indicates that some symbols in one resource scheduling unit are located in a first frequency band and remaining symbols in the one resource scheduling unit are located in a second frequency band, wherein the one resource scheduling unit occupies 14 symbols, wherein a quantity of sequences of DMRSs in the DMRS pattern determined by the terminal device by using the additional DMRS configuration parameter in the frequency hopping mode is different from that in a non-frequency-hopping mode, and wherein the additional DMRS configuration parameter used by the terminal is identical for both the frequency hopping mode and the non-frequency hopping mode; and
   performing, by the terminal device, DMRS demapping by using the DMRS pattern.

2. The method according to claim 1, wherein when the additional DMRS is not configured in the additional DMRS configuration parameter, only one sequence of DMRS exists in the first frequency band and the second frequency band in the DMRS pattern corresponding to the frequency hopping mode.

3. The method according to claim 1, wherein when the additional DMRS is configured in the additional DMRS configuration parameter, one sequence of DMRS or two sequences of DMRSs exist in each of the first frequency band and the second frequency band in the DMRS pattern corresponding to the frequency hopping mode.

4. The method according to claim 3, wherein when the first frequency band or the second frequency band does not satisfy a DMRS interval requirement, the first frequency band or the second frequency band comprises only one sequence of DMRS; and
   wherein the DMRS interval requirement indicates whether a quantity of symbols of interval data between two sequences of DMRSs is greater than or equal to a preset interval threshold $N_j$, wherein a value of $N_j$ is 1 or 2 or 3.

5. The method according to claim 3, wherein when the first frequency band or the second frequency band satisfies a DMRS interval requirement, the first frequency band or the second frequency band comprises two sequences of DMRSs; and
wherein the DMRS interval requirement indicates whether a quantity of symbols of interval data between two sequences of DMRSs is greater than or equal to a preset interval threshold Nj, wherein a value of Nj is 1 or 2 or 3.

6. The method according to claim 5, wherein the second sequence of DMRS in the first frequency band or the second frequency band satisfying the DMRS interval requirement is located in the $4^{th}$ symbol after the first sequence of DMRS.

7. The method according to claim 5, wherein the first sequence of DMRS in the second frequency band is located in the $1^{st}$ symbol in the second frequency band.

8. The method according to claim 4, wherein the DMRS interval requirement is that three symbols exist between two sequences of DMRSs in a frequency band.

9. The method according to claim 1, wherein the quantity of sequences of DMRSs in the DMRS pattern determined by using the identical additional DMRS configuration parameter in the frequency hopping mode is different from that in the non-frequency-hopping mode.

10. A terminal device, comprising: at least one processor and a receiver, wherein:
the receiver is configured to receive an additional demodulation reference signal (DMRS) configuration parameter, wherein the additional DMRS configuration parameter is used to indicate at least one of the following: whether an additional DMRS exists, a quantity of additional DMRS, and a location of an additional DMRS, and, wherein the additional DMRS is another sequence of DMRS that is located after a front-loaded DMRS; and
the at least one processor is configured to:
determine, by using the additional DMRS configuration parameter received by the receiver, a DMRS pattern corresponding to a frequency hopping mode, wherein the frequency hopping mode indicates that some symbols in one resource scheduling unit are located in a first frequency band and remaining symbols of the one resource scheduling unit are located in a second frequency band, wherein the one resource scheduling unit occupies 14 symbols, wherein a quantity of sequences of DMRSs in the DMRS pattern determined by the terminal device by using the additional DMRS configuration parameter in the frequency hopping mode is different from that in a non-frequency-hopping mode, and wherein the additional DMRS configuration parameter used by the terminal is identical for both the frequency hopping mode and the non-frequency hopping mode; and
perform DMRS demapping by using the DMRS pattern.

11. The terminal device according to claim 10, wherein when the additional DMRS is not configured in the additional DMRS configuration parameter, only one sequence of DMRS exists in the first frequency band and the second frequency band in the DMRS pattern corresponding to the frequency hopping mode determined by the processor.

12. The terminal device according to claim 10, wherein when the additional DMRS is configured in the additional DMRS configuration parameter, one sequence of DMRS or two sequences of DMRSs exist in each of the first frequency band and the second frequency band in the DMRS pattern corresponding to the frequency hopping mode determined by the processor.

13. The terminal device according to claim 12, wherein when the first frequency band or the second frequency band does not satisfy a DMRS interval requirement, the first frequency band or the second frequency band comprises only one sequence of DMRS; and
wherein the DMRS interval requirement indicates whether a quantity of symbols of interval data between two sequences of DMRSs is greater than or equal to a preset interval threshold Nj, wherein a value of Nj is 1 or 2 or 3.

14. The terminal device according to claim 12, wherein when the first frequency band or the second frequency band satisfies a DMRS interval requirement, the first frequency band or the second frequency band comprises two sequences of DMRSs; and
wherein the DMRS interval requirement indicates whether a quantity of symbols of interval data between two sequences of DMRSs is greater than or equal to a preset interval threshold Nj, wherein a value of Nj is 1 or 2 or 3.

15. The terminal device according to claim 14, wherein the second sequence of DMRS in the first frequency band or the second frequency band satisfying the DMRS interval requirement is located in the $4^{th}$ symbol after the first sequence of DMRS.

16. The terminal device according to claim 14, wherein the first sequence of DMRS in the second frequency band is located in the $1^{st}$ symbol in the second frequency band.

17. The terminal device according to claim 13, wherein the DMRS interval requirement is that three symbols exist between two sequences of DMRSs in a frequency band.

18. The terminal device according to claim 10, wherein the quantity of sequences of DMRSs in the DMRS pattern determined by using the identical additional DMRS configuration parameter in the frequency hopping mode is different from that in the non-frequency-hopping mode.

19. A chip, wherein the chip comprises at least one programmable logic circuit and a program instruction, and when running, the chip is configured to perform a demodulation reference signal (DMRS) transmission method, comprising:
controlling, receiving of an additional DMRS configuration parameter, wherein the additional DMRS configuration parameter is used to indicate at least one of the following: whether an additional DMRS exists, a quantity of additional DMRSs, and a location of an additional DMRS, and, wherein the additional DMRS is another sequence of DMRS that is located after a front-loaded DMRS;
determining, based on the received additional DMRS configuration parameter, a DMRS pattern corresponding to a frequency hopping mode, wherein the frequency hopping mode indicates that some symbols in one resource scheduling unit are located in a first frequency band and remaining symbols of the one resource scheduling unit are located in a second frequency band, wherein the one resource scheduling unit occupies 14 symbols, wherein a quantity of sequences of DMRSs in the DMRS pattern determined by the terminal device by using the additional DMRS configuration parameter in the frequency hopping mode is different from that in a non-frequency-hopping mode, and wherein the additional DMRS configuration parameter used by the terminal is identical for both the frequency hopping mode and the non-frequency hopping mode; and performing DMRS demapping by using the DMRS pattern.

20. The chip according to claim 19, wherein
when the additional DMRS is not configured in the additional DMRS configuration parameter, only one sequence of DMRS exists in the first frequency band and the second frequency band in the DMRS pattern corresponding to the frequency hopping mode.

21. The chip according to claim 20, wherein when an additional DMRS is configured in the additional DMRS configuration parameter, one sequence of DMRS or two sequences of DMRSs exist in each of the first frequency band and the second frequency band in the DMRS pattern corresponding to the frequency hopping mode.

22. The chip according to claim 21, wherein when the first frequency band or the second frequency band does not satisfy a DMRS interval requirement, the first frequency band or the second frequency band comprises only one sequence of DMRS; and
wherein the DMRS interval requirement indicates whether a quantity of symbols of interval data between two sequences of DMRSs is greater than or equal to a preset interval threshold Nj, wherein a value of Nj is 1 or 2 or 3.

23. The chip according to claim 20, wherein when the first frequency band or the second frequency band satisfies a DMRS interval requirement, the first frequency band or the second frequency band comprises two sequences of DMRSs; and
wherein the DMRS interval requirement indicates whether a quantity of symbols of interval data between two sequences of DMRSs is greater than or equal to a preset interval threshold Nj, wherein a value of Nj is 1 or 2 or 3.

24. The chip according to claim 23, wherein the second sequence of DMRS in the first frequency band or the second frequency band satisfying the DMRS interval requirement is located in the $4^{th}$ symbol after the first sequence of DMRS.

25. The chip according to claim 23, wherein the first sequence of DMRS in the second frequency band is located in the $1^{st}$ symbol in the second frequency band.

26. The chip according to claim 19, wherein the quantity of sequences of DMRSs in the DMRS pattern determined by using the identical additional DMRS configuration parameter in the frequency hopping mode is different from that in the non-frequency-hopping mode.

27. A non-transitory computer readable storage medium storing instructions that when executed by a computer, configure the computer to perform a demodulation reference signal (DMRS) transmission method, the method comprising:

receiving an additional DMRS configuration parameter, wherein the additional DMRS configuration parameter is used to indicate at least one of the following: whether an additional DMRS exists, a quantity of additional DMRSs, and a location of an additional DMRS, and wherein the additional DMRS is another sequence of DMRS that is located after a front-loaded DMRS;

determining, based on the received additional DMRS configuration parameter, a DMRS pattern corresponding to a frequency hopping mode, wherein the frequency hopping mode indicates that some symbols in one resource scheduling unit are located in a first frequency band and remaining symbols of the one resource scheduling unit are located in a second frequency band, wherein the one resource scheduling unit occupies 14 symbols, wherein a quantity of sequences of DMRSs in the DMRS pattern determined by the terminal device by using the additional DMRS configuration parameter in the frequency hopping mode is different from that in a non-frequency-hopping mode, and wherein the additional DMRS configuration parameter used by the terminal is identical for both the frequency hopping mode and the non-frequency hopping mode; and performing DMRS demapping by using the DMRS pattern.

28. The non-transitory computer readable storage medium according to claim 27, wherein
when the additional DMRS is not configured in the additional DMRS configuration parameter, only one sequence of DMRS exists in the first frequency band and the second frequency band in the DMRS pattern corresponding to the frequency hopping mode.

29. The non-transitory computer readable storage medium according to claim 27, wherein the quantity of sequences of DMRSs in the DMRS pattern determined by using the identical additional DMRS configuration parameter in the frequency hopping mode is different from that in the non-frequency-hopping mode.

* * * * *